(12) United States Patent
Vajapeyam et al.

(10) Patent No.: US 11,343,680 B2
(45) Date of Patent: May 24, 2022

(54) TECHNIQUES FOR ACCESSING A CELL USING AN UNLICENSED RADIO FREQUENCY SPECTRUM BAND

(71) Applicant: QUALCOMM Incorporated, San Diego, CA (US)

(72) Inventors: Madhavan Srinivasan Vajapeyam, San Diego, CA (US); Aleksandar Damnjanovic, Del Mar, CA (US); Durga Prasad Malladi, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 261 days.

(21) Appl. No.: 14/865,891

(22) Filed: Sep. 25, 2015

(65) Prior Publication Data

US 2016/0095018 A1 Mar. 31, 2016

Related U.S. Application Data

(60) Provisional application No. 62/056,914, filed on Sep. 29, 2014.

(51) Int. Cl.
*H04W 16/14* (2009.01)
*H04W 74/08* (2009.01)
(Continued)

(52) U.S. Cl.
CPC ............. *H04W 16/14* (2013.01); *H04L 47/27* (2013.01); *H04W 28/0278* (2013.01);
(Continued)

(58) Field of Classification Search
CPC combination set(s) only.
See application file for complete search history.

(56) References Cited

U.S. PATENT DOCUMENTS

| 2010/0105390 A1* | 4/2010 | Ishii | H04W 72/0406 |
| | | | 455/436 |
| 2012/0002596 A1* | 1/2012 | Kim | H04L 5/0057 |
| | | | 370/315 |

(Continued)

FOREIGN PATENT DOCUMENTS

| JP | 2009521892 A | 6/2009 |
| JP | 2014147116 A | 8/2014 |

(Continued)

OTHER PUBLICATIONS

ISA/EPO, International Search Report and Written Opinion of the International Searching Authority, Int'l Appl. No. PCT/US2015/052582, dated Mar. 16, 2016, European Patent Office, Rijswijk, NL, 30 pgs.

(Continued)

*Primary Examiner* — Xavier S Wong
(74) *Attorney, Agent, or Firm* — Dalei Dong; Holland & Hart LLP

(57) ABSTRACT

Techniques are described for wireless communication. One method includes winning a contention for access to an unlicensed radio frequency spectrum band, transmitting a request message upon winning the contention for access to the unlicensed radio frequency spectrum band, and receiving a response message over the unlicensed radio frequency spectrum band. The request message is transmitted by a user equipment (UE) on an enhanced physical random access channel (ePRACH), to access a cell that operates in the unlicensed radio frequency spectrum band. The response message is received in response to transmitting the request message.

29 Claims, 25 Drawing Sheets

(51) Int. Cl.
  *H04W 28/02*   (2009.01)
  *H04L 47/27*   (2022.01)
  *H04W 76/19*   (2018.01)

(52) U.S. Cl.
  CPC ... *H04W 74/0808* (2013.01); *H04W 74/0833* (2013.01); *H04W 76/19* (2018.02)

(56) References Cited

U.S. PATENT DOCUMENTS

| | | | |
|---|---|---|---|
| 2012/0039284 | A1 | 2/2012 | Barbieri et al. |
| 2013/0315158 | A1 | 11/2013 | Uemura et al. |
| 2014/0036889 | A1 | 2/2014 | Kim et al. |
| 2014/0098761 | A1* | 4/2014 | Lee ............ H04W 74/006 370/329 |
| 2014/0112289 | A1 | 4/2014 | Kim et al. |
| 2015/0057011 | A1* | 2/2015 | Di Girolamo ........ H04W 16/14 455/454 |
| 2015/0071200 | A1 | 3/2015 | Takeda et al. |
| 2015/0078335 | A1* | 3/2015 | Sivanesan ......... H04W 36/0079 370/331 |
| 2015/0085797 | A1* | 3/2015 | Ji ................ H04J 13/10 370/329 |
| 2015/0334751 | A1* | 11/2015 | Alanen .............. H04W 48/16 370/329 |
| 2016/0037352 | A1* | 2/2016 | Wei ................ H04W 72/0413 455/454 |
| 2016/0050667 | A1* | 2/2016 | Papasakellariou .... H04L 1/1822 370/329 |
| 2016/0219626 | A1* | 7/2016 | Martin .............. H04W 74/085 |
| 2017/0019930 | A1* | 1/2017 | Lee ................ H04W 72/0413 |
| 2017/0150517 | A1* | 5/2017 | Lu ................. H04W 72/1268 |
| 2019/0364605 | A1* | 11/2019 | Loehr .............. H04W 74/006 |

FOREIGN PATENT DOCUMENTS

| | | |
|---|---|---|
| KR | 20040011033 A | 2/2004 |
| KR | 20140034295 A | 3/2014 |
| WO | WO-2007078165 A1 | 7/2007 |
| WO | WO-2012109195 A2 | 8/2012 |
| WO | WO-2013116998 A1 | 8/2013 |
| WO | WO-2013126858 A1 | 8/2013 |
| WO | WO-2013141113 A1 | 9/2013 |
| WO | WO-2015023909 A2 | 2/2015 |

OTHER PUBLICATIONS

LG Electronics, "Candidate Solutions for LAA Operation," 3GPP TSG RAN WG1 Meeting #78bis, R1-144042, Ljubljana, Slovenia, Oct. 10, 2014, 6 pgs., 3rd Generation Partnership Project.

ISA/EPO, Partial International Search Report of the International Searching Authority, Int'l Appl. No. PCT/US2015/052582, dated Jan. 5, 2016, European Patent Office, Rijswijk, NL, 7 pgs.

Qualcomm Incorporated: "Solutions for Required Functionalities and Design Targets", 3GPP Draft; 3GPP TSG-RAN WG1#78bis, R1-144000, Solutions for Required Functionalities and Design Targets, 3rd Generation Partnership Project (3GPP), Mobile Competence Centre; 650, Route Des Lucioles; F-06921 Sophia-Antipolis, vol. RAN WG1, No. Ljubljana, Slovenia; Oct. 6, 2014-Oct. 10, 2014, Sep. 27, 2014 (Sep. 27, 2014), XP050869665, 5 Pages, Retrieved from the Internet: URL: http://www.3gpp.org/ftp/tsg_ran/WG1_RL1/TSGR1_78b/Docs/R1-144000.zip [retrieved on Sep. 27, 2014].

European Search Report—EP20206960—Search Authority—Munich—dated Apr. 29, 2021.

Partial European Search Report—EP20206960—Search Authority—Munich—dated Jan. 28, 2021.

* cited by examiner

TECHNIQUES FOR ACCESSING A CELL USING AN UNLICENSED RADIO FREQUENCY SPECTRUM BAND

CROSS REFERENCES

The present application for patent claims priority to U.S. Provisional Patent Application No. 62/056,914 by Vajapeyam et al., entitled, "Techniques for Accessing A Cell Using An Unlicensed Radio Frequency Spectrum Band," filed Sep. 29, 2014, assigned to the assignee hereof, which is hereby incorporated by reference in its entirety.

BACKGROUND

Field of the Disclosure

The present disclosure, for example, relates to wireless communication systems, and more particularly to techniques for accessing a cell using an unlicensed radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Some modes of communication may enable communications with a UE over an unlicensed radio frequency spectrum band, or over different radio frequency spectrum bands (e.g., a licensed radio frequency spectrum band or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity. An unlicensed radio frequency spectrum band can also provide wireless access for a venue, such as a stadium or hotel, that may not have access to a licensed radio frequency spectrum band.

Prior to gaining access to, and communicating over, an unlicensed radio frequency spectrum band, a base station or UE may perform a listen before talk (LBT) procedure to contend for access to the unlicensed radio frequency spectrum band. An LBT procedure may include performing a clear channel assessment (CCA) procedure to determine whether a channel of the unlicensed radio frequency spectrum band is available. When it is determined that the channel of the unlicensed radio frequency spectrum band is unavailable, a CCA procedure may be performed for the channel again at a later time.

SUMMARY

The present disclosure, for example, relates to one or more techniques for accessing a cell using an unlicensed radio frequency spectrum band. Under some conditions (e.g., when a cell operating in a licensed radio frequency spectrum band is not available), a UE may access a cell operating in an unlicensed radio frequency spectrum band as the UE's primary cell. One way to access a cell operating in an unlicensed radio frequency spectrum band is to use the random access procedure and radio resource control (RRC) connection setup procedure used for Long Term Evolution (LTE) communications or LTE-Advanced (LTE-A) communications. However, the LTE/LTE-A random access procedure and RRC connection setup procedure involves the transmission of four messages: 1) a random access channel (RACH) preamble transmitted from a UE to a base station; 2) a response transmitted from the base station to the UE; 3) an RRC connection request message transmitted from the UE to the base station; and 4) a channel contention resolution indication and connection configuration message transmitted from the base station to the UE. When transmitted over a licensed radio frequency spectrum band, the four messages are transmitted in a scheduled manner and with guaranteed availability of the licensed radio frequency spectrum band. However, when transmitted over an unlicensed radio frequency spectrum band, each of the four messages may require the performance of one or more CCA procedures to win contention for access to the unlicensed radio frequency spectrum band. Due to the uncertainty of contention for access to the unlicensed radio frequency spectrum band, transmission of the four messages over the unlicensed radio frequency spectrum band may be unreliable or sporadic. Transmission of the four messages over an unlicensed radio frequency spectrum band can also be slow or overhead intensive when compared to transmission of the four messages over a licensed radio frequency spectrum band. The present disclosure describes techniques for reducing the number of messages transmitted to access a cell operating in an unlicensed radio frequency spectrum band.

In an example, a method for wireless communication is described. In one example, the method may include winning a contention for access to an unlicensed radio frequency spectrum band, transmitting a request message upon winning the contention for access to the unlicensed radio frequency spectrum band, and receiving a response message over the unlicensed radio frequency spectrum band. The request message may be transmitted by a UE on an enhanced physical random access channel (ePRACH), to access a cell that operates in the unlicensed radio frequency spectrum band. The response message may be received in response to transmitting the request message.

In some examples of the method, the request message may include at least one of a connection setup request; a handover completion indication; a connection reestablishment request; a buffer status report; a device identifier; or a cause value. In some examples of the method, the response message may include at least one of a connection configuration message; a channel contention resolution indication; a scheduled uplink grant; a device identifier; or an indication of a timing adjustment. In some examples of the method, the ePRACH may be transmitted over the unlicensed radio frequency spectrum band. In some examples of the method, the request message may be an unscheduled request message.

In some examples, the method may include receiving, in a system information block, an indication of at least one time window for reception of the response message. In some examples, the method may include monitoring the unlicensed radio frequency spectrum band for the response message during at least one of the at least one time window. In some examples of the method, the indication of the at least one time window may include a first indication of at least one connection establishment time window and a second indication of at least one handover time window.

In some examples, the method may include receiving, in a system information block, a mapping of resource sets of the ePRACH to frequency-interlaced resource blocks. In some examples, the method may include selecting, from among the resource sets of the ePRACH, a resource set for transmitting the request message. In some examples, the method may include receiving, in the system information block, at least one indication of a transport block size for the ePRACH. In some examples, the method may include receiving, in the system information block, at least one power control parameter for the ePRACH.

In some examples, the method may include receiving, in a system information block, an indication of at least one subframe available to perform the transmitting. In some examples, the method may include transmitting a scheduled confirmation message in response to receiving the response message. In some examples, the method may include repeating the transmitting before receiving the response message.

In some examples of the method, the ePRACH may include at least one contention-based resource set. In some examples, the ePRACH may further include at least one dedicated resource set. In some examples, the request message may include a handover completion indication transmitted using one of the at least one dedicated resource set. In some examples, the request message may be transmitted in synchronization with a subframe boundary.

In an example, an apparatus for wireless communication is described. In one example, the apparatus may include means for winning a contention for access to an unlicensed radio frequency spectrum band, transmitting a request message upon winning the contention for access to the unlicensed radio frequency spectrum band, and receiving a response message. The request message may be transmitted by a UE on an ePRACH, to access a cell that operates in the unlicensed radio frequency spectrum band. The response message may be received over the unlicensed radio frequency spectrum band in response to transmitting the request message. In some examples, the apparatus may further include means for implementing one or more aspects of the method for wireless communication described above.

In an example, another apparatus for wireless communication is described. In one example, the apparatus may include a processor, and memory in electronic communication with the processor. The processor and memory may be configured to win a contention for access to an unlicensed radio frequency spectrum band, to transmit a request message upon winning the contention for access to the unlicensed radio frequency spectrum band, and to receive a response message. The request message may be transmitted by a UE on an ePRACH, to access a cell that operates in the unlicensed radio frequency spectrum band. The response message may be received over the unlicensed radio frequency spectrum band in response to transmitting the request message. In some examples, the instructions may also be executable by the processor to implement one or more aspects of the method for wireless communication described above.

In an example, a non-transitory computer-readable medium storing computer-executable code for wireless communication is described. In one example, the code may be executable by a processor to win a contention for access to an unlicensed radio frequency spectrum band, to transmit a request message upon winning the contention for access to the unlicensed radio frequency spectrum band, and to receive a response message. The request message may be transmitted by a UE on an ePRACH, to access a cell that operates in the unlicensed radio frequency spectrum band. The response message may be received over the unlicensed radio frequency spectrum band in response to transmitting the request message. In some examples, the code may also be used to implement one or more aspects of the method for wireless communication described above.

In an example, another method for wireless communication is described. In one example, the method may include transmitting a request message and receiving a response message. The request message may be transmitted by a UE on an ePRACH, without winning a contention for access to an unlicensed radio frequency spectrum band, to access a cell that operates in the unlicensed radio frequency spectrum band. The response message may be received over the unlicensed radio frequency spectrum band in response to transmitting the request message. In some examples of the method, the request message may be transmitted during a preconfigured uplink CET occasion.

In an example, another apparatus for wireless communication is described. In one example, the apparatus may include means for transmitting a request message and means for receiving a response message. The request message may be transmitted by a UE on an ePRACH, without winning a contention for access to an unlicensed radio frequency spectrum band, to access a cell that operates in the unlicensed radio frequency spectrum band. The response message may be received over the unlicensed radio frequency spectrum band in response to transmitting the request message. In some examples, the apparatus may further include means for implementing one or more aspects of the method for wireless communication described above.

In an example, another apparatus for wireless communication is described. In one example, the apparatus may include a processor, and memory in electronic communication with the processor. The processor and memory may be configured to transmit a request message and receive a response message. The request message may be transmitted by a UE on an ePRACH, without winning a contention for access to an unlicensed radio frequency spectrum band, to access a cell that operates in the unlicensed radio frequency spectrum band. The response message may be received over the unlicensed radio frequency spectrum band in response to transmitting the request message. In some examples, the instructions may also be executable by the processor to implement one or more aspects of the method for wireless communication described above.

In an example, a non-transitory computer-readable medium storing computer-executable code for wireless communication is described. In one example, the code may be executable by a processor to transmit a request message and receive a response message. The request message may be transmitted by a UE on an ePRACH, without winning a contention for access to an unlicensed radio frequency spectrum band, to access a cell that operates in the unlicensed radio frequency spectrum band. The response message may be received over the unlicensed radio frequency spectrum band in response to transmitting the request message. In some examples, the code may also be used to implement one or more aspects of the method for wireless communication described above.

In an example, another method for wireless communication is described. In one example, the method may include winning a contention for access to an unlicensed radio frequency spectrum band, receiving a first request message, and transmitting a response message. The first request message may be received by a base station on an ePRACH, from a first UE, to access a cell that operates in the unlicensed radio frequency spectrum band. The response message may be transmitted over the unlicensed radio frequency spectrum band, in response to winning the contention for access to the unlicensed radio frequency spectrum band and in response to receiving the first request message from the first UE.

In some examples of the method, the first request message may include at least one of a connection setup request; a handover completion indication; a connection establishment request; a buffer status report; a device identifier; or a cause value. In some examples of the method, the response message may include at least one of a connection configuration message; a channel contention resolution indication; a scheduled uplink grant; a device identifier; or an indication of a timing adjustment. In some cases, the ePRACH may be received over the unlicensed radio frequency spectrum band. In some examples, the method may include requesting from a source base station, between receiving the first request message and transmitting the response message, a context of the first UE.

In some examples, the method may include receiving a respective request message from at least one of a plurality of UEs, with each respective request message including a respective device identifier, and with the first request message including a first device identifier. In these examples, the method may further include resolving channel contention between the plurality of UEs in favor of the first UE, and including the first device identifier in the response message.

In an example, another apparatus for wireless communication is described. In one example, the apparatus may include means for winning a contention for access to an unlicensed radio frequency spectrum band, means for receiving a first request message, and means for transmitting a response message. The first request message may be received by a base station on an ePRACH, from a first UE, to access a cell that operates in the unlicensed radio frequency spectrum band. The response message may be transmitted over the unlicensed radio frequency spectrum band, in response to winning the contention for access to the unlicensed radio frequency spectrum band and in response to receiving the first request message from the first UE. In some examples, the apparatus may further include means for implementing one or more aspects of the method for wireless communication described above.

In an example, another apparatus for wireless communication is described. In one example, the apparatus may include a processor, and memory in electronic communication with the processor. The processor and memory may be configured to win a contention for access to an unlicensed radio frequency spectrum band, to receive a first request message, and to transmit a response message. The first request message may be received by a base station on an ePRACH, from a first UE, to access a cell that operates in the unlicensed radio frequency spectrum band. The response message may be transmitted over the unlicensed radio frequency spectrum band, in response to winning the contention for access to the unlicensed radio frequency spectrum band and in response to receiving the first request message from the first UE. In some examples, the instructions may also be executable by the processor to implement one or more aspects of the method for wireless communication described above.

In an example, a non-transitory computer-readable medium storing computer-executable code for wireless communication is described. In one example, the code may be executable by a processor to win a contention for access to an unlicensed radio frequency spectrum band, to receive a first request message, and to transmit a response message. The first request message may be received by a base station on an ePRACH, from a first UE, to access a cell that operates in the unlicensed radio frequency spectrum band. The response message may be transmitted over the unlicensed radio frequency spectrum band, in response to winning the contention for access to the unlicensed radio frequency spectrum band and in response to receiving the first request message from the first UE. In some examples, the code may also be used to implement one or more aspects of the method for wireless communication described above.

In an example, another method for wireless communication is described. In one example, the method may include receiving a first request message and transmitting a response message. The first request message may be received by a base station on an ePRACH, from a first UE, to access a cell that operates in an unlicensed radio frequency spectrum band. The response message may be transmitted over the unlicensed radio frequency spectrum band, in response to receiving the first request message from the first UE and without winning a contention for access to the unlicensed radio frequency spectrum band. In some examples of the method, the request message may be transmitted during a preconfigured downlink CET occasion.

In an example, another apparatus for wireless communication is described. In one example, the apparatus may include means for receiving a first request message and means for transmitting a response message. The first request message may be received by a base station on an ePRACH, from a first UE, to access a cell that operates in an unlicensed radio frequency spectrum band. The response message may be transmitted over the unlicensed radio frequency spectrum band, in response to receiving the first request message from the first UE and without winning a contention for access to the unlicensed radio frequency spectrum band. In some examples, the apparatus may further include means for implementing one or more aspects of the method for wireless communication described above.

In an example, another apparatus for wireless communication is described. In one example, the apparatus may include a processor, and memory in electronic communication with the processor. The processor and memory may be configured to receive a first request message and transmit a response message. The first request message may be received by a base station on an ePRACH, from a first UE, to access a cell that operates in an unlicensed radio frequency spectrum band. The response message may be transmitted over the unlicensed radio frequency spectrum band, in response to receiving the first request message from the first UE and without winning a contention for access to the unlicensed radio frequency spectrum band. In some examples, the instructions may also be executable by the processor to implement one or more aspects of the method for wireless communication described above.

In an example, another non-transitory computer-readable medium storing computer-executable code for wireless communication is described. In one example, the code may be executable by a processor to receive a first request message and transmit a response message. The first request message may be received by a base station on an ePRACH, from a first UE, to access a cell that operates in an unlicensed radio frequency spectrum band. The response message may be transmitted over the unlicensed radio frequency spectrum band, in response to receiving the first request message from the first UE and without winning a contention for access to the unlicensed radio frequency spectrum band. In some examples, the code may also be used to implement one or more aspects of the method for wireless communication described above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques are described in which an unlicensed radio frequency spectrum band is used for at least a portion of communications over a wireless communication system. In some examples, the unlicensed radio frequency spectrum band may be used for LTE/LTE-A communications. The unlicensed radio frequency spectrum band may be used in combination with, or independent from, a licensed radio frequency spectrum band. In some examples, the unlicensed radio frequency spectrum band may be a radio frequency spectrum band for which a device may need to contend for access because the radio frequency spectrum band is available, at least in part, for unlicensed use, such as Wi-Fi use.

With increasing data traffic in cellular networks that use a licensed radio frequency spectrum band, offloading of at least some data traffic to an unlicensed radio frequency spectrum band may provide a cellular operator (e.g., an operator of a public land mobile network (PLMN) or a coordinated set of base stations defining a cellular network, such as an LTE/LTE-A network) with opportunities for enhanced data transmission capacity. An unlicensed radio frequency spectrum band can also provide wireless access for a venue, such as a stadium or hotel, that may not have access to a licensed radio frequency spectrum band. As noted above, before communicating over the unlicensed radio frequency spectrum band, devices may perform an LBT procedure to gain access to the radio frequency spectrum band. Such an LBT procedure may include performing a CCA procedure (or extended CCA (eCCA) procedure) to determine whether a channel of the unlicensed radio frequency spectrum band is available. When it is determined that the channel of the unlicensed radio frequency spectrum band is available, a CUBS may be transmitted to reserve the channel. When it is determined that a channel is not available, a CCA procedure (or eCCA procedure) may be performed for the channel again at a later time.

As described in the present disclosure, a UE accessing a cell operating in an unlicensed radio frequency spectrum band, as a primary cell, may access the cell after transmitting one message and receiving one message, which may be more efficient than transmitting two messages and receiving two messages as is currently done to access an LTE/LTE-A cell operating in a licensed radio frequency spectrum band.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the techniques described may be performed in an order different from that described, and various steps may be added, omitted, or combined. Also, features described with respect to some examples may be combined in other examples.

Figure 1:
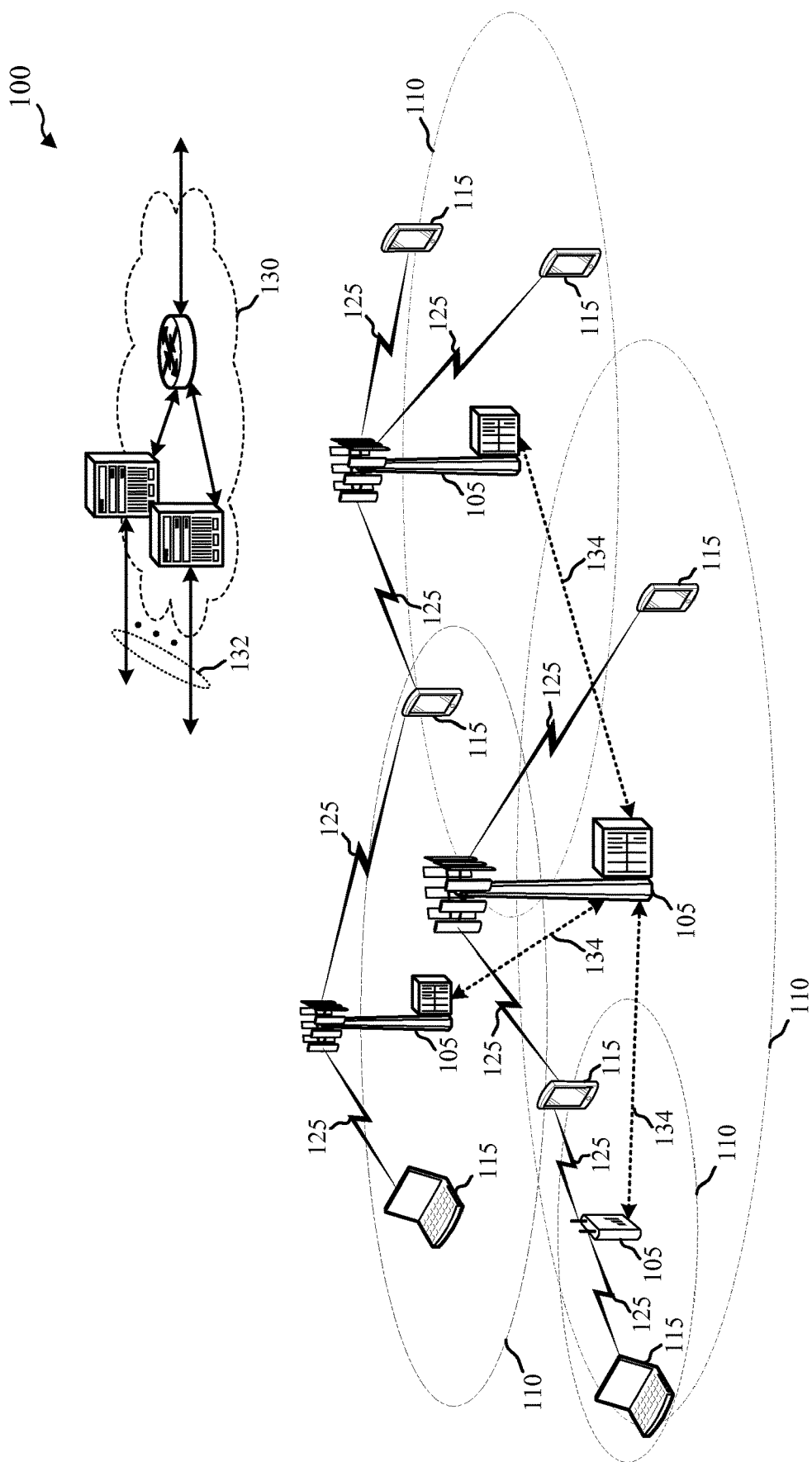
FIG. 1 illustrates an example of a wireless communication system, in accordance with various aspects of the disclosure.

FIG. 1 illustrates an example of a wireless communication system 100, in accordance with various aspects of the disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions from a UE 115 to a base station 105. The downlink transmissions may also be called forward link transmissions, while the uplink transmissions may also be called reverse link transmissions. In some examples, UL transmissions may include transmissions of uplink control information, which uplink control information may be transmitted over an uplink control channel (e.g., a physical uplink control channel (PUCCH) or enhanced PUCCH (ePUCCH)). The uplink control information may include, for example, acknowledgements or non-acknowledgements of downlink transmissions, or channel state information. UL transmissions may also include transmissions of data, which data may be transmitted over a physical uplink shared channel (PUSCH) or enhanced PUSCH (ePUSCH). UL transmissions may also include the transmission of a sounding reference signal (SRS) or enhanced SRS (eSRS), a physical random access channel (PRACH) or enhanced PRACH (ePRACH) (e.g., in a dual connectivity mode or the standalone mode described with reference to FIG. 2), or a scheduling request (SR) or enhanced SR (eSR) (e.g., in the standalone mode described with reference to FIG. 2). References in this disclosure to a PUCCH, a PUSCH, a PRACH, an SRS, or an SR are presumed to inherently include references to a respective ePUCCH, ePUSCH, ePRACH, eSRS, or eSR.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

The wireless communication system 100 may also or alternatively support operation over a licensed radio frequency spectrum band (e.g., a radio frequency spectrum band for which transmitting apparatuses may not contend for access because the radio frequency spectrum band is licensed to some users for some uses, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). Upon winning a contention for access to the unlicensed radio frequency spectrum band, a transmitting apparatus (e.g., a base station 105 or UE 115) may transmit one or more CUBS over the unlicensed radio frequency spectrum band. The CUBS may serve to reserve the unlicensed radio frequency spectrum by providing a detectable energy on the unlicensed radio frequency spectrum band. The CUBS may also serve to identify the transmitting apparatus or serve to synchronize the transmitting apparatus and a receiving apparatus.

A UE 115 may initiate a random access procedure to access, via a base station 105, a cell of the wireless communication system 100. A cell may be accessed as a primary cell (or primary serving cell) or as a secondary cell (or secondary serving cell). A cell may also be accessed over a licensed radio frequency spectrum band or an unlicensed radio frequency spectrum band, depending on the cell's configuration.

Figure 2:
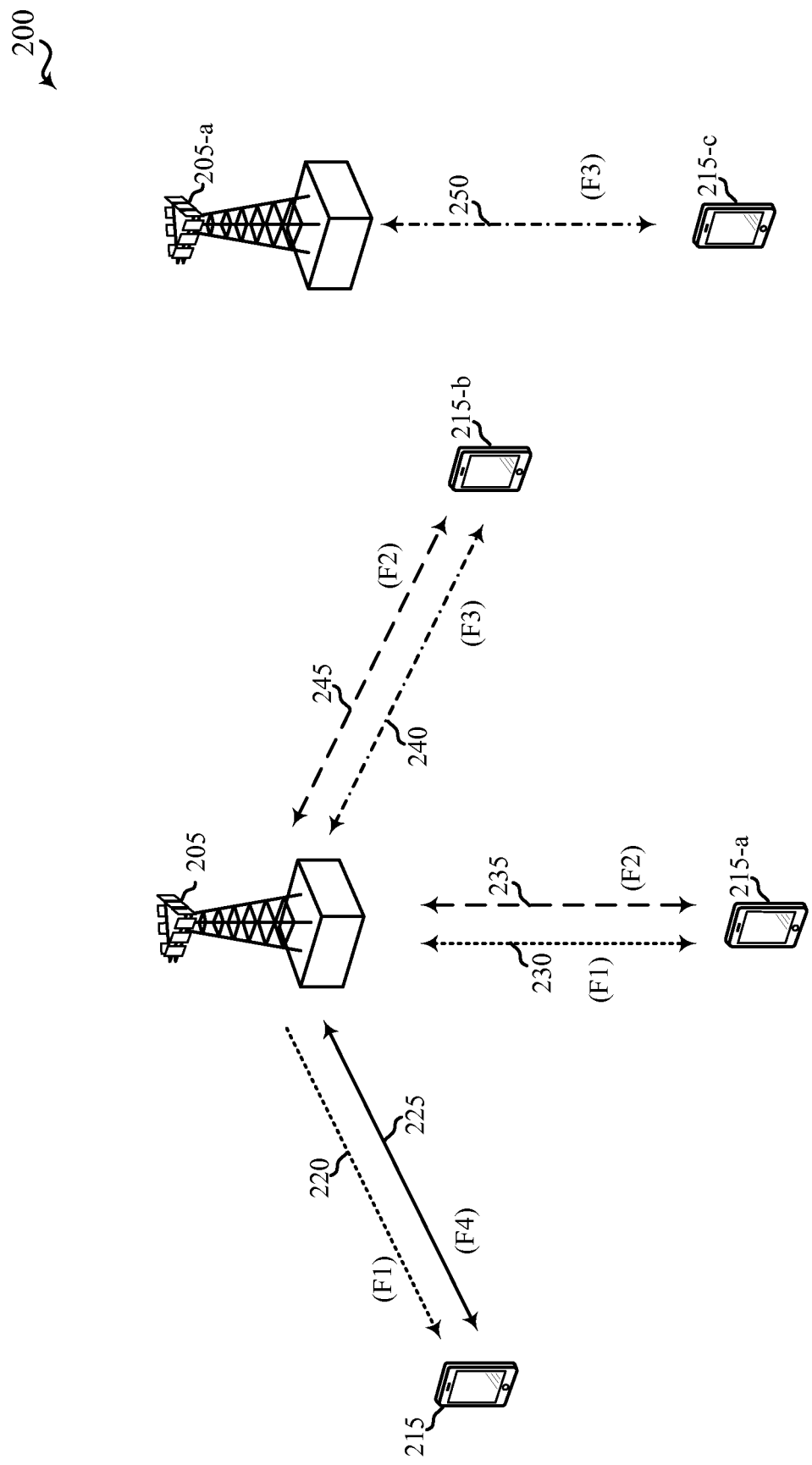
FIG. 2 shows a wireless communication system in which LTE/LTE-A may be deployed under different scenarios using an unlicensed radio frequency spectrum band, in accordance with various aspects of the present disclosure.

FIG. 2 shows a wireless communication system 200 in which LTE/LTE-A may be deployed under different scenarios using an unlicensed radio frequency spectrum band, in accordance with various aspects of the present disclosure. More specifically, FIG. 2 illustrates examples of a supplemental downlink mode, a carrier aggregation mode, and a standalone mode in which LTE/LTE-A is deployed using an unlicensed radio frequency spectrum band. The wireless communication system 200 may be an example of portions of the wireless communication system 100 described with reference to FIG. 1. Moreover, a first base station 205 and a second base station 205-a may be examples of aspects of one or more of the base stations 105 described with reference to FIG. 1, while a first UE 215, a second UE 215-a, a third UE 215-b, and a fourth UE 215-c may be examples of aspects of one or more of the UEs 115 described with reference to FIG. 1.

In the example of a supplemental downlink mode in the wireless communication system 200, the first base station 205 may transmit OFDMA waveforms to the first UE 215 using a downlink channel 220. The downlink channel 220 may be associated with a frequency F1 in an unlicensed radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a licensed radio frequency spectrum and needs to relieve some of the traffic or signaling congestion.

In one example of a carrier aggregation mode in the wireless communication system 200, the first base station 205 may transmit OFDMA waveforms to the second UE 215-a using a second bidirectional link 230 and may receive OFDMA waveforms, SC-FDMA waveforms, or resource block interleaved FDMA waveforms from the second UE 215-a using the second bidirectional link 230. The second bidirectional link 230 may be associated with the frequency F1 in the unlicensed radio frequency spectrum band. The first base station 205 may also transmit OFDMA waveforms to the second UE 215-a using a third bidirectional link 235 and may receive SC-FDMA waveforms from the second UE 215-a using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink described above, this scenario may occur with any service provider (e.g., MNO) that uses a licensed radio frequency spectrum and needs to relieve some of the traffic or signaling congestion.

In another example of a carrier aggregation mode in the wireless communication system 200, the first base station 205 may transmit OFDMA waveforms to the third UE 215-b using a fourth bidirectional link 240 and may receive OFDMA waveforms, SC-FDMA waveforms, or resource block interleaved waveforms from the third UE 215-b using the fourth bidirectional link 240. The fourth bidirectional link 240 may be associated with a frequency F3 in the unlicensed radio frequency spectrum band. The first base station 205 may also transmit OFDMA waveforms to the third UE 215-b using a fifth bidirectional link 245 and may receive SC-FDMA waveforms from the third UE 215-b using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a licensed radio frequency spectrum band and use an unlicensed radio frequency spectrum band for capacity offload.

As described above, one type of service provider that may benefit from the capacity offload offered by using LTE/LTE-A in an unlicensed radio frequency spectrum band is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum band (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). The carrier aggregation mechanisms supported when using an unlicensed radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-a may transmit OFDMA waveforms to the fourth UE 215-c using a bidirectional link 250 and may receive OFDMA waveforms, SC-FDMA waveforms, or resource block interleaved FDMA waveforms from the fourth UE 215-c using the bidirectional link 250. The bidirectional link 250 may be associated with the frequency F3 in the unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples, a transmitting apparatus such as one of the base stations 105, 205, or 205-a described with reference to FIG. 1 or 2, or one of the UEs 115, 215, 215-a, 215-b, or 215-c described with reference to FIG. 1 or 2, may use a gating interval to gain access to a channel of an unlicensed radio frequency spectrum band (e.g., to a physical channel of the unlicensed radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of an unlicensed radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the unlicensed radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

Figure 3:
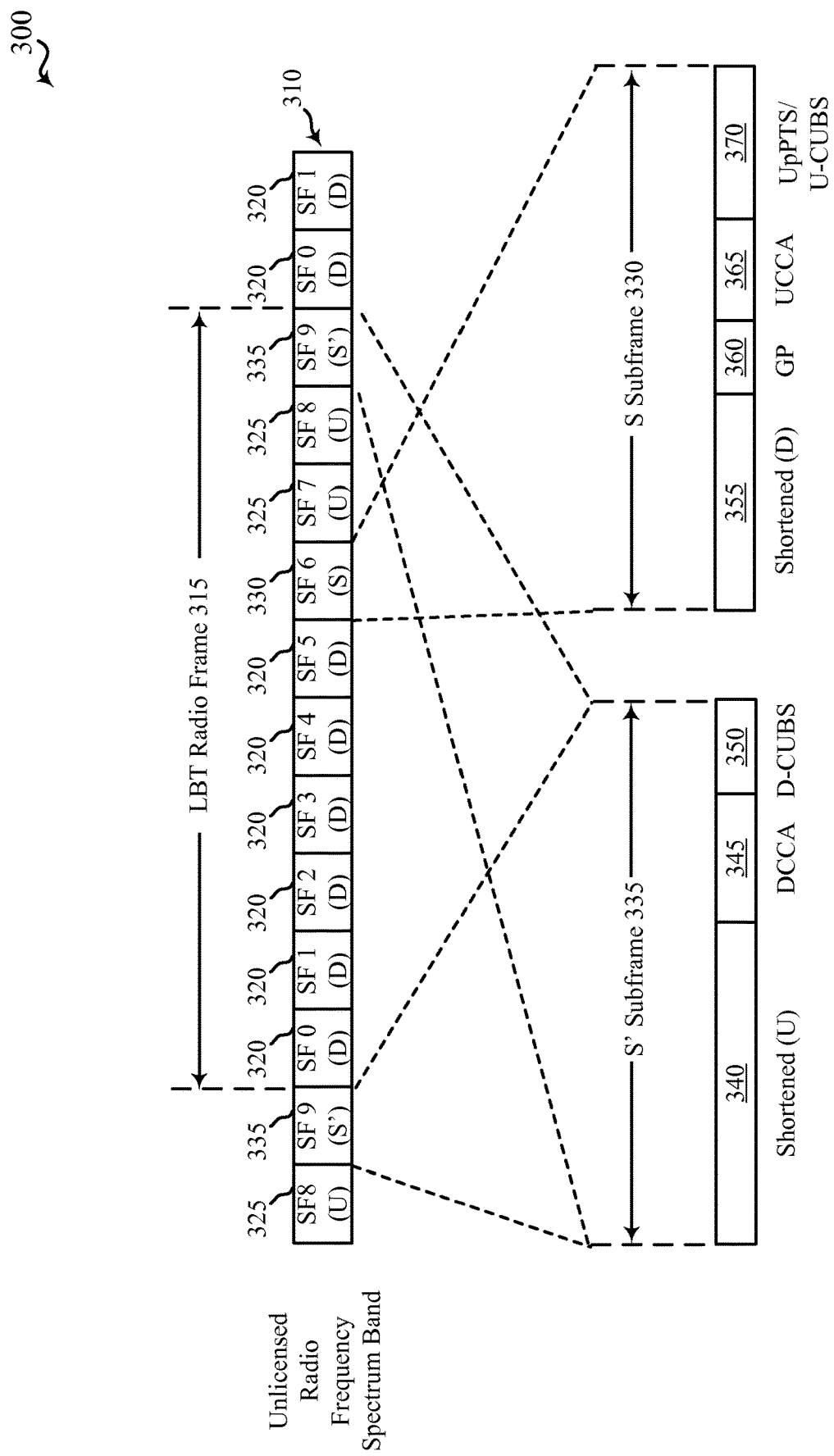
FIG. 3 shows an example of a wireless communication over an unlicensed radio frequency spectrum band, in accordance with various aspects of the present disclosure.

FIG. 3 shows an example 300 of a wireless communication 310 over an unlicensed radio frequency spectrum band, in accordance with various aspects of the present disclosure. In some examples, an LBT radio frame 315 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink subframes 320 and uplink subframes 325, while the S' subframe 335 may provide a transition between uplink subframes 325 and downlink subframes 320.

During the S' subframe 335, a downlink clear channel assessment (DCCA) procedure 345 may be performed by one or more base stations, such as one or more of the base stations 105, 205, or 205-*a* described with reference to FIG. 1 or 2, to reserve, for a period of time, a channel of the unlicensed radio frequency spectrum band over which the wireless communication 310 occurs. Following a successful DCCA procedure 345 by a base station, the base station may transmit a channel usage beacon signal (CUBS) (e.g., a downlink CUBS (D-CUBS 350)) to provide an indication to other base stations or apparatuses (e.g., UEs, Wi-Fi access points, etc.) that the base station has reserved the channel. In some examples, a D-CUBS 350 may be transmitted using a plurality of interleaved resource blocks. Transmitting a D-CUBS 350 in this manner may enable the D-CUBS 350 to occupy at least some percentage of the available frequency bandwidth of the unlicensed radio frequency spectrum band and satisfy one or more regulatory requirements (e.g., a requirement that transmissions over the unlicensed radio frequency spectrum band occupy at least 80% of the available frequency bandwidth). The D-CUBS 350 may in some examples take a form similar to that of an LTE/LTE-A CRS or a channel state information reference signal (CSI-RS). When the DCCA procedure 345 fails, the D-CUBS 350 may not be transmitted.

The S' subframe 335 may include a plurality of OFDM symbol periods (e.g., 14 OFDM symbol periods). A first portion of the S' subframe 335 may be used by a number of UEs as a shortened uplink (U) period. A second portion of the S' subframe 335 may be used for the DCCA procedure 345. A third portion of the S' subframe 335 may be used by one or more base stations that successfully contend for access to the channel of the unlicensed radio frequency spectrum band to transmit the D-CUBS 350.

During the S subframe 330, an uplink CCA (UCCA) procedure 365 may be performed by one or more UEs, such as one or more of the UEs 115, 215, 215-*a*, 215-*b*, or 215-*c* described above with reference to FIG. 1 or 2, to reserve, for a period of time, the channel over which the wireless communication 310 occurs. Following a successful UCCA procedure 365 by a UE, the UE may transmit an uplink CUBS (U-CUBS 370) to provide an indication to other UEs or apparatuses (e.g., base stations, Wi-Fi access points, etc.) that the UE has reserved the channel. In some examples, a U-CUBS 370 may be transmitted using a plurality of interleaved resource blocks. Transmitting a U-CUBS 370 in this manner may enable the U-CUBS 370 to occupy at least some percentage of the available frequency bandwidth of the unlicensed radio frequency spectrum band and satisfy one or more regulatory requirements (e.g., the requirement that transmissions over the unlicensed radio frequency spectrum band occupy at least 80% of the available frequency bandwidth). The U-CUBS 370 may in some examples take a form similar to that of an LTE/LTE-A CRS or CSI-RS. When the UCCA procedure 365 fails, the U-CUBS 370 may not be transmitted.

The S subframe 330 may include a plurality of OFDM symbol periods (e.g., 14 OFDM symbol periods). A first portion of the S subframe 330 may be used by a number of base stations as a shortened downlink (D) period 355. A second portion of the S subframe 330 may be used as a guard period (GP) 360. A third portion of the S subframe 330 may be used for the UCCA procedure 365. A fourth portion of the S subframe 330 may be used by one or more UEs that successfully contend for access to the channel of the unlicensed radio frequency spectrum band as an uplink pilot time slot (UpPTS) or to transmit the U-CUBS 370.

In some examples, the DCCA procedure 345 or the UCCA procedure 365 may include the performance of a single CCA procedure. In other examples, the DCCA procedure 345 or the UCCA procedure 365 may include the performance of an eCCA procedure. The eCCA procedure may include a random number of CCA procedures, and in some examples may include a plurality of CCA procedures.

Figure 4:
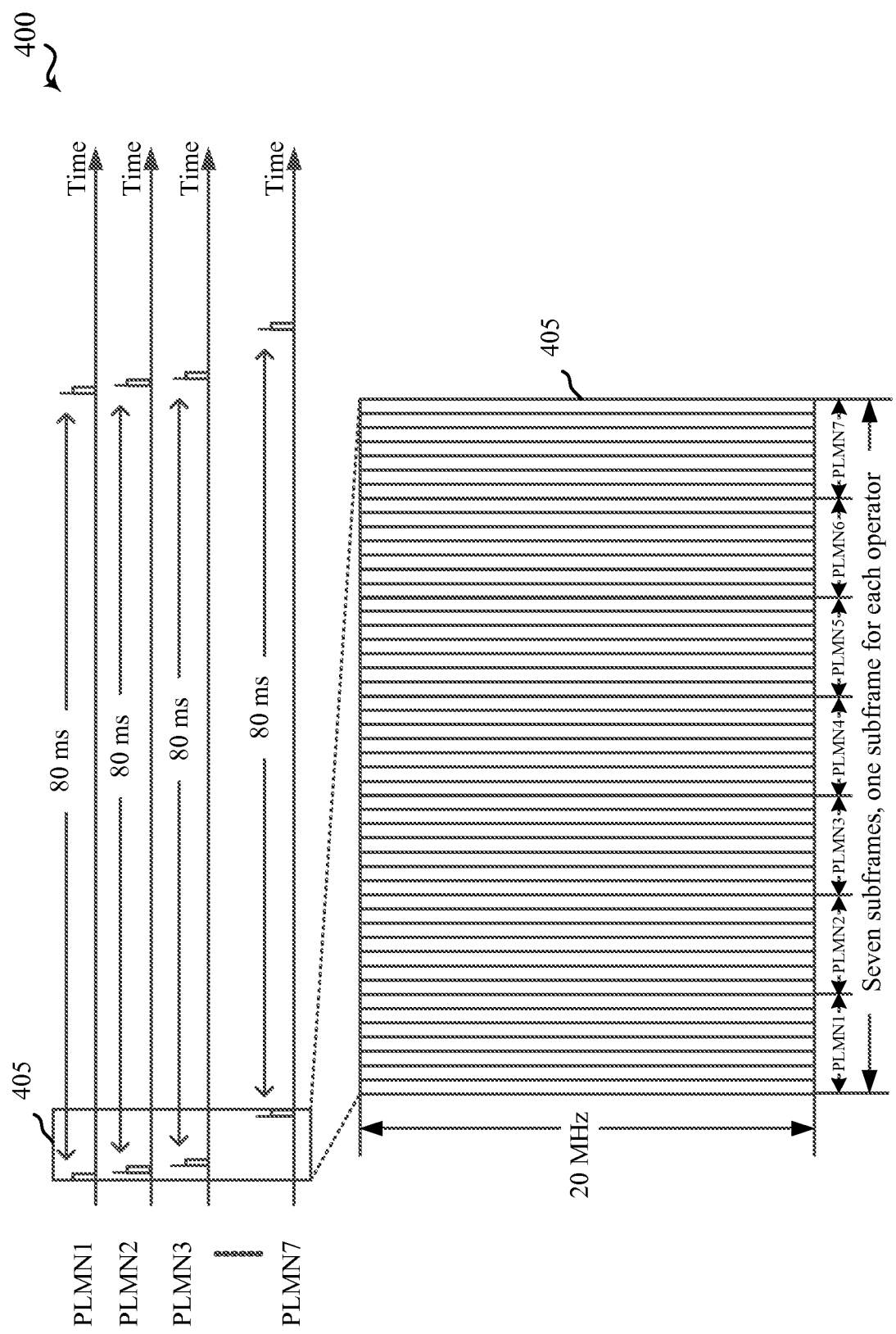
FIG. 4 shows an example of resource allocations for CCA-Exempt Transmissions (CETs) of synchronous operators in an unlicensed radio frequency spectrum band, in accordance with various aspects of the present disclosure.

FIG. 4 shows an example 400 of resource allocations for CCA-Exempt Transmissions (CETs) of synchronous operators in an unlicensed radio frequency spectrum band, in accordance with various aspects of the present disclosure. A CET may be made without winning a contention for access to the unlicensed radio frequency spectrum band and, in some examples, without performing a CCA (e.g., a DCCA or an uplink CCA (UCCA)). Instead, an operator may be exempted from performing a CCA for the purpose of transmitting a CET.

As shown, an allocation of resources 405 for CETs may be made, for example, once every eighty milliseconds (80 ms) or once every CET period, where the CET period may have a configurable periodicity. Each of a number of operators (e.g., different PLMNs) in the unlicensed radio frequency spectrum band may be provided a separate subframe (shown) or subframes (not shown) for transmitting CETs. A subframe in which a CET may be transmitted may be referred to as a preconfigured CET occasion. By way of example, FIG. 4 shows adjacent CET subframes for seven different operators (e.g., operators PLMN1, PLMN2, . . . , PLMN7). Such a CET transmission framework may be applicable (e.g., separately applicable) to downlink and/or uplink transmissions between a base station and a UE (e.g., in the form of preconfigured uplink CET (UCET) occasions or preconfigured downlink CET (DCET) occasions). In some examples, a CET occasion may be used by a wireless device (e.g., a UE) for transmitting uplink control information.

Figure 5:
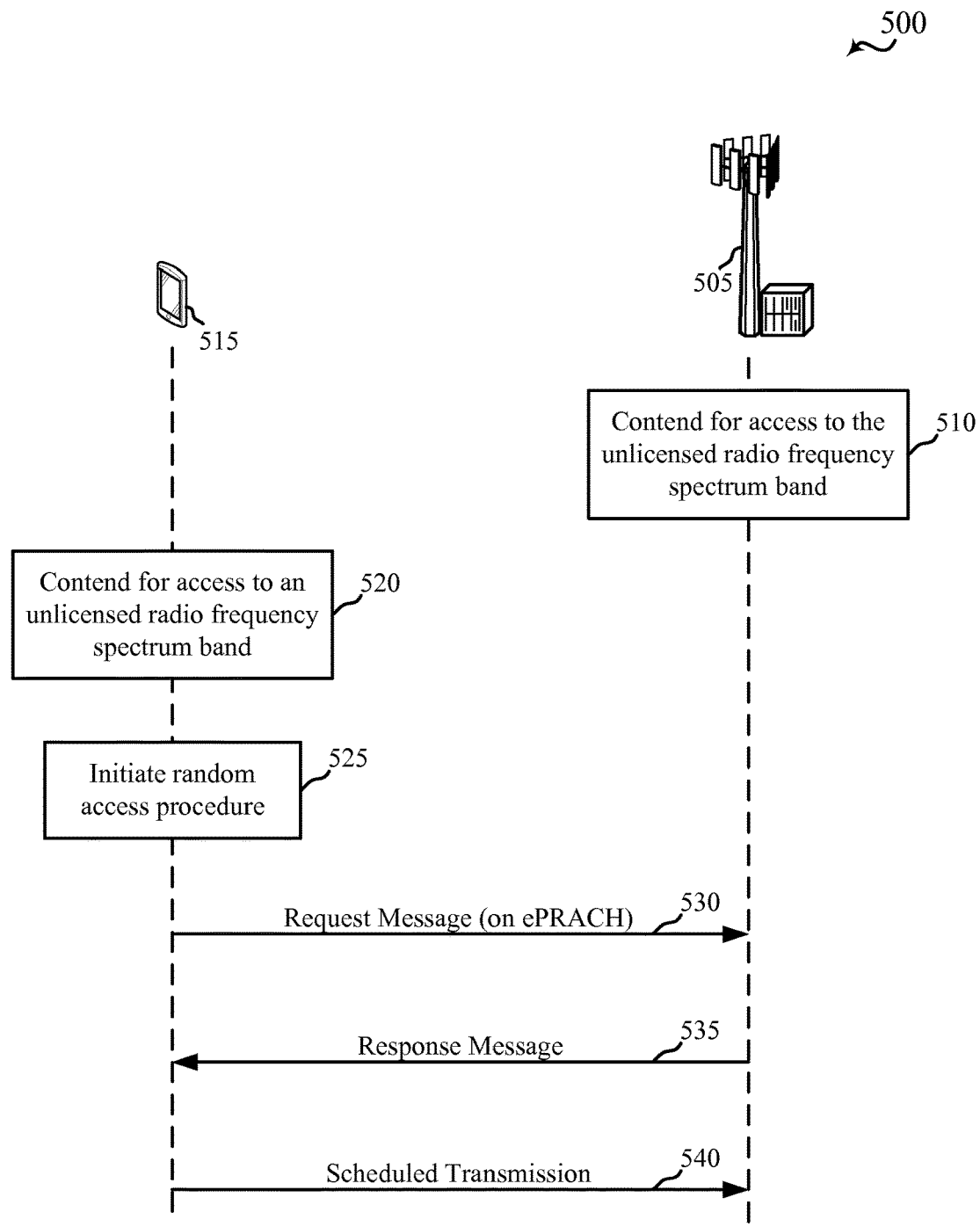
FIG. 5 shows a message flow between a UE and a base station, in accordance with various aspects of the present disclosure.

FIG. 5 shows a message flow 500 between a UE 515 and a base station 505, in accordance with various aspects of the present disclosure. In some examples, the UE 515 may be an example of aspects of one or more of the UEs 115, 215, 215-*a*, 215-*b*, or 215-*c* described with reference to FIG. 1 or 2. In some examples, the base station 505 may be an example of aspects of one or more of the base stations 105, 205, or 205-*a* described with reference to FIG. 1 or 2. The base station 505 may be part of a cell that operates in an unlicensed radio frequency spectrum band, and messages may be transmitted between the UE 515 and the base station 505 over the unlicensed radio frequency spectrum band (and optionally, over a licensed radio frequency spectrum band).

As shown in FIG. 5, the base station 505 may contend for access to the unlicensed radio frequency spectrum band at block 510. In some examples, the base station 505 may contend for access to the unlicensed radio frequency spectrum band and, upon winning contention for access to the unlicensed radio frequency spectrum band, reserve the unlicensed radio frequency spectrum band for an LBT radio frame (e.g., for an LBT radio frame such as the LBT radio frame 315 described with reference to FIG. 3.

In some examples, the base station 505 may provide an indication of at least one subframe available for UEs to transmit a request message on an enhanced physical random access channel (ePRACH). The base station 505 may provide the indication during a downlink subframe subject to the base station's winning contention for access to the unlicensed radio frequency spectrum band, or during a preconfigured downlink CET occasion, but in either example may be transmitted over the unlicensed radio frequency spectrum band. In some examples, the indication of the at least one subframe available to transmit a request message may be advertised by the base station 505 in a system information block (SIB).

At block 520, the UE 515 may contend for access to an unlicensed radio frequency spectrum band. The UE 515 may contend for access to the unlicensed radio frequency spectrum band for many reasons, but in some examples may contend for access to the unlicensed radio frequency spectrum band for the purpose of transmitting a connection setup request, a handover completion indication, a connection reestablishment request, or a buffer status report. In some examples, the UE 515 may contend for access to the unlicensed radio frequency spectrum band for a subframe identified by the indication of at least one subframe available for UEs to transmit a request message, as advertised by the base station 505.

In some examples, the contention procedure performed by the UE 515 at block 520 may be performed before, during, or after the contention procedure performed by the base station 505 at block 510, and the two contention procedures need not be linked to, or dependent on, one another.

Upon winning contention for access to the unlicensed radio frequency spectrum band at block 520, the UE 515 may initiate a random access procedure at block 525. As part of initiating the random access procedure, the UE 515 may transmit a request message 530 on an ePRACH. In some examples, the request message 530 may be transmitted on the ePRACH on signaling radio bearer 0 (SRB0) or SRB1. The request message 530 may be transmitted to access the cell which the base station 505 serves. In some examples, the request message 530 may be an unscheduled request message. In some examples, the request message 530 may be transmitted over the unlicensed radio frequency spectrum band. In some examples, the request message 530 may include a connection setup request (e.g., a radio resource control (RRC) request), a handover completion indication (e.g., an RRC connection reconfiguration complete indication), a connection reestablishment request (e.g., an RRC connection reestablishment request), a buffer status report (BSR), a device identifier, or a cause value (e.g., a reason why a cell is being accessed). Each of the handover completion indication and the BSR may include an explicit or implicit request for an uplink grant. The device identifier may include, for example, a UE identifier (UE ID), a non-access stratum identifier (NAS ID), a cell radio network temporary identifier (C-RNTI), or a random number.

When the request message 530 is transmitted in a connection setup or connection reestablishment context, the request message 530 may be transmitted on a contention-based resource set of the ePRACH (e.g., a set or resources on which a plurality of UEs may transmit the same request message). When the request message 530 is transmitted in a handover completion context, the request message 530 may be transmitted on a dedicated resource set of the ePRACH.

In some examples, the request message 530 may be transmitted in synchronization with a subframe boundary, during a subframe identified by the indication of the at least one subframe available for UEs to transmit a request message. In some examples, the request message 530 may be transmitted on a resource set of the ePRACH having a fixed transport block (TB) size. The fixed TB size may be advertised by the base station 505 in a SIB transmitted over the unlicensed radio frequency spectrum band. In some examples, the base station 505 may configure multiple TBs. The base station 505 may also advertise (e.g., in the SIB) a mapping of resource sets of the ePRACH to frequency-interlaced resource blocks. The resource mapping may include, for example, an indication of aggregated interlaces or a number of subframes (e.g., for bundled transmissions). The UE 515 may select, from among the resource sets of the ePRACH, a resource set for transmitting the request message 530. The combination of a resource set and TB size may be used by the UE 515 to determine a modulation and coding scheme (MCS) for transmitting the request message 530. As a result, the base station 505 may not need to signal or advertise an MCS.

In some examples, the request message 530 may be retransmitted in accordance with automated repeat request (ARQ) procedures rather than hybrid ARQ (HARQ) procedures (e.g., the UE 515 may retransmit the request message 530 without first receiving HARQ feedback from the base station 505).

In some examples, the request message 530 may be transmitted during a preconfigured uplink CET occasion. In these examples, the request message 530 may be transmitted even when the UE 515 does not win contention for access to the unlicensed radio frequency spectrum band at block 520.

In response to transmitting the request message 530, the UE 515 may continue the random access procedure by monitoring for a response message 535. The UE 515 may receive the response message 535 (e.g., an enhanced random access response (eRAR)) over the unlicensed radio frequency spectrum band. The response message 535 may include, for example, a connection configuration message (e.g., an RRC response), a channel contention resolution indication, a scheduled uplink grant (including, in some examples, an MCS), a device identifier, or an indication of a timing adjustment. The response message may be addressed to a random access radio network temporary identifier (RA-RNTI). In some examples, the response message 535 may include a layer two (L2) message (e.g., a random access response (RAR)) or a layer three (L3) message (e.g., an RRC configuration). In some examples, the response message 535 may be received in accordance with HARQ procedures.

In some examples, the base station 505 may transmit the response message 535 after contending for access to the unlicensed radio frequency spectrum band at block 510, and upon winning contention for access to the unlicensed radio frequency spectrum band. Alternatively, the base station 505 may transmit the response message 535 over the unlicensed radio frequency spectrum band during a preconfigured downlink CET occasion. In some examples, the response message 535 may be transmitted by the base station 505 and received by the UE 515 within a time window, such as a connection establishment time window (e.g., in the context of a connection setup or connection reestablishment) or a handover time window (e.g., in the context of a handover completion). The response message 535 may also be transmitted at a power indicated by at least one power control parameter for the ePRACH, which power control parameter may differ from a power control parameter used for an enhanced physical uplink shared channel (ePUSCH). The time window (or windows) and at least one power control parameter may be indicated by the base station 505 in a SIB. In some examples, a time window may be indicated in terms of a delay following the UE's transmission of the request message 530.

Following receipt of the response message 535, the UE 515 may transmit a scheduled transmission 540 over the unlicensed radio frequency spectrum band. The scheduled transmission 540 may be transmitted in accordance with an uplink grant received as part of the response message 535. In some examples, the scheduled transmission 540 may include a scheduled confirmation message (e.g., an RRC confirmation) or a NAS service request.

Figure 6:
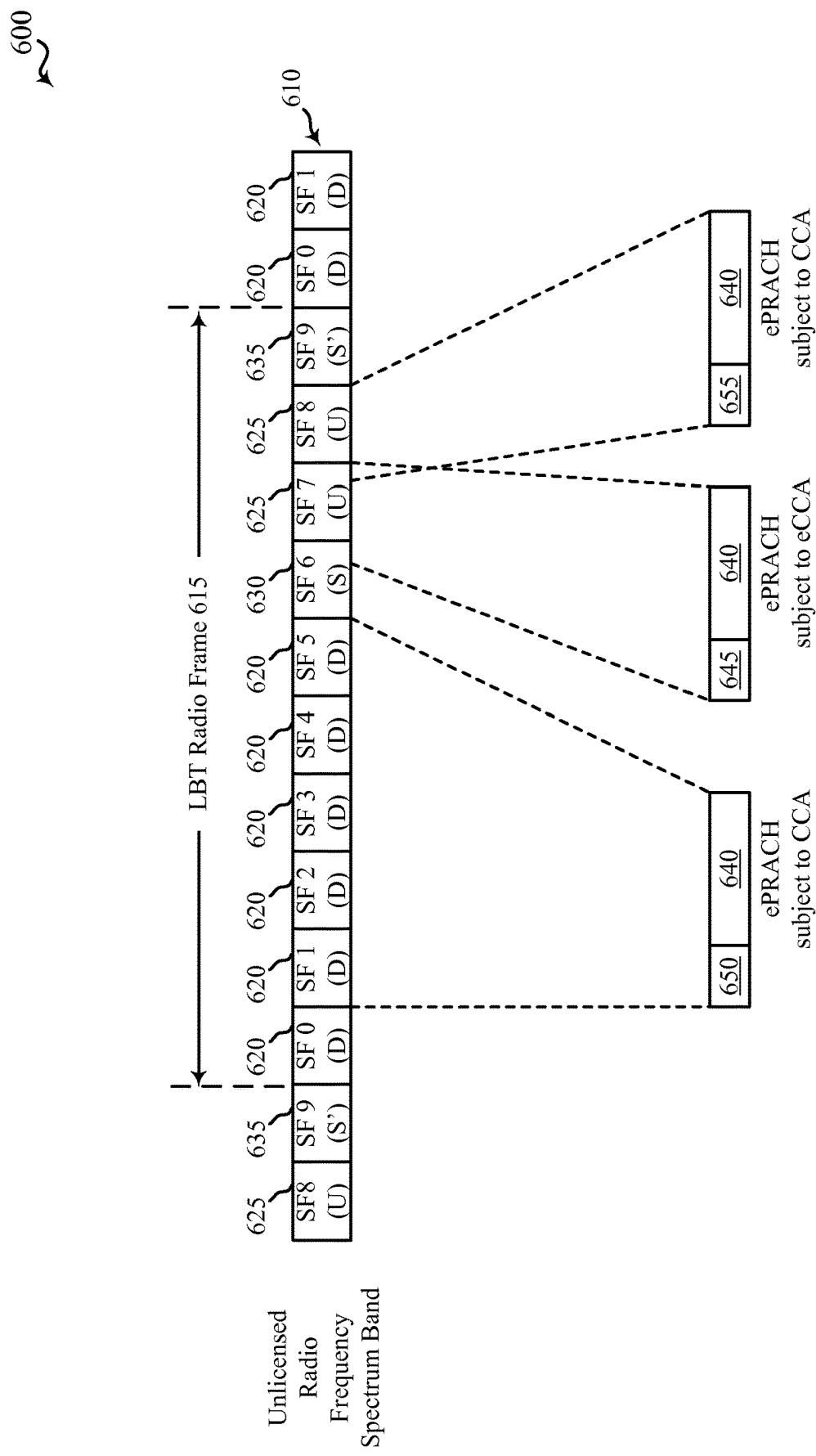
FIG. 6 shows an example of a wireless communication over an unlicensed radio frequency spectrum band, in accordance with various aspects of the present disclosure.

FIG. 6 shows an example 600 of a wireless communication 610 over an unlicensed radio frequency spectrum band, in accordance with various aspects of the present disclosure. In some examples, the wireless communication 610 may include an LBT radio frame 615 configured similarly to the LBT radio frame 315 described with reference to FIG. 3. As shown, the LBT radio frame 615 may include a number of downlink (D) subframes 620, a number of uplink (U) subframes 625, an S subframe 630, and an S' subframe 635. The S subframe 630 may provide a transition between downlink subframes 620 and uplink subframes 625, while the S' subframe 635 may provide a transition between uplink subframes 625 and downlink subframes 620.

In some examples, one or more aspects of the LBT radio frame 615 may be advertised by a base station, such as the base station 105, 205, 205-a, or 505 described with reference to FIG. 1, 2, or 5. For example, a base station may advertise which subframe or subframes of the LBT radio frame 615 are available to transmit a request message to the base station on an ePRACH. In this manner, a base station may prohibit the transmission of request messages on an ePRACH during some subframes, even when a UE is able to win contention for access to the unlicensed radio frequency spectrum band. In the LBT radio frame 615 shown in FIG. 6, a base station may be configured to perform an eCCA, when necessary, during subframe 9 (SF 9). A base station may therefore prohibit the transmission of request messages on an ePRACH during subframe 9. A base station may also prohibit the transmission of request messages on an ePRACH in subframes where a primary synchronization signal (PSS) or a secondary synchronization signal (SSS) may be transmitted; or, when operating in a time-division duplexing mode, a base station may prohibit the transmission of request messages on an ePRACH during downlink-only subframes. In some examples, the subframes of the LBT radio frame 615 which a base station may advertise as available to transmit a request message on an ePRACH may include: downlink subframes in which the base station is not scheduled to transmit (i.e., downlink subframes in which the base station is inactive), uplink subframes, or uplink CET subframes (which uplink CET subframe may coincide with uplink subframes occurring every Nth subframe, where N is an integer).

In some examples, a UE needing to transmit a request message on an ePRACH 640 may be configured to perform a first CCA or an eCCA 645, as necessary, to contend for access to the unlicensed radio frequency spectrum band during a first uplink subframe 625 following a shortened downlink subframe (e.g., during subframe 7 (SF 7)). However, a UE needing to transmit a request on an ePRACH may be configured to perform a second CCA 650 or a third CCA 655 to contend for access to the unlicensed radio frequency spectrum band during other subframes available to transmit the request message (e.g., during subframe 8 (SF 8) or one of subframes 1 through 5 (SF 1, SF 2, SF 3, SF 4, or SF 5)). Regardless of whether a CCA or an eCCA is performed to win contention for access to the unlicensed radio frequency spectrum band, UCUBS may be transmitted between a time of winning contention for access to the unlicensed radio frequency spectrum band and a next subframe boundary.

Figure 7:
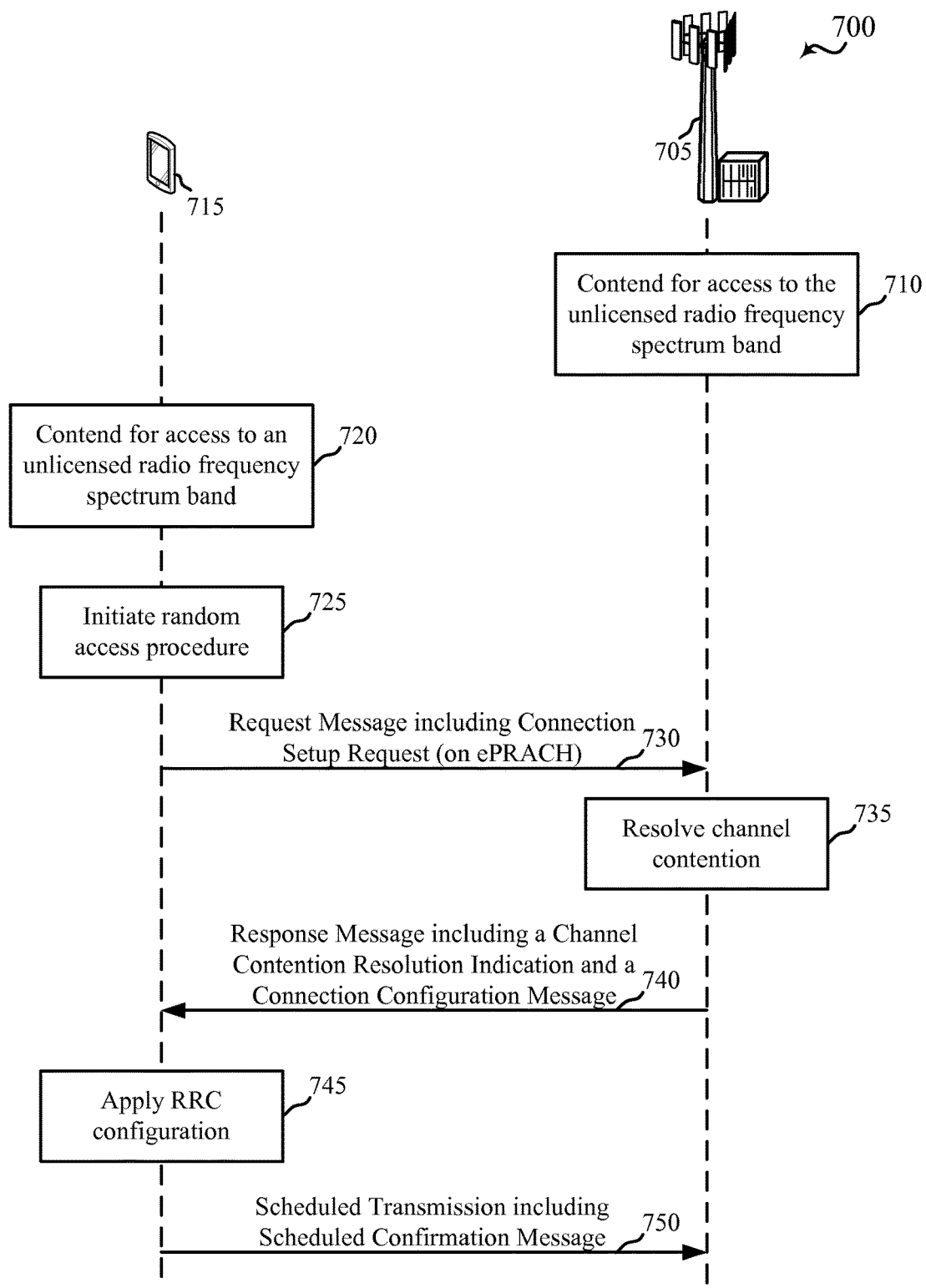
FIG. 7 shows a message flow between a UE and a base station during a connection setup, in accordance with various aspects of the present disclosure.

FIG. 7 shows a message flow 700 between a UE 715 and a base station 705 during a connection setup, in accordance with various aspects of the present disclosure. The message flow 700 may be an example of the message flow 500 described with reference to FIG. 5. In some examples, the UE 715 may be an example of aspects of one or more of the UEs 115, 215, 215-a, 215-b, 215-c, or 515 described with reference to FIG. 1, 2, or 5. In some examples, the base station 705 may be an example of aspects of one or more of the base stations 105, 205, 205-a, or 505 described with reference to FIG. 1, 2, or 5. The base station 705 may be part of a cell that operates in an unlicensed radio frequency spectrum band, and messages may be transmitted between the UE 715 and the base station 705 over the unlicensed radio frequency spectrum band (and optionally, over a licensed radio frequency spectrum band).

As shown in FIG. 7, the base station 705 may contend for access to the unlicensed radio frequency spectrum band at block 710. In some examples, the base station 705 may contend for access to the unlicensed radio frequency spectrum band and, upon winning contention for access to the unlicensed radio frequency spectrum band, reserve the unlicensed radio frequency spectrum band for an LBT radio frame (e.g., for an LBT radio frame such as the LBT radio frame 315 described with reference to FIG. 3.

In some examples, the base station 705 may provide an indication of at least one subframe available for UEs to transmit a request message on an ePRACH. The base station 705 may provide the indication during a downlink subframe subject to the base station's winning contention for access to the unlicensed radio frequency spectrum band, or during a preconfigured downlink CET occasion, but in either example may be transmitted over the unlicensed radio frequency spectrum band. In some examples, the indication of the at least one subframe available to transmit a request message may be advertised by the base station 705 in a SIB.

At block 720, the UE 715 may contend for access to an unlicensed radio frequency spectrum band for the purpose of transmitting a connection setup request. In some examples, the UE 715 may contend for access to the unlicensed radio frequency spectrum band for a subframe identified by the indication of at least one subframe available for UEs to transmit a request message, as advertised by the base station 705.

In some examples, the contention procedure performed by the UE 715 at block 720 may be performed before, during, or after the contention procedure performed by the base station 705 at block 710, and the two contention procedures need not be linked to, or dependent on, one another.

Upon winning contention for access to the unlicensed radio frequency spectrum band at block 720, the UE 715 may initiate a random access procedure at block 725. As part of initiating the random access procedure, the UE 715 may transmit a request message 730 on an ePRACH. In some examples, the request message 730 may be an example of the request message 530 described with reference to FIG. 5. In some examples, the request message 730 may be transmitted on the ePRACH on SRB0 or SRB1. The request message 730 may be transmitted to access the cell to which the base station 705 belongs. In some examples, the request message 730 may be an unscheduled request message. In some examples, the request message 730 may be transmitted over the unlicensed radio frequency spectrum band. In some examples, the request message 730 may include a connection setup request (e.g., an RRC request), a device identifier, and a cause value. The device identifier may include, for example, a UE ID, a NAS ID, or a random number. The request message 730 may be transmitted on a contention-based resource set of the ePRACH.

In some examples, the request message 730 may be transmitted in synchronization with a subframe boundary, during a subframe identified by the indication of the at least one subframe available for UEs to transmit a request message.

In some examples, the request message 730 may be transmitted during a preconfigured uplink CET occasion. In these examples, the request message 730 may be transmitted even when the UE 715 does not win contention for access to the unlicensed radio frequency spectrum band at block 720.

At block 735, and upon receiving the request message 730 along with request messages from other UEs, the base station 705 may resolve contention for access to the ePRACH.

In response to transmitting the request message 730, the UE 715 may continue the random access procedure by monitoring for a response message 740. In some examples, the response message 740 may be an example of the response message 535 described with reference to FIG. 5. The UE 715 may receive the response message 740 (e.g., an eRAR) over the unlicensed radio frequency spectrum band. The response message 740 may include, for example, a channel contention resolution indication (e.g., a contention resolution ID that echoes the device ID in the request message 730) and a connection configuration message (e.g., an RRC response), a device identifier, or an indication of a timing adjustment. The response message may be addressed to an RA-RNTI. In some examples, the response message 740 may include an L2 message (e.g., a timing adjustment, a C-RNTI, and a contention resolution ID) or an L3 message (e.g., an RRC configuration).

In some examples, the base station 705 may transmit the response message 740 after contending for access to the unlicensed radio frequency spectrum band at block 710, and upon winning contention for access to the unlicensed radio frequency spectrum band. Alternatively, the base station 705 may transmit the response message 740 over the unlicensed radio frequency spectrum band during a preconfigured downlink CET occasion. In some examples, the response message 740 may be transmitted by the base station 705 and received by the UE 715 within a time window, such as a connection establishment time window. The response message 740 may also be transmitted at a power indicated by at least one power control parameter for the ePRACH, which power control parameter may differ from a power control parameter used for an ePUSCH.

Following receipt of the response message 740, the UE 715 may apply a received RRC configuration at block 745 and transmit a scheduled transmission 750 over the unlicensed radio frequency spectrum band. The scheduled transmission 750 may be transmitted in accordance with an uplink grant received as part of the response message 740. In some examples, the scheduled transmission 750 may include a scheduled confirmation message (e.g., an RRC confirmation) or a NAS service request.

Figure 8:
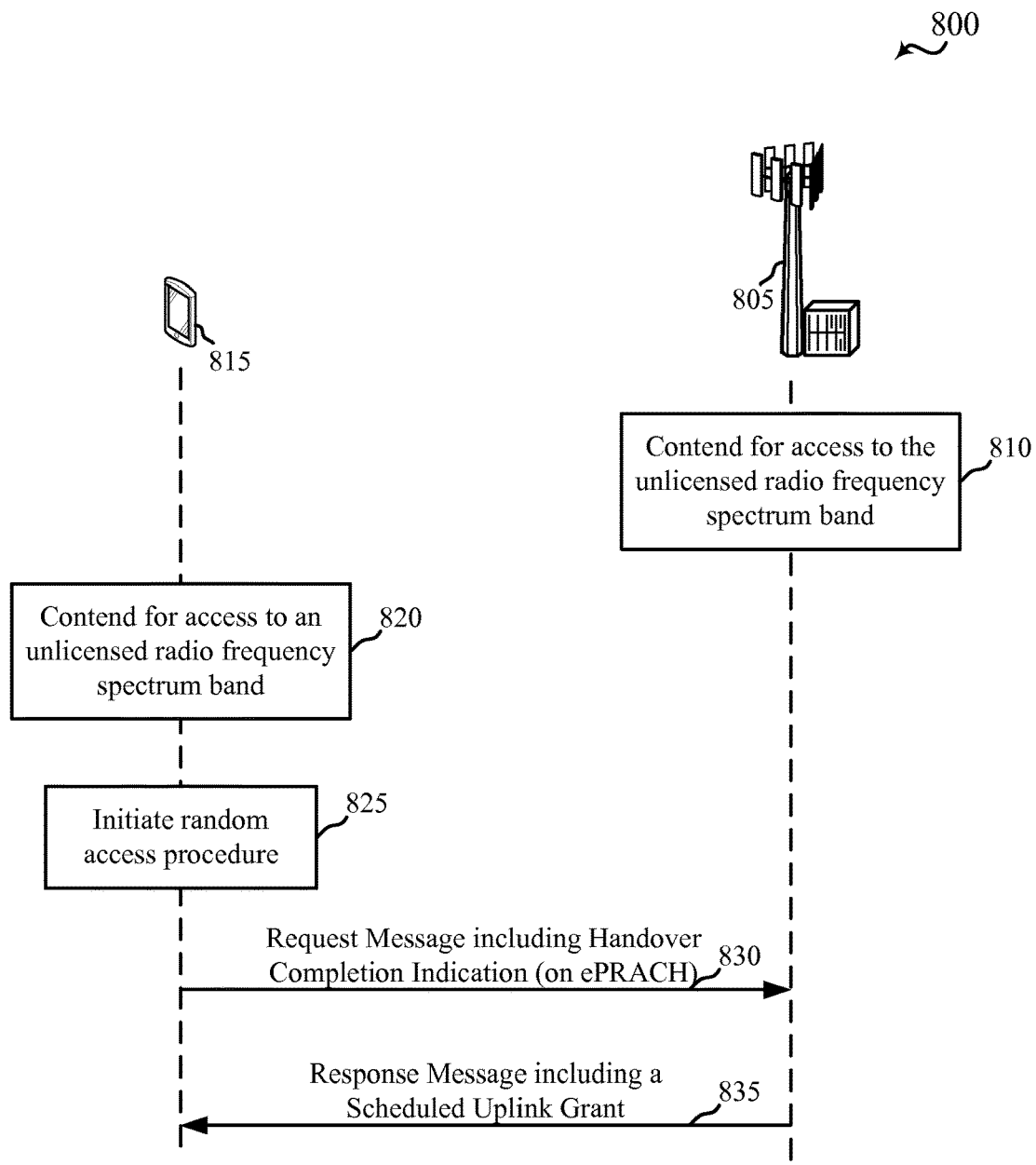
FIG. 8 shows a message flow between a UE and a base station during a handover completion, in accordance with various aspects of the present disclosure.

FIG. 8 shows a message flow 800 between a UE 815 and a base station 805 during a handover completion, in accordance with various aspects of the present disclosure. The message flow 800 may be an example of the message flow 500 described with reference to FIG. 5. In some examples, the UE 815 may be an example of aspects of one or more of the UEs 115, 215, 215-*a*, 215-*b*, 215-*c*, or 515 described with reference to FIG. 1, 2, or 5. In some examples, the base station 805 may be an example of aspects of one or more of the base stations 105, 205, 205-*a*, 505, or 705 described with reference to FIG. 1, 2, 5, or 7. The base station 805 may be part of a cell that operates in an unlicensed radio frequency spectrum band, and messages may be transmitted between the UE 815 and the base station 805 over the unlicensed radio frequency spectrum band (and optionally, over a licensed radio frequency spectrum band).

As shown in FIG. 8, the base station 805 may contend for access to the unlicensed radio frequency spectrum band at block 810. In some examples, the base station 805 may contend for access to the unlicensed radio frequency spectrum band and, upon winning contention for access to the unlicensed radio frequency spectrum band, reserve the unlicensed radio frequency spectrum band for an LBT radio frame (e.g., for an LBT radio frame such as the LBT radio frame 315 described with reference to FIG. 3.

In some examples, the base station 805 may provide an indication of at least one subframe available for UEs to transmit a request message on an ePRACH. The base station 805 may provide the indication during a downlink subframe subject to the base station's winning contention for access to the unlicensed radio frequency spectrum band, or during a preconfigured downlink CET occasion, but in either example may be transmitted over the unlicensed radio frequency spectrum band. In some examples, the indication of the at least one subframe available to transmit a request message may be advertised by the base station 805 in a SIB.

At block 820, the UE 815 may contend for access to an unlicensed radio frequency spectrum band for the purpose of transmitting a handover completion indication. In some examples, the UE 815 may contend for access to the unlicensed radio frequency spectrum band for a subframe identified by the indication of at least one subframe available for UEs to transmit a request message, as advertised by the base station 805.

In some examples, the contention procedure performed by the UE 815 at block 820 may be performed before, during, or after the contention procedure performed by the base station 805 at block 810, and the two contention procedures need not be linked to, or dependent on, one another.

Upon winning contention for access to the unlicensed radio frequency spectrum band at block 820, the UE 815 may initiate a random access procedure at block 825. As part of initiating the random access procedure, the UE 815 may transmit a request message 830 on an ePRACH. In some examples, the request message 830 may be an example of the request message 530 described with reference to FIG. 5. In some examples, the request message 830 may be transmitted on the ePRACH on SRB0 or SRB1. The request message 830 may be transmitted to access the cell to which the base station 805 belongs. In some examples, the request message 830 may be an unscheduled request message. In some examples, the request message 830 may be transmitted over the unlicensed radio frequency spectrum band. In some examples, the request message 830 may include a handover completion indication (e.g., an RRC connection reconfiguration complete indication), a BSR, or a device identifier. The handover completion indication or the BSR may include an explicit or implicit request for an uplink grant. The device identifier may include, for example, a C-RNTI.

The request message 830 may be transmitted on a dedicated resource set of the ePRACH. The dedicated resource set may be used for non-contention based random access procedures, such as handovers, and may be assigned to a UE by a target cell in a handover command message.

In some examples, the request message 830 may be transmitted in synchronization with a subframe boundary, during a subframe identified by the indication of the at least one subframe available for UEs to transmit a request message.

In some examples, the request message 830 may be transmitted during a preconfigured uplink CET occasion. In these examples, the request message 830 may be transmitted even when the UE 815 does not win contention for access to the unlicensed radio frequency spectrum band at block 820.

In response to transmitting the request message 830, the UE 815 may continue the random access procedure by monitoring for a response message 835. In some examples, the response message 835 may be an example of the response message 535 described with reference to FIG. 5. The UE 815 may receive the response message 835 over the unlicensed radio frequency spectrum band. The response message 835 may include, for example, a scheduled uplink grant (including, in some examples, an MCS), a device identifier, or an indication of a timing adjustment. In some examples, the response message 835 may include an L2 message (e.g., a timing adjustment, a C-RNTI confirmation, and a scheduled uplink grant).

In some examples, the base station 805 may transmit the response message 835 after contending for access to the unlicensed radio frequency spectrum band at block 810, and upon winning contention for access to the unlicensed radio frequency spectrum band. Alternatively, the base station 805 may transmit the response message 835 over the unlicensed radio frequency spectrum band during a preconfigured downlink CET occasion. In some examples, the response message 835 may be transmitted by the base station 805 and received by the UE 815 within a time window, such as a handover time window. The response message 835 may also be transmitted at a power indicated by at least one power control parameter for the ePRACH, which power control parameter may differ from a power control parameter used for an ePUSCH.

Figure 9:
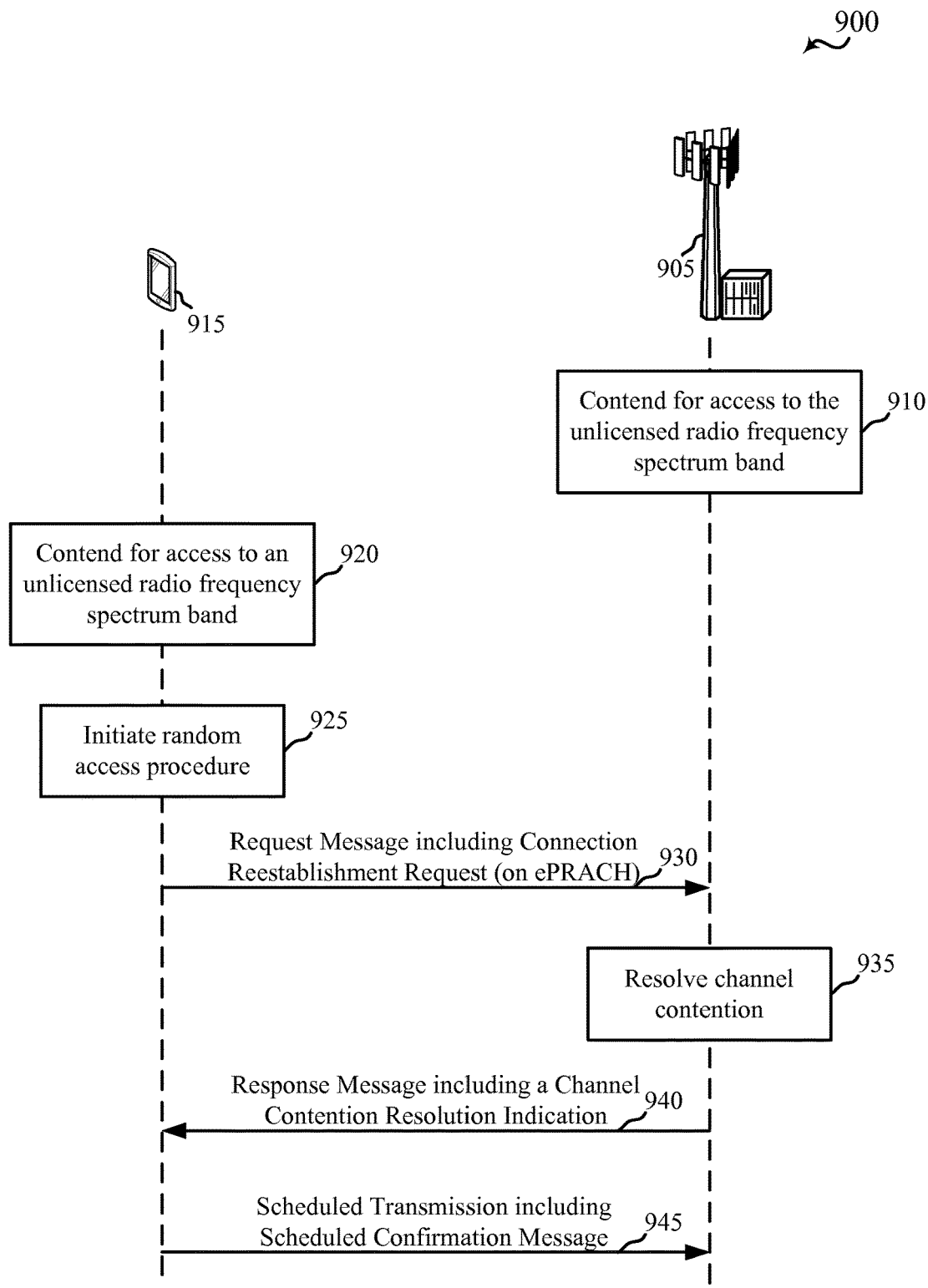
FIG. 9 shows a message flow between a UE and a base station during a connection reestablishment, in accordance with various aspects of the present disclosure.

FIG. 9 shows a message flow 900 between a UE 915 and a base station 905 during a connection reestablishment, in accordance with various aspects of the present disclosure. The message flow 900 may be an example of the message flow 500 descried with reference to FIG. 5. In some examples, the UE 915 may be an example of aspects of one or more of the UEs 115, 215, 215-a, 215-b, 215-c, or 515 described with reference to FIG. 1, 2, or 5. In some examples, the base station 905 may be an example of aspects of one or more of the base stations 105, 205, 205-a, 505, 705, or 805 described with reference to FIG. 1, 2, 5, 7, or 8. The base station 905 may be part of a cell that operates in an unlicensed radio frequency spectrum band, and messages may be transmitted between the UE 915 and the base station 905 over the unlicensed radio frequency spectrum band (and optionally, over a licensed radio frequency spectrum band).

As shown in FIG. 9, the base station 905 may contend for access to the unlicensed radio frequency spectrum band at block 910. In some examples, the base station 905 may contend for access to the unlicensed radio frequency spectrum band and, upon winning contention for access to the unlicensed radio frequency spectrum band, reserve the unlicensed radio frequency spectrum band for an LBT radio frame (e.g., for an LBT radio frame such as the LBT radio frame 315 described with reference to FIG. 3.

In some examples, the base station 905 may provide an indication of at least one subframe available for UEs to transmit a request message on an ePRACH. The base station 905 may provide the indication during a downlink subframe subject to the base station's winning contention for access to the unlicensed radio frequency spectrum band, or during a preconfigured downlink CET occasion, but in either example may be transmitted over the unlicensed radio frequency spectrum band. In some examples, the indication of the at least one subframe available to transmit a request message may be advertised by the base station 905 in a SIB.

At block 920, the UE 915 may contend for access to an unlicensed radio frequency spectrum band for the purpose of transmitting a connection reestablishment request. In some examples, the UE 915 may contend for access to the unlicensed radio frequency spectrum band for a subframe identified by the indication of at least one subframe available for UEs to transmit a request message, as advertised by the base station 905.

In some examples, the contention procedure performed by the UE 915 at block 920 may be performed before, during, or after the contention procedure performed by the base station 905 at block 910, and the two contention procedures need not be linked to, or dependent on, one another.

Upon winning contention for access to the unlicensed radio frequency spectrum band at block 920, the UE 915 may initiate a random access procedure at block 925. As part of initiating the random access procedure, the UE 915 may transmit a request message 930 on an ePRACH. In some examples, the request message 930 may be an example of the request message 530 described with reference to FIG. 5. In some examples, the request message 930 may be transmitted on the ePRACH on SRB0 or SRB1. The request message 930 may be transmitted to access the cell to which the base station 905 belongs. In some examples, the request message 930 may be an unscheduled request message. In some examples, the request message 930 may be transmitted over the unlicensed radio frequency spectrum band. In some examples, the request message 930 may include a connection reestablishment request (e.g., an RRC connection reestablishment request), a device identifier, and a cause value. The device identifier may include, for example, a C-RNTI. The request message 930 may also include a physical cell identity (PCI) of a cell to which the UE 915 was last connected and a short message authentication code (short MAC-I). The request message 930 may be transmitted on a contention-based resource set of the ePRACH.

In some examples, the request message 930 may be transmitted in synchronization with a subframe boundary, during a subframe identified by the indication of the at least one subframe available for UEs to transmit a request message.

In some examples, the request message 930 may be transmitted during a preconfigured uplink CET occasion. In these examples, the request message 930 may be transmitted even when the UE 915 does not win contention for access to the unlicensed radio frequency spectrum band at block 920.

At block 935, and upon receiving the request message 930 along with request messages from other UEs, the base station 905 may resolve contention for access to the ePRACH.

In response to transmitting the request message 930, the UE 915 may continue the random access procedure by monitoring for a response message 940. In some examples, the response message 940 may be an example of the response message 535 described with reference to FIG. 5. The UE 915 may receive the response message 940 (e.g., an eRAR) over the unlicensed radio frequency spectrum band. The response message 940 may include, for example, a channel contention resolution indication, a device identifier, or an indication of a timing adjustment. The response message may be addressed to an RA-RNTI. In some examples, the response message 940 may include an L2 message (e.g., a timing adjustment and a C-RNTI confirmation) or an L3 message (e.g., an RRC configuration).

In some examples, the base station 905 may transmit the response message 940 after contending for access to the unlicensed radio frequency spectrum band at block 910, and upon winning contention for access to the unlicensed radio frequency spectrum band. Alternatively, the base station 905 may transmit the response message 940 over the unlicensed radio frequency spectrum band during a preconfigured downlink CET occasion. In some examples, the response message 940 may be transmitted by the base station 905 and received by the UE 915 within a time window, such as a connection establishment time window. The response message 940 may also be transmitted at a power indicated by at least one power control parameter for the ePRACH, which power control parameter may differ from a power control parameter used for an ePUSCH.

Following receipt of the response message 940, the UE 915 may transmit a scheduled transmission 945 over the unlicensed radio frequency spectrum band. The scheduled transmission 945 may be transmitted in accordance with an uplink grant received as part of the response message 940. In some examples, the scheduled transmission 945 may be transmitted on an enhanced physical downlink control channel (ePDCCH) addressed to the C-RNTI. In some examples, the scheduled transmission 945 may include a scheduled confirmation message (e.g., an RRC connection reestablishment complete message).

Figure 10:
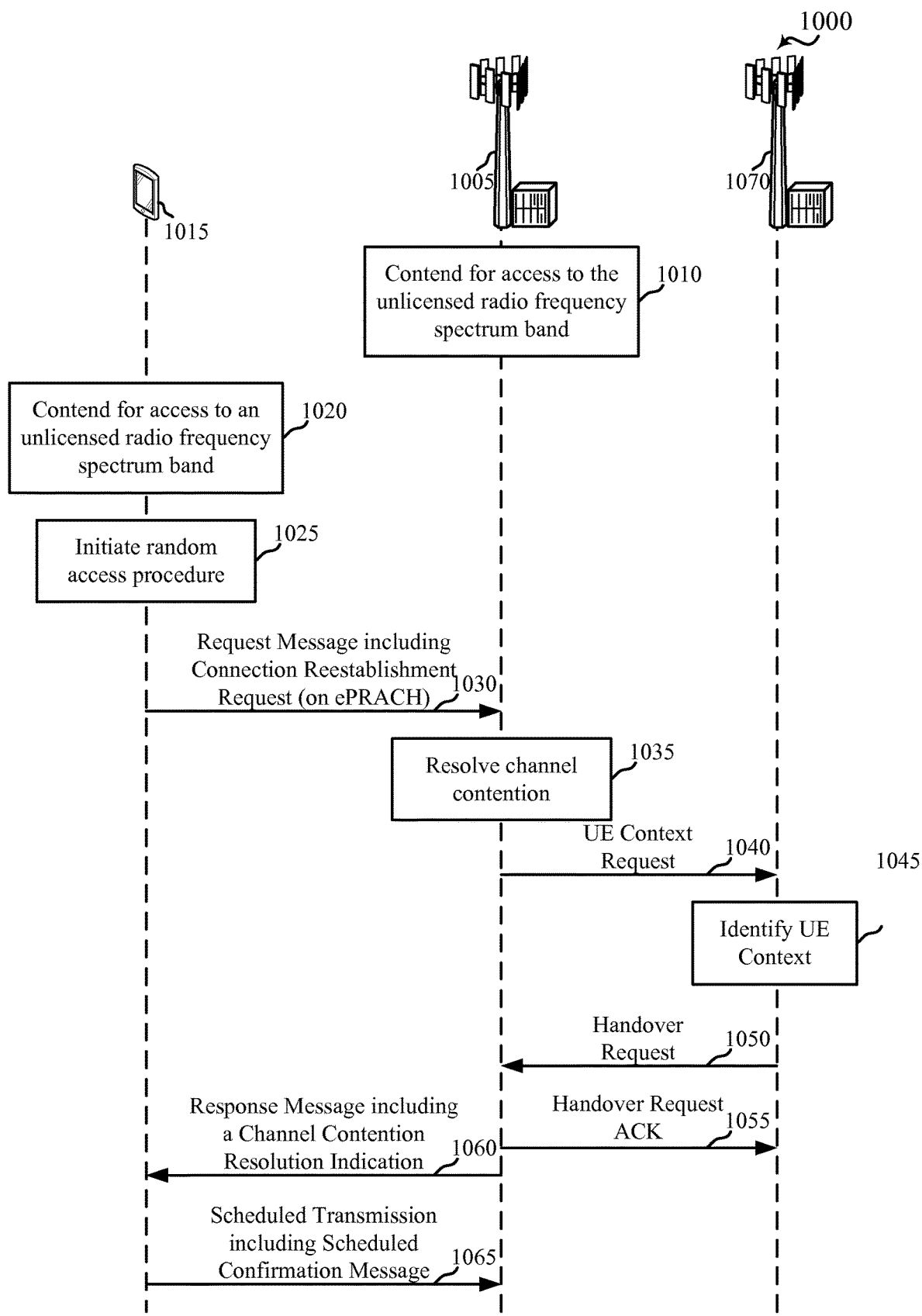
FIG. 10 shows a message flow between a UE, a target base station, and a source base station during a connection reestablishment, in accordance with various aspects of the present disclosure.

FIG. 10 shows a message flow 1000 between a UE 1015, a target base station 1005, and a source base station 1070 during a connection reestablishment, in accordance with various aspects of the present disclosure. The message flow 1000 may be an example of the message flow 500 descried with reference to FIG. 5. In some examples, the UE 1015 may be an example of aspects of one or more of the UEs 115, 215, 215-a, 215-b, 215-c, or 515 described with reference to FIG. 1, 2, or 5. In some examples, the target base station 1005 or source base station 1070 may be an example of aspects of one or more of the base stations 105, 205, 205-a, 505, 705, 805, or 905 described with reference to FIG. 1, 2, 5, 7, 8, or 9. The target base station 1005 may be part of a cell that operates in an unlicensed radio frequency spectrum band, and messages may be transmitted between the UE 1015 and the target base station 1005 over the unlicensed radio frequency spectrum band (and optionally, over a licensed radio frequency spectrum band).

As shown in FIG. 10, the base station 1005 may contend for access to the unlicensed radio frequency spectrum band at block 1010. In some examples, the base station 1005 may contend for access to the unlicensed radio frequency spectrum band and, upon winning contention for access to the unlicensed radio frequency spectrum band, reserve the unlicensed radio frequency spectrum band for an LBT radio frame (e.g., for an LBT radio frame such as the LBT radio frame 315 described with reference to FIG. 3.

In some examples, the base station 1005 may provide an indication of at least one subframe available for UEs to transmit a request message on an ePRACH. The base station 1005 may provide the indication during a downlink subframe subject to the base station's winning contention for access to the unlicensed radio frequency spectrum band, or during a preconfigured downlink CET occasion, but in either example may be transmitted over the unlicensed radio frequency spectrum band. In some examples, the indication of the at least one subframe available to transmit a request message may be advertised by the base station 1005 in a SIB.

At block 1020, the UE 1015 may contend for access to an unlicensed radio frequency spectrum band for the purpose of transmitting a connection reestablishment request. In some examples, the UE 1015 may contend for access to the unlicensed radio frequency spectrum band for a subframe identified by the indication of at least one subframe available for UEs to transmit a request message, as advertised by the base station 1005.

Upon winning contention for access to the unlicensed radio frequency spectrum band at block 1010, the UE 1015 may initiate a random access procedure at block 1025. As part of initiating the random access procedure, the UE 1015 may transmit a request message 1030 on an ePRACH. In some examples, the request message 1030 may be an example of the request message 530 described with reference to FIG. 5. In some examples, the request message 1030 may be transmitted on the ePRACH on SRB0 or SRB1. The request message 1030 may be transmitted to access the cell to which the target base station 1005 belongs. In some examples, the request message 1030 may be an unscheduled request message. In some examples, the request message 1030 may be transmitted over the unlicensed radio frequency spectrum band. In some examples, the request message 1030 may include a connection reestablishment request (e.g., an RRC connection reestablishment request), a device identifier, and a cause value. The device identifier may include, for example, a C-RNTI. The request message 1030 may also include a PCI of a cell to which the UE 1015 was last connected and a short MAC-I. The request message 1030 may be transmitted on a contention-based resource set of the ePRACH.

In some examples, the request message 1030 may be transmitted in synchronization with a subframe boundary, during a subframe identified by the indication of the at least one subframe available for UEs to transmit a request message.

In some examples, the request message 1030 may be transmitted during a preconfigured uplink CET occasion. In these examples, the request message 1030 may be transmitted even when the UE 1015 does not win contention for access to the unlicensed radio frequency spectrum band at block 1020.

At block 1035, and upon receiving the request message 1030 along with request messages from other UEs, the target base station 1005 may resolve contention for access to the ePRACH.

When the target base station 1005 is unprepared for a connection reestablishment (e.g., because a handover to the target base station 1005 was not completed before the UE 1015 lost its connection to the source base station 1070), the target base station 1005 may transmit a UE context request 1040 to the source base station 1070. In some examples, the UE context request 1040 may be transmitted to the source base station 1070 over a backhaul link.

Upon receiving the UE context request 1040, the source base station 1070 may identify the UE context at block 1045 and transmit, to the target base station 1005, a handover request 1050 including the UE context. Upon receiving the handover request 1050, the target base station 1005 may return a handover request acknowledgement (ACK) 1055 to the source base station 1070. The target base station 1005 may also transmit a response message 1060 to the UE 1015.

The UE 1015 may continue the random access procedure by monitoring for the response message 1060. In some examples, the response message 1060 may be an example of the response message 535 described with reference to FIG. 5. The UE 1015 may receive the response message 1060 (e.g., an eRAR) over the unlicensed radio frequency spectrum band. The response message 1060 may include, for example, a channel contention resolution indication, a device identifier, or an indication of a timing adjustment. The response message may be addressed to an RA-RNTI. In some examples, the response message 1060 may include an L2 message (e.g., a timing adjustment and a C-RNTI confirmation) or an L3 message (e.g., an RRC configuration).

In some examples, the target base station 1005 may transmit the response message 1060 after contending for access to the unlicensed radio frequency spectrum band at block 1010, and upon winning contention for access to the unlicensed radio frequency spectrum band. Alternatively, the base station 1005 may transmit the response message 1060 over the unlicensed radio frequency spectrum band during a preconfigured downlink CET occasion.

In some examples, the response message 1060 may be transmitted by the target base station 1005 and received by the UE 1015 within a time window, such as a connection establishment time window. In some examples, the connection establishment time window may be a different (e.g., later) connection establishment time window than used in the random access procedures described with reference to FIGS. 8 and 9. In some examples, the response message 1060 may be transmitted after the UE 1015 repeats the transmission of the request message 1030. In some examples, the response message 1060 may be transmitted at a power indicated by at least one power control parameter for the ePRACH, which power control parameter may differ from a power control parameter used for an ePUSCH.

Following receipt of the response message 1060, the UE 1015 may transmit a scheduled transmission 1065 over the unlicensed radio frequency spectrum band. The scheduled transmission 1065 may be transmitted in accordance with an uplink grant received as part of the response message 1060. In some examples, the scheduled transmission 1065 may be transmitted on an ePDCCH addressed to the C-RNTI. In some examples, the scheduled transmission 1065 may include a scheduled confirmation message (e.g., an RRC connection reestablishment complete message).

Figure 11:
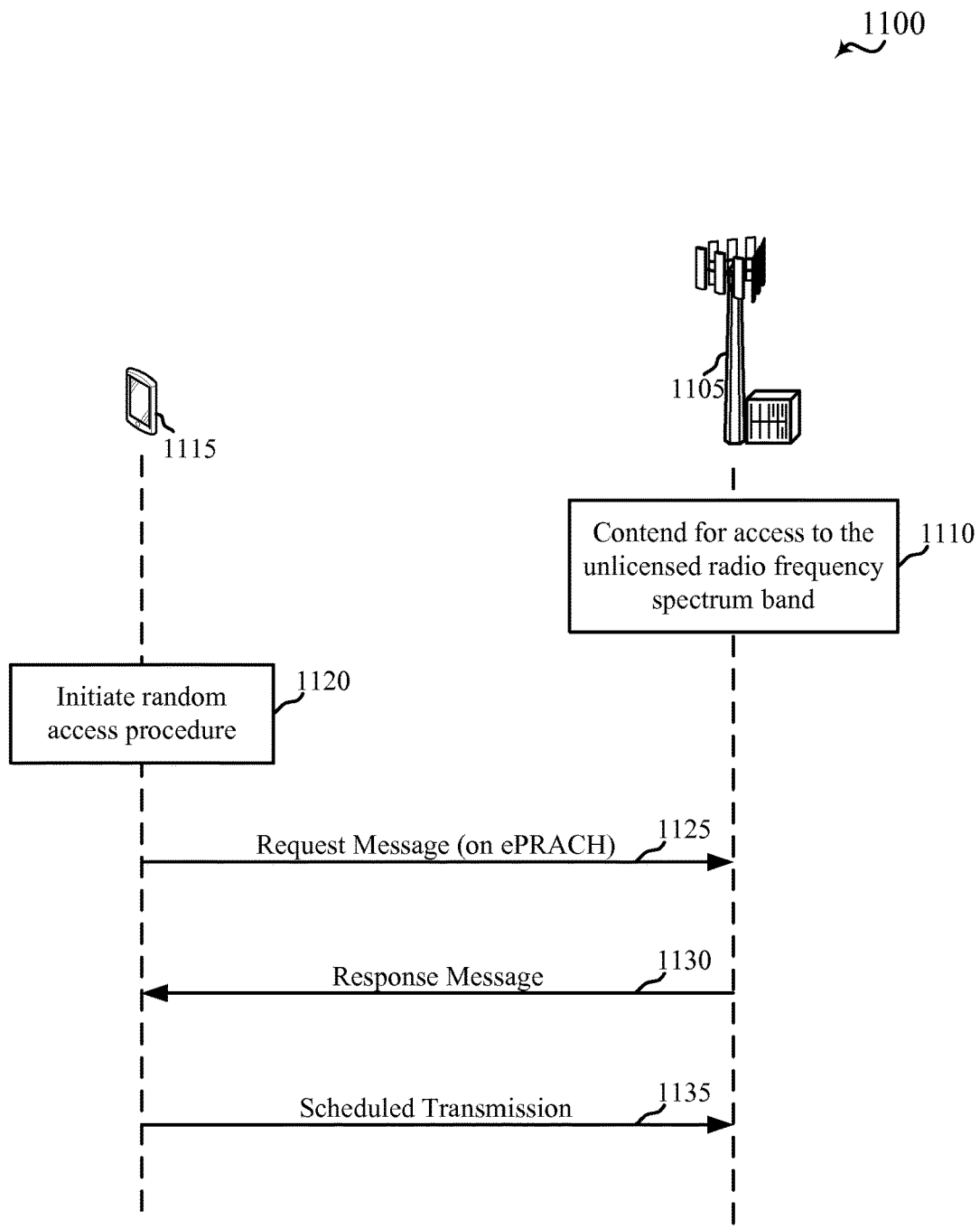
FIG. 11 shows a message flow between a UE and a base station, in accordance with various aspects of the present disclosure.

FIG. 11 shows a message flow 1100 between a UE 1115 and a base station 1105, in accordance with various aspects of the present disclosure. In some examples, the UE 1115 may be an example of aspects of one or more of the UEs 115, 215, 215-a, 215-b, or 215-c described with reference to FIG. 1 or 2. In some examples, the base station 1105 may be an example of aspects of one or more of the base stations 105, 205, or 205-a described with reference to FIG. 1 or 2. The base station 1105 may be part of a cell that operates in an unlicensed radio frequency spectrum band, and messages may be transmitted between the UE 1115 and the base station 1105 over the unlicensed radio frequency spectrum band (and optionally, over a licensed radio frequency spectrum band).

As shown in FIG. 11, the base station 1105 may contend for access to the unlicensed radio frequency spectrum band at block 1110. In some examples, the base station 1105 may contend for access to the unlicensed radio frequency spectrum band and, upon winning contention for access to the unlicensed radio frequency spectrum band, reserve the unlicensed radio frequency spectrum band for an LBT radio frame (e.g., for an LBT radio frame such as the LBT radio frame 315 described with reference to FIG. 3.

In some examples, the base station 1105 may provide an indication of at least one subframe available for UEs to transmit a request message on an ePRACH. The base station 1105 may provide the indication during a downlink subframe subject to the base station's winning contention for access to the unlicensed radio frequency spectrum band, or during a preconfigured downlink CET occasion, but in either example may be transmitted over the unlicensed radio frequency spectrum band. In some examples, the indication of the at least one subframe available to transmit a request message may be advertised by the base station 1105 in a SIB.

At block 1120, and without contending for and/or winning contention for access to the unlicensed radio frequency spectrum band, the UE 1115 may initiate a random access procedure. In some examples, the random access procedure may be initiated during a preconfigured uplink CET occasion. As part of initiating the random access procedure, the UE 1115 may transmit a request message 1125 on an ePRACH. In some examples, the request message 1125 may be transmitted on the ePRACH on SRB0 or SRB1. The request message 1125 may be transmitted to access the cell which the base station 1105 serves. In some examples, the request message 1125 may be an unscheduled request message. In some examples, the request message 1125 may be transmitted over the unlicensed radio frequency spectrum band. In some examples, the request message 1125 may include a connection setup request (e.g., a RRC request), a handover completion indication (e.g., an RRC connection reconfiguration complete indication), a connection reestablishment request (e.g., an RRC connection reestablishment request), a BSR, a device identifier, or a cause value (e.g., a reason why a cell is being accessed). Each of the handover completion indication and the BSR may include an explicit or implicit request for an uplink grant. The device identifier may include, for example, a UE ID, a NAS ID, a C-RNTI, or a random number.

When the request message 1125 is transmitted in a connection setup or connection reestablishment context, the request message 1125 may be transmitted on a contention-based resource set of the ePRACH (e.g., a set or resources on which a plurality of UEs may transmit the same request message). When the request message 1125 is transmitted in a handover completion context, the request message 1125 may be transmitted on a dedicated resource set of the ePRACH.

In some examples, the request message 1125 may be transmitted in synchronization with a subframe boundary, during a subframe identified by the indication of the at least one subframe available for UEs to transmit a request message. In some examples, the request message 1125 may be transmitted on a resource set of the ePRACH having a fixed TB size. The fixed TB size may be advertised by the base station 1105 in a SIB transmitted over the unlicensed radio frequency spectrum band. In some examples, the base station 1105 may configure multiple TBs. The base station 1105 may also advertise (e.g., in the SIB) a mapping of resource sets of the ePRACH to frequency-interlaced resource blocks. The resource mapping may include, for example, an indication of aggregated interlaces or a number of subframes (e.g., for bundled transmissions). The UE 1115 may select, from among the resource sets of the ePRACH, a resource set for transmitting the request message 1125. The combination of a resource set and TB size may be used by the UE 1115 to determine a MCS for transmitting the request message 1125. As a result, the base station 1105 may not need to signal or advertise an MCS.

In some examples, the request message 1125 may be retransmitted in accordance with ARQ procedures rather than HARQ procedures (e.g., the UE 1115 may retransmit the request message 1125 without first receiving HARQ feedback from the base station 1105).

In response to transmitting the request message 1125, the UE 1115 may continue the random access procedure by monitoring for a response message 1130. The UE 1115 may receive the response message 1130 (e.g., an eRAR) over the unlicensed radio frequency spectrum band. The response message 1130 may include, for example, a connection configuration message (e.g., an RRC response), a channel contention resolution indication, a scheduled uplink grant (including, in some examples, an MCS), a device identifier, or an indication of a timing adjustment. The response message may be addressed to an RA-RNTI. In some examples, the response message 1130 may include a L2 message (e.g., an RAR) or a L3 message (e.g., an RRC configuration). In some examples, the response message 1130 may be received in accordance with HARQ procedures.

In some examples, the base station 1105 may transmit the response message 1130 after contending for access to the unlicensed radio frequency spectrum band at block 1110, and upon winning contention for access to the unlicensed radio frequency spectrum band. Alternatively, the base station 1105 may transmit the response message 1130 over the unlicensed radio frequency spectrum band during a preconfigured downlink CET occasion. In some examples, the response message 1130 may be transmitted by the base station 1105 and received by the UE 1115 within a time window, such as a connection establishment time window (e.g., in the context of a connection setup or connection reestablishment) or a handover time window (e.g., in the context of a handover completion). The response message 1130 may also be transmitted at a power indicated by at least one power control parameter for the ePRACH, which power control parameter may differ from a power control parameter used for an ePUSCH. The time window (or windows) and at least one power control parameter may be indicated by the base station 1105 in a SIB. In some examples, a time window may be indicated in terms of a delay following the UE's transmission of the request message 1125.

Following receipt of the response message 1130, the UE 1115 may transmit a scheduled transmission 1135 over the unlicensed radio frequency spectrum band. The scheduled transmission 1135 may be transmitted in accordance with an uplink grant received as part of the response message 1130. In some examples, the scheduled transmission 1135 may include a scheduled confirmation message (e.g., an RRC confirmation) or a NAS service request.

Figure 12:
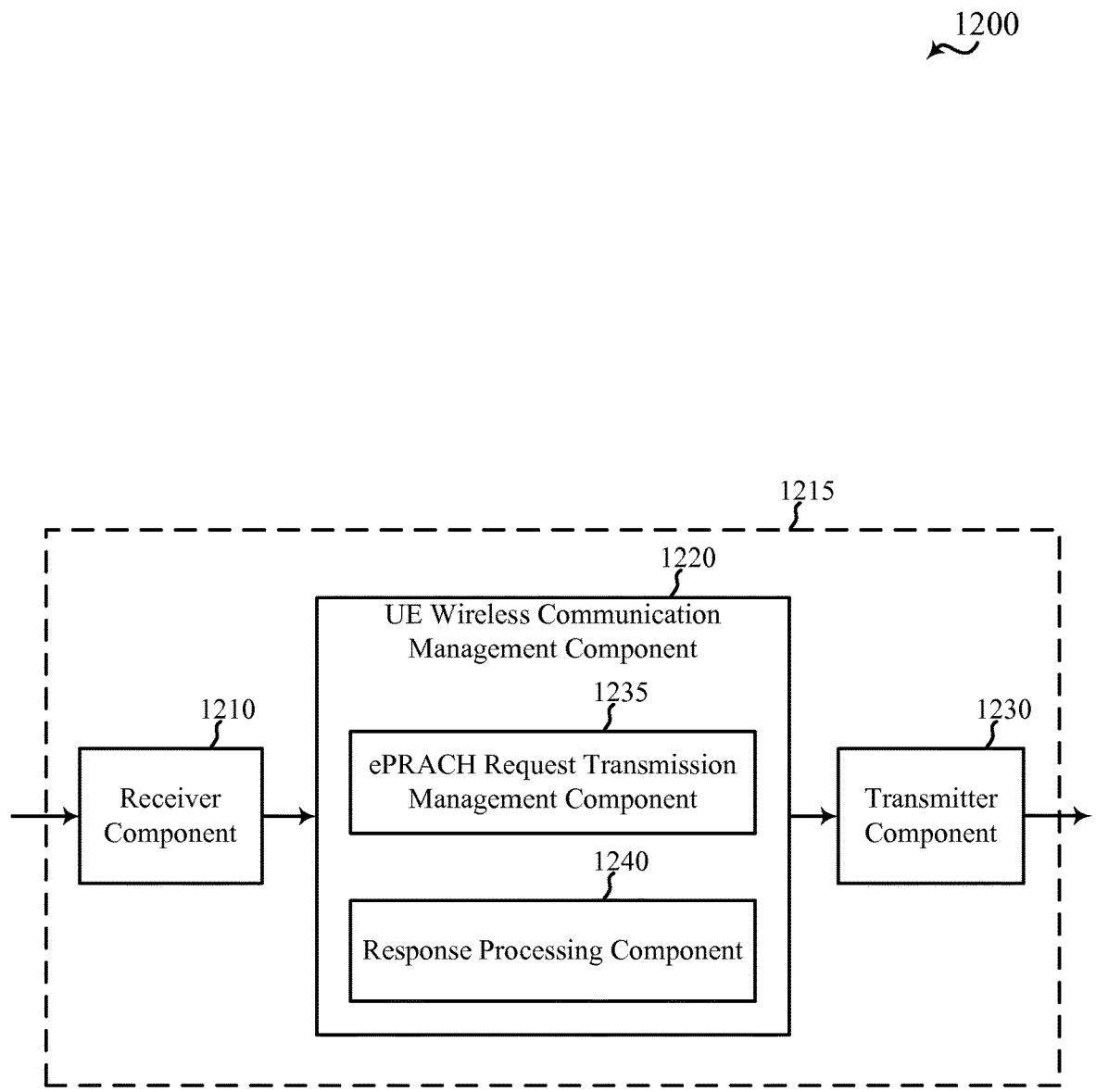
FIG. 12 shows a block diagram of an apparatus for use in wireless communication, in accordance with various aspects of the present disclosure.

FIG. 12 shows a block diagram 1200 of an apparatus 1215 for use in wireless communication, in accordance with various aspects of the present disclosure. The apparatus 1215 may be an example of aspects of one or more of the UEs 115, 215, 215-*a*, 215-*b*, 215-*c*, 515, 715, 815, 915, 1015, or 1115 described with reference to FIG. 1, 2, 5, 7, 8, 9, 10, or 11. The apparatus 1215 may also be or include a processor. The apparatus 1215 may include a receiver component 1210, a UE wireless communication management component 1220, or a transmitter component 1230. Each of these components may be in communication with each other.

The components of the apparatus 1215 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 1210 may include at least one radio frequency (RF) receiver, such as at least one RF receiver operable to receive transmissions over a licensed radio frequency spectrum band (e.g., a radio frequency spectrum band for which transmitting apparatuses may not contend for access because the radio frequency spectrum band is licensed to some users for some uses, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the unlicensed radio frequency spectrum band may be used for LTE/LTE-A communications, as described, for example, with reference to FIG. 1, 2, 3, or 4. The receiver component 1210 may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter component 1230 may include at least one RF transmitter, such as at least one RF transmitter operable to transmit over the licensed radio frequency spectrum band or the unlicensed radio frequency spectrum band. The transmitter component 1230 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the UE wireless communication management component 1220 may be used to manage one or more aspects of wireless communication for the apparatus 1215. In some examples, the UE wireless communication management component 1220 may include an ePRACH request transmission management component 1235 or a response processing component 1240.

In some examples, the ePRACH request transmission management component 1235 may be used to transmit a request message. The request message may be transmitted on an ePRACH to access a cell that operates in an unlicensed radio frequency spectrum band. In some examples, the request message may be an unscheduled request message. In some examples, the request message may be transmitted over the unlicensed radio frequency spectrum band. In some examples, the request message may be transmitted in synchronization with a subframe boundary. In some examples, the request message may include at least one of: a connection setup request; a handover completion indication; a connection reestablishment request; a buffer status report; a device identifier; or a cause value.

In some examples, the response processing component 1240 may be used to receive, in response to transmitting the request message, a response message. The response message may be received over the unlicensed radio frequency spectrum band. In some examples, the response message may include at least one of: a connection configuration message; a channel contention resolution indication; a scheduled uplink grant; a device identifier; or an indication of a timing adjustment.

In some examples of the apparatus 1215, the request message may be further configured or transmitted as described with reference to FIG. 5, 7, 8, 9, 10, or 11, or the response message may be further configured or received as described with reference to FIG. 5, 7, 8, 9, 10, or 11.

Figure 13:
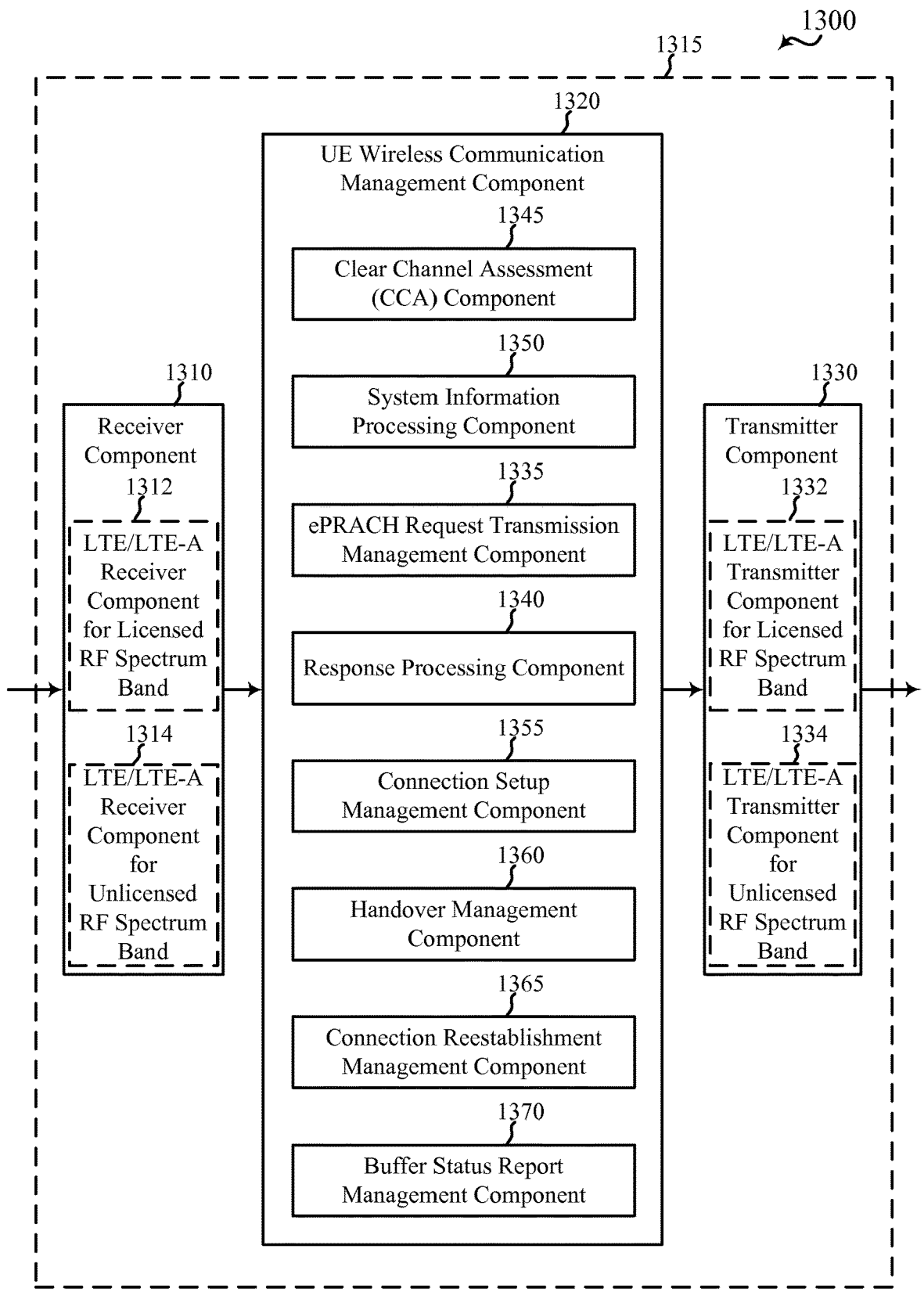
FIG. 13 shows a block diagram of an apparatus for use in wireless communication, in accordance with various aspects of the present disclosure.

FIG. 13 shows a block diagram 1300 of an apparatus 1315 for use in wireless communication, in accordance with various aspects of the present disclosure. The apparatus 1315 may be an example of aspects of one or more of the UEs 115, 215, 215-a, 215-b, 215-c, 515, 715, 815, 915, 1015, or 1115 described with reference to FIG. 1, 2, 5, 7, 8, 9, 10, or 11, or aspects of the apparatus 1215 described with reference to FIG. 12. The apparatus 1315 may also be or include a processor. The apparatus 1315 may include a receiver component 1310, a UE wireless communication management component 1320, or a transmitter component 1330. Each of these components may be in communication with each other.

The components of the apparatus 1315 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 1310 may include at least one RF receiver, such as at least one RF receiver operable to receive transmissions over a licensed radio frequency spectrum band (e.g., a radio frequency spectrum band for which transmitting apparatuses may not contend for access because the radio frequency spectrum band is licensed to some users for some uses, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the unlicensed radio frequency spectrum band may be used for LTE/LTE-A communications, as described, for example, with reference to FIG. 1, 2, 3, or 4. The receiver component 1310 may in some cases include separate receivers for the licensed radio frequency spectrum band and the unlicensed radio frequency spectrum band. The separate receivers may, in some examples, take the form of an LTE/LTE-A receiver component for communicating over the licensed radio frequency spectrum band (e.g., LTE/LTE-A receiver component for licensed RF spectrum band 1312), and an LTE/LTE-A receiver component for communicating over the unlicensed radio frequency spectrum band (e.g., LTE/LTE-A receiver component for unlicensed RF spectrum band 1314). The receiver component 1310, including the LTE/LTE-A receiver component for licensed RF spectrum band 1312 or the LTE/LTE-A receiver component for unlicensed RF spectrum band 1314, may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter component 1330 may include at least one RF transmitter, such as at least one RF transmitter operable to transmit over the licensed radio frequency spectrum band or the unlicensed radio frequency spectrum band. The transmitter component 1330 may in some cases include separate transmitters for the licensed radio frequency spectrum band and the unlicensed radio frequency spectrum band. The separate transmitters may, in some examples, take the form of an LTE/LTE-A transmitter component for communicating over the licensed radio frequency spectrum band (e.g., LTE/LTE-A transmitter component for licensed RF spectrum band 1332), and an LTE/LTE-A transmitter component for communicating over the unlicensed radio frequency spectrum band (e.g., LTE/LTE-A transmitter component for unlicensed RF spectrum band 1334). The transmitter component 1330, including the LTE/LTE-A transmitter component for licensed RF spectrum band 1332 or the LTE/LTE-A transmitter component for unlicensed RF spectrum band 1334, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the UE wireless communication management component 1320 may be used to manage one or more aspects of wireless communication for the apparatus 1315. In some examples, the UE wireless communication management component 1320 may include a CCA component 1345, a system information processing component 1350, an ePRACH request transmission management component 1335, a response processing component 1340, a connection setup management component 1355, a handover management component 1360, a connection reestablishment management component 1365, or a buffer status report management component 1370.

In some examples, the CCA component 1345 may contend for access to the unlicensed radio frequency spectrum band. In some examples, the CCA component 1345 may contend for access to the unlicensed radio frequency spectrum band by performing a UCCA, as described, for example, with reference to FIG. 3. Upon winning a contention for access to the unlicensed radio frequency spectrum band, the CCA component 1345 may enable the UE wireless communication management component 1320 to transmit a CUBS over the unlicensed radio frequency spectrum band.

In some examples, the system information processing component 1350 may be used to receive, in a SIB, at least one of: a mapping of resource sets of an ePRACH to frequency-interlaced resource blocks; an indication of a transport block size for the ePRACH; at least one power control parameter for the ePRACH; an indication of at least one subframe available to transmit a request message; or an indication of at least one time window for reception of a response message. In some examples, the resource sets of the ePRACH may include at least one contention-based resource set. In some examples, the resource sets of the ePRACH may also include at least one dedicated resource set. In some examples, the indication of the at least one time window for reception of the response message may include a first indication of at least one connection establishment time window and a second indication of at least one handover time window.

In some examples, the system information processing component 1350 may be used to receive, in a handover command message, an indication of a dedicated resource set of an ePRACH. The handover command message may also include an indication of a transport block size for the ePRACH; at least one power control parameter for the ePRACH; an indication of at least one subframe available to transmit a request message; or an indication of at least one time window for reception of a response message. In some examples, the indication of the at least one time window for reception of the response message may include a first indication of at least one connection establishment time window and a second indication of at least one handover time window.

In some examples, the ePRACH request transmission management component 1335 may be used to select, from among the resource sets of the ePRACH, a resource set for transmitting a request message. In some examples (e.g., for connection setup or connection reestablishment), the selected resource set may be a contention-based resource set. In some examples (e.g., handover completion), the selected resource set may be a dedicated resource set.

In some examples, the ePRACH request transmission management component 1335 may be used to transmit a request message. The request message may be transmitted on the ePRACH using the selected resource set, to access a cell that operates in the unlicensed radio frequency spectrum band. In some examples, the request message may be an unscheduled request message. In some examples, the request message may be transmitted over the unlicensed radio frequency spectrum band. In some examples, the request message may be transmitted in synchronization with a subframe boundary.

In some examples, the ePRACH request transmission management component 1335 may be used to transmit a request message upon the CCA component 1345 winning a contention for access to the unlicensed radio frequency spectrum band. In other examples, the ePRACH request transmission management component 1335 may transmit the request message without winning contention for access to the unlicensed radio frequency spectrum band. For example, the request message may be transmitted during a preconfigured uplink CET occasion.

In some examples, the response processing component 1340 may be used to monitor the unlicensed radio frequency spectrum band for the response message during at least one of the at least one time window. In some examples, the monitoring may occur during at least one of the at least one connection establishment time window. When a request message transmitted using the ePRACH request transmission management component 1335 includes a connection setup request, the response message received using the response processing component 1340 may include a channel contention resolution indication and a connection configuration message. When a request message transmitted using the ePRACH request transmission management component 1335 includes a handover completion indication, the response message received using the response processing component 1340 may include a scheduled uplink grant. When a request message transmitted using the ePRACH request transmission management component 1335 includes a connection reestablishment request, the response message received using the response processing component 1340 may include a channel contention resolution indication. In some examples, the response message may also include a device identifier or an indication of a timing adjustment.

In some examples, the connection setup management component 1355 may be used to manage a connection setup. The connection setup management component 1355 may cause the ePRACH request transmission management component 1335 to select a contention-based resource set for transmitting a request message, and cause the ePRACH request transmission management component 1335 to transmit a request message including a connection setup request. In some examples, the connection setup management component 1355 may cause the response processing component 1340 to monitor the unlicensed radio frequency spectrum band for a response message during at least one connection establishment time window. In some examples, the connection setup management component 1355 may cause the ePRACH request transmission management component 1335 to repeat a transmission of the request message before the response processing component 1340 receives the response message. The connection setup management component 1355 may also be used to transmit a scheduled confirmation message in response to receiving the response message.

In some examples, the handover management component 1360 may be used to manage a handover completion. The handover management component 1360 may cause the ePRACH request transmission management component 1335 to select a dedicated resource set for transmitting a request message, and cause the ePRACH request transmission management component 1335 to transmit a request message including a handover completion indication. In some examples, the handover management component 1360 may cause the response processing component 1340 to monitor the unlicensed radio frequency spectrum band for a response message during at least one handover time window. In some examples, the handover management component 1360 may cause the ePRACH request transmission management component 1335 to repeat a transmission of the request message before the response processing component 1340 receives the response message.

In some examples the connection reestablishment management component 1365 may be used to manage a connection reestablishment. The connection reestablishment management component 1365 may cause the ePRACH request transmission management component 1335 to select a contention-based resource set for transmitting a request message, and cause the ePRACH request transmission management component 1335 to transmit a request message including a connection reestablishment request. In some examples, the connection reestablishment management component 1365 may cause the response processing component 1340 to monitor the unlicensed radio frequency spectrum band for a response message during at least one connection establishment time window. In some examples, the connection reestablishment management component 1365 may cause the ePRACH request transmission management component 1335 to repeat a transmission of the request message before the response processing component 1340 receives the response message. The connection reestablishment management component 1365 may also be used to transmit a scheduled confirmation message in response to receiving the response message.

In some examples, the buffer status report management component 1370 may be used to manage the transmission of a buffer status report. In some examples, the buffer status report management component 1370 may cause the ePRACH request transmission management component 1335 to transmit a buffer status report with a handover completion indication.

In some examples of the apparatus 1315, the request message may be further configured or transmitted as described with reference to FIG. 5, 7, 8, 9, 10, or 11, or the response message may be further configured or received as described with reference to FIG. 5, 7, 8, 10, or 11.

Figure 14:
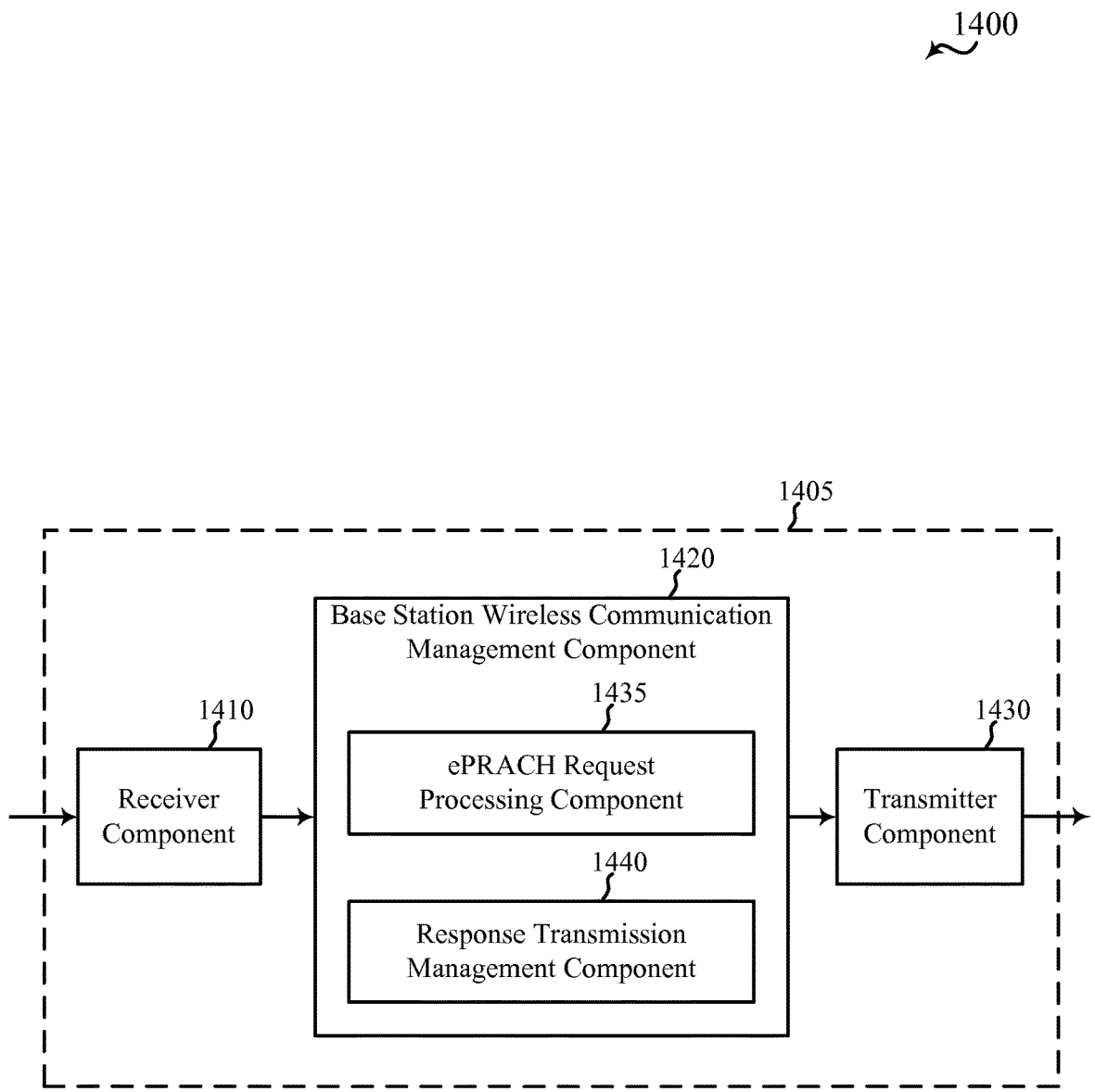
FIG. 14 shows a block diagram of an apparatus for use in wireless communication, in accordance with various aspects of the present disclosure.

FIG. 14 shows a block diagram 1400 of an apparatus 1405 for use in wireless communication, in accordance with various aspects of the present disclosure. The apparatus 1405 may be an example of aspects of one or more of the base stations 105, 205, 205-a, 505, 705, 805, 905, 1005, or 1105 described with reference to FIG. 1, 2, 5, 7, 8, 9, 10, or 11. The apparatus 1405 may also be or include a processor. The apparatus 1405 may include a receiver component 1410, a base station wireless communication management component 1420, or a transmitter component 1430. Each of these components may be in communication with each other.

The components of the apparatus 1405 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 1410 may include at least one RF receiver, such as at least one RF receiver operable to receive transmissions over a licensed radio frequency spectrum band (e.g., a radio frequency spectrum band for which transmitting apparatuses may not contend for access because the radio frequency spectrum band is licensed to some users for some uses, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the unlicensed radio frequency spectrum band may be used for LTE/LTE-A communications, as described, for example, with reference to FIG. 1, 2, 3, or 4. The receiver component 1410 may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter component 1430 may include at least one RF transmitter, such as at least one RF transmitter operable to transmit over the licensed radio frequency spectrum band or the unlicensed radio frequency spectrum band. The transmitter component 1430 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the base station wireless communication management component 1420 may be used to manage one or more aspects of wireless communication for the apparatus 1405. In some examples, the base station wireless communication management component 1420 may include an ePRACH request processing component 1435 or a response transmission management component 1440.

In some examples, the ePRACH request processing component 1435 may be used to receive a first request message. The first request message may be received on an ePRACH, from a UE, to access a cell that operates in the unlicensed radio frequency spectrum band (e.g., a cell including the apparatus 1405). In some examples, the request message may be an unscheduled request message. In some examples, the request message may be received over the unlicensed radio frequency spectrum band. In some examples, the request message may be received in synchronization with a subframe boundary. In some examples, the request message may include at least one of: a connection setup request; a handover completion indication; a connection reestablishment request; a buffer status report; a device identifier; or a cause value.

In some examples, the response transmission management component 1440 may be used to transmit, in response to receiving a request message, a response message. The response message may be transmitted over the unlicensed radio frequency spectrum band. In some examples, the response message may include at least one of: a connection configuration message; a channel contention resolution indication; a scheduled uplink grant; a device identifier; or an indication of a timing adjustment.

In some examples of the apparatus 1405, the request message may be further configured or received as described with reference to FIG. 5, 7, 8, 9, 10, or 11, or the response message may be further configured or transmitted as described with reference to FIG. 5, 7, 8, 9, 10, or 11.

Figure 15:
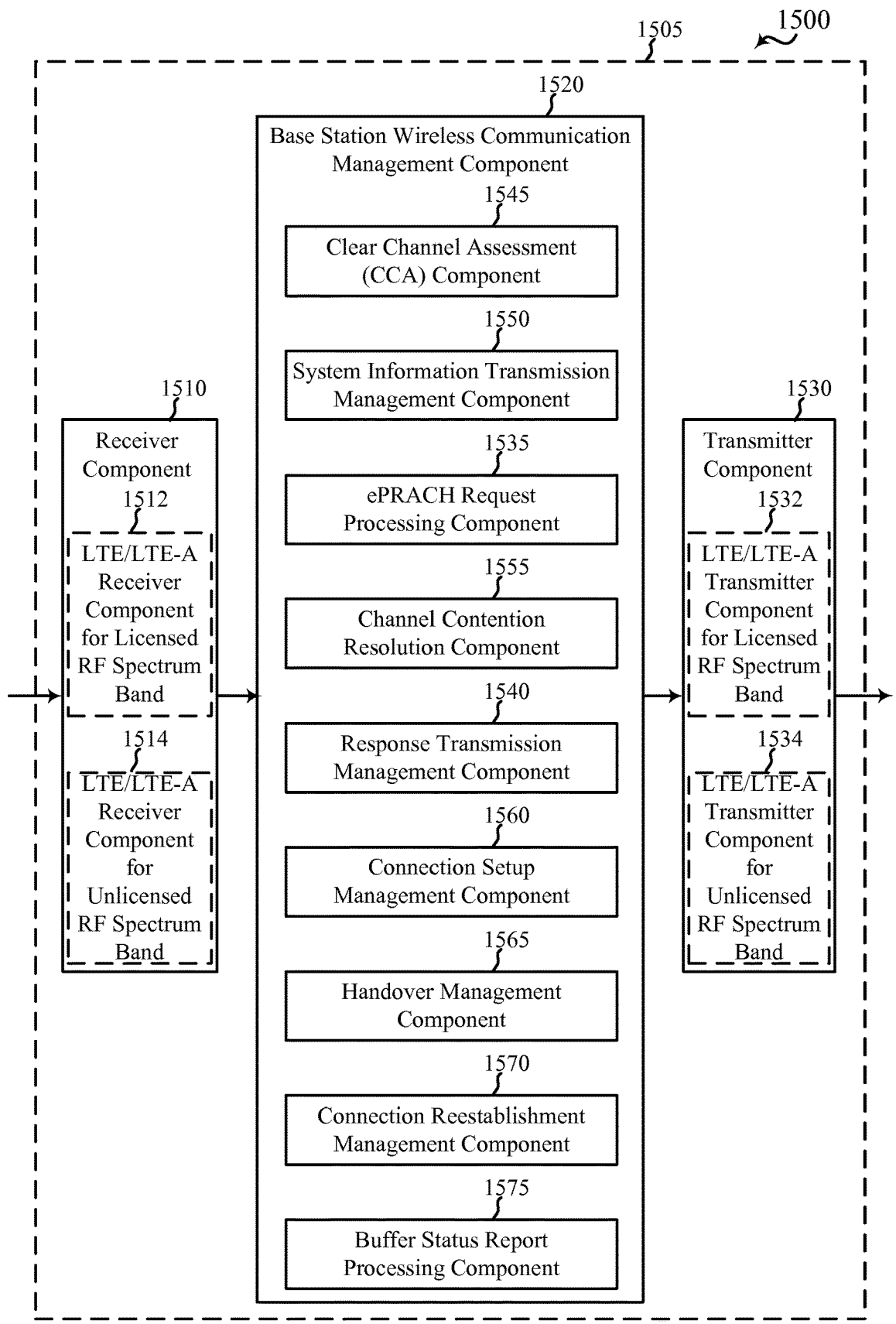
FIG. 15 shows a block diagram of an apparatus for use in wireless communication, in accordance with various aspects of the present disclosure.

FIG. 15 shows a block diagram 1500 of an apparatus 1505 for use in wireless communication, in accordance with various aspects of the present disclosure. The apparatus 1505 may be an example of aspects of one or more of the base stations 105, 205, 205-a, 505, 705, 805, 905, 1005, or 1105 described with reference to FIG. 1, 2, 5, 7, 8, 9, 10, or 11, or aspects of the apparatus 1405 described with reference to FIG. 14. The apparatus 1505 may also be or include a processor. The apparatus 1505 may include a receiver component 1510, a base station wireless communication management component 1520, or a transmitter component 1530. Each of these components may be in communication with each other.

The components of the apparatus 1505 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 1510 may include at least one RF receiver, such as at least one RF receiver operable to receive transmissions over a licensed radio frequency spectrum band (e.g., a radio frequency spectrum band for which transmitting apparatuses may not contend for access because the radio frequency spectrum band is licensed to some users for some uses, such as a licensed radio frequency spectrum band usable for LTE/LTE-A communications) or an unlicensed radio frequency spectrum band (e.g., a radio frequency spectrum band for which transmitting apparatuses may need to contend for access because the radio frequency spectrum band is available for unlicensed use, such as Wi-Fi use). In some examples, the licensed radio frequency spectrum band or the unlicensed radio frequency spectrum band may be used for LTE/LTE-A communications, as described, for example, with reference to FIG. 1, 2, 3, or 4. The receiver component 1510 may in some cases include separate receivers for the licensed radio frequency spectrum band and the unlicensed radio frequency spectrum band. The separate receivers may, in some examples, take the form of an LTE/LTE-A receiver component for communicating over the licensed radio frequency spectrum band (e.g., LTE/LTE-A receiver component for licensed RF spectrum band 1512), and an LTE/LTE-A receiver component for communicating over the unlicensed radio frequency spectrum band (e.g., LTE/LTE-A receiver component for unlicensed RF spectrum band 1514). The receiver component 1510, including the LTE/LTE-A receiver component for licensed RF spectrum band 1512 or the LTE/LTE-A receiver component for unlicensed RF spectrum band 1514, may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter component 1530 may include at least one RF transmitter, such as at least one RF transmitter operable to transmit over the licensed radio frequency spectrum band or the unlicensed radio frequency spectrum band. The transmitter component 1530 may in some cases include separate transmitters for the licensed radio frequency spectrum band and the unlicensed radio frequency spectrum band. The separate transmitters may, in some examples, take the form of an LTE/LTE-A transmitter component for communicating over the licensed radio frequency spectrum band (e.g., LTE/LTE-A transmitter component for licensed RF spectrum band 1532), and an LTE/LTE-A transmitter component for communicating over the unlicensed radio frequency spectrum band (e.g., LTE/LTE-A transmitter component for unlicensed RF spectrum band 1534). The transmitter component 1530, including the LTE/LTE-A transmitter component for licensed RF spectrum band 1532 or the LTE/LTE-A transmitter component for unlicensed RF spectrum band 1534, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the base station wireless communication management component 1520 may be used to manage one or more aspects of wireless communication for the apparatus 1505. In some examples, the base station wireless communication management component 1520 may include a CCA component 1545, a system information transmission management component 1550, an ePRACH request processing component 1535, a channel contention resolution component 1555, a response transmission management component 1540, a connection setup management component 1560, a handover management component 1565, a connection reestablishment management component 1570, or a buffer status report management component 1575.

In some examples, the CCA component 1545 may contend for access to the unlicensed radio frequency spectrum band. In some examples, the CCA component 1545 may contend for access to the unlicensed radio frequency spectrum band by performing a DCCA, as described, for example, with reference to FIG. 3. Upon winning a contention for access to the unlicensed radio frequency spectrum band, the CCA component 1545 may enable the base station wireless communication management component 1520 to transmit a CUBS over the unlicensed radio frequency spectrum band.

In some examples, the system information transmission management component 1550 may be used to transmit, in a SIB, at least one of: a mapping of resource sets of an ePRACH to frequency-interlaced resource blocks; an indication of a transport block size for the ePRACH; at least one power control parameter for the ePRACH; an indication of at least one subframe available to transmit a request message; or an indication of at least one time window for reception of a response message. In some examples, the resource sets of the ePRACH may include at least one contention-based resource set. In some examples, the resource sets of the ePRACH may also include at least one dedicated resource set. In some examples, the indication of the at least one time window for reception of the response message may include a first indication of at least one connection establishment time window and a second indication of at least one handover time window.

In some examples, the system information transmission management component 1550 may be used to transmit, in a handover command message, an indication of a dedicated resource set of an ePRACH. The handover command message may also include an indication of a transport block size for the ePRACH; at least one power control parameter for the ePRACH; an indication of at least one subframe available to transmit a request message; or an indication of at least one time window for reception of a response message. In some examples, the indication of the at least one time window for reception of the response message may include a first indication of at least one connection establishment time window and a second indication of at least one handover time window.

In some examples, the ePRACH request processing component 1535 may be used to receive one or more request messages, including a first request message. Each of the request messages may be received on an ePRACH, from a respective UE, to access a cell that operates in the unlicensed radio frequency spectrum band (e.g., a cell including the apparatus 1505). In some examples, the request message may be an unscheduled request message. In some examples, the request message may be received over the unlicensed radio frequency spectrum band. In some examples, the request message(s) may be received in synchronization with a subframe boundary.

In some examples, the channel contention resolution component 1555 may be used to resolve channel contention between a plurality of UEs for which request messages have been received on the ePRACH.

In some examples, the response transmission management component 1540 may be used to transmit, in response to receiving a request message, a response message. The response message may be transmitted over the unlicensed radio frequency spectrum band. When a request message received using the ePRACH request processing component 1535 includes a connection setup request, the response message transmitted using the response transmission management component 1540 may include a channel contention resolution indication and a connection configuration message. When a request message received using the ePRACH request processing component 1535 includes a handover completion indication, the response message transmitted using the response transmission management component 1540 may include a scheduled uplink grant. When a request message received using the ePRACH request processing component 1535 includes a connection reestablishment request, the response message transmitted using the response transmission management component 1540 may include a channel contention resolution indication. In some examples, the response message may also include a device identifier or an indication of a timing adjustment.

In some examples, the response transmission management component 1540 may be used to transmit a response message after the CCA component 1545 wins a contention for access to the unlicensed radio frequency spectrum band.

In some examples, the connection setup management component 1560 may be used to manage a connection setup. The connection setup management component 1560 may cause the response transmission management component 1540 to transmit a response message in response to the ePRACH request processing component 1535 receiving a connection setup request.

In some examples, the handover management component 1565 may be used to manage a handover completion. The handover management component 1565 may cause the response transmission management component 1540 to transmit a response message in response to the ePRACH request processing component 1535 receiving a handover completion indication.

In some examples the connection reestablishment management component 1570 may be used to manage a connection reestablishment. The connection reestablishment management component 1570 may cause the response transmission management component 1540 to transmit a response message in response to the ePRACH request processing component 1535 receiving a connection reestablishment message.

In some examples of the apparatus 1505, the request message may be further configured or received as described with reference to FIG. 5, 7, 8, 9, 10, or 11, or the response message may be further configured or transmitted as described with reference to FIG. 5, 7, 8, 9, 10, or 11.

Figure 16:
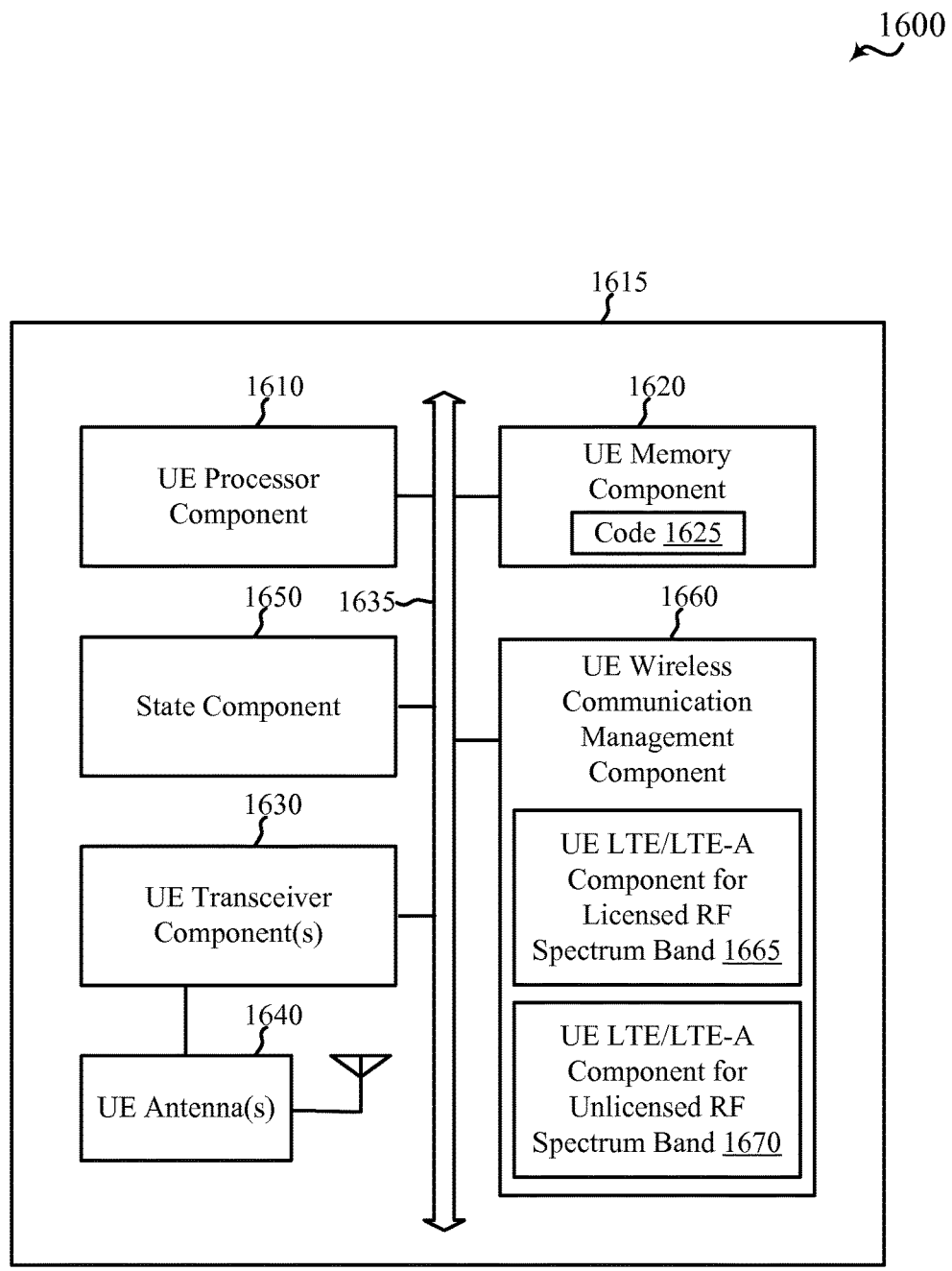
FIG. 16 shows a block diagram of a UE for use in wireless communication, in accordance with various aspects of the present disclosure.

FIG. 16 shows a block diagram 1600 of a UE 1615 for use in wireless communication, in accordance with various aspects of the present disclosure. The UE 1615 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 1615 may, in some examples, have an internal power supply (not shown), such as a small battery, to facilitate mobile operation. In some examples, the UE 1615 may be an example of aspects of one or more of the UE 115, 215, 215-a, 215-b, 215-c, 515, 715, 815, 915, 1015, or 1115 described with reference to FIG. 1, 2, 5, 7, 8, 9, 10, or 11, or aspects of one or more of the apparatuses 1215 or 1315 described with reference to FIG. 12 or 13. The UE 1615 may be configured to implement at least some of the UE or apparatus features and functions described with reference to FIG. 1, 2, 3, 4, 5, 6, 7, 8, 9, 10, 11, 12, or 13.

The UE 1615 may include a UE processor component 1610, a UE memory component 1620, at least one UE transceiver component (represented by UE transceiver component(s) 1630), at least one UE antenna (represented by UE antenna(s) 1640), or a UE wireless communication management component 1660. Each of these components may be in communication with each other, directly or indirectly, over one or more buses 1635.

The UE memory component 1620 may include random access memory (RAM) or read-only memory (ROM). The UE memory component 1620 may store computer-readable, computer-executable code 1625 containing instructions that are configured to, when executed, cause the UE processor component 1610 to perform various functions described herein related to wireless communication, including the transmission of a request message, on an ePRACH, to access a cell that operates in an unlicensed radio frequency spectrum band, and including the reception of a response message over the unlicensed radio frequency spectrum band. Alternatively, the code 1625 may not be directly executable by the UE processor component 1610 but be configured to cause the UE 1615 (e.g., when compiled and executed) to perform various of the functions described herein.

The UE processor component 1610 may include an intelligent hardware device, e.g., a central processing unit (CPU), a microcontroller, an ASIC, etc. The UE processor component 1610 may process information received through the UE transceiver component(s) 1630 or information to be sent to the UE transceiver component(s) 1630 for transmission through the UE antenna(s) 1640. The UE processor component 1610 may handle, alone or in connection with the UE wireless communication management component 1660, various aspects of communicating over (or managing communications over) a licensed radio frequency spectrum band (e.g., a radio frequency spectrum band for which apparatuses do not contend for access because the radio frequency spectrum band is licensed to some users for some uses, such as a licensed radio frequency spectrum band usable for LTE/LTE-A communications) or an unlicensed radio frequency spectrum band (e.g., a radio frequency spectrum band for which apparatuses may need to contend for access because the radio frequency spectrum band is available for unlicensed use, such as Wi-Fi use).

The UE transceiver component(s) 1630 may include a modem configured to modulate packets and provide the modulated packets to the UE antenna(s) 1640 for transmission, and to demodulate packets received from the UE antenna(s) 1640. The UE transceiver component(s) 1630 may, in some examples, be implemented as one or more UE transmitter components and one or more separate UE receiver components. The UE transceiver component(s) 1630 may support communications in the licensed radio frequency spectrum band or the unlicensed radio frequency spectrum band. The UE transceiver component(s) 1630 may be configured to communicate bi-directionally, via the UE antenna(s) 1640, with one or more of the base stations **105, 205, 205-*a*, 505, 705, 805, 905, 1005, or 1105 described with reference to FIG. 1, 2, 5, 7, 8, 9, 10, or 11, or the apparatus 1405 or 1505 described with reference to FIG. 14 or 15. While the UE 1615 may include a single UE antenna, there may be examples in which the UE 1615 may include multiple UE antennas 1640**.

The UE state component 1650 may be used, for example, to manage transitions of the UE 1615 between an RRC idle state and an RRC connected state, and may be in communication with other components of the UE 1615, directly or indirectly, over the one or more buses 1635. The UE state component 1650, or portions of it, may include a processor, or some or all of the functions of the UE state component 1650 may be performed by the UE processor component 1610 or in connection with the UE processor component 1610.

The UE wireless communication management component 1660 may be configured to perform or control some or all of the UE or apparatus features or functions described with reference to FIG. 1, 2, 3, 4, 5, 6, 7, 8, 9, 10, 11, 12, or 13 related to wireless communication over a licensed radio frequency spectrum band or an unlicensed radio frequency spectrum band. For example, the UE wireless communication management component 1660 may be configured to support a supplemental downlink mode, a carrier aggregation mode, or a standalone mode using the licensed radio frequency spectrum band or the unlicensed radio frequency spectrum band. The UE wireless communication management component 1660 may include a UE LTE/LTE-A component for licensed RF spectrum band 1665 configured to handle LTE/LTE-A communications in the licensed radio frequency spectrum band, and a UE LTE/LTE-A component for unlicensed RF spectrum band 1670 configured to handle LTE/LTE-A communications in the unlicensed radio frequency spectrum band. The UE wireless communication management component 1660, or portions of it, may include a processor, or some or all of the functions of the UE wireless communication management component 1660 may be performed by the UE processor component 1610 or in connection with the UE processor component 1610. In some examples, the UE wireless communication management component 1660 may be an example of the UE wireless communication management component 1220 or 1320 described with reference to FIG. 12 or 13.

Figure 17:
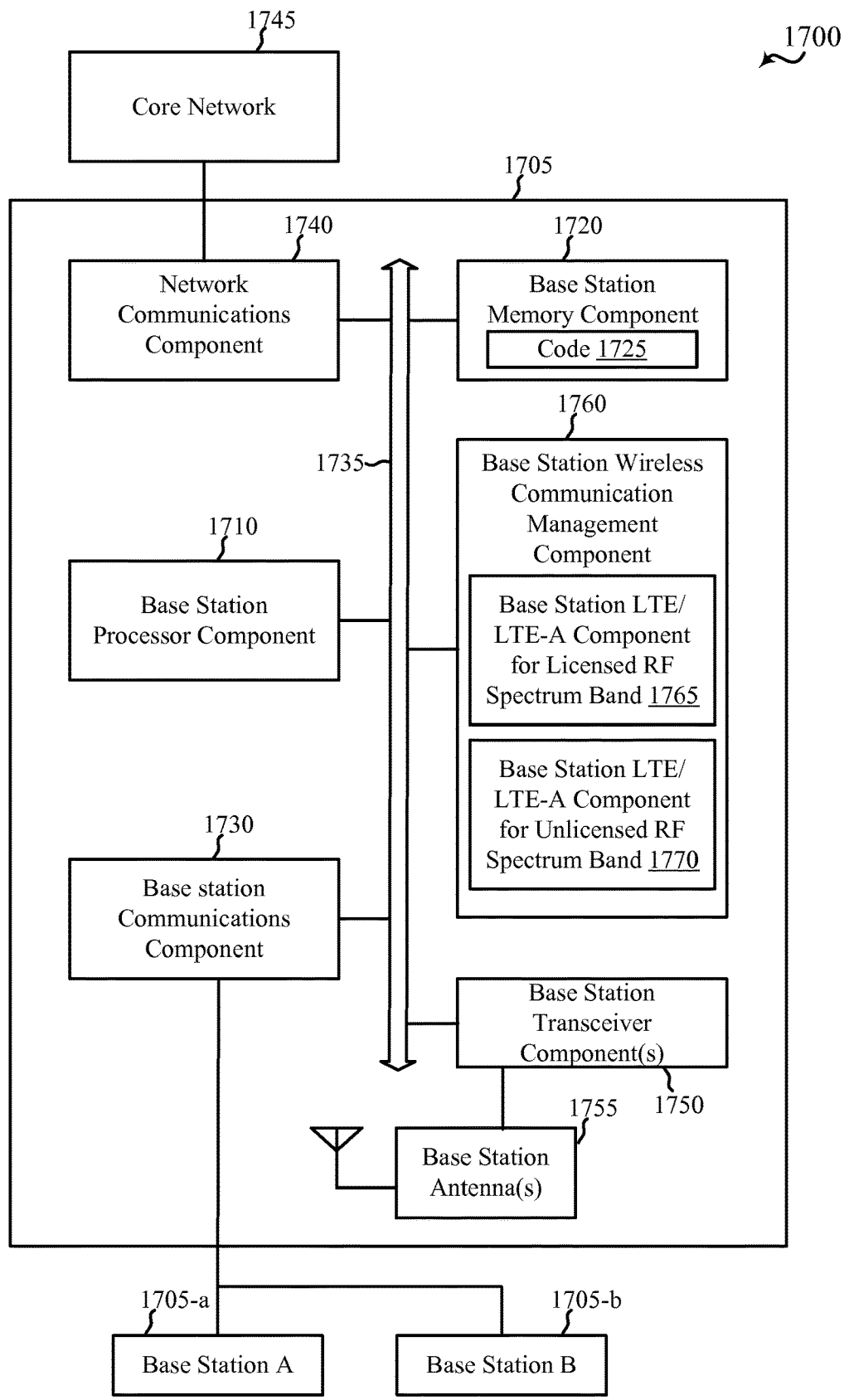
FIG. 17 shows a block diagram of a base station (e.g., a base station forming part or all of an eNB) for use in wireless communication, in accordance with various aspects of the present disclosure.

FIG. 17 shows a block diagram 1700 of a base station 1705 (e.g., a base station forming part or all of an eNB) for use in wireless communication, in accordance with various aspects of the present disclosure. In some examples, the base station 1705 may be an example of one or more aspects of the base station **105, 205, 205-*a*, 505, 705, 805, 905, 1005, or 1105 described with reference to FIG. 1, 2, 5, 7, 8, 9, 10, or 11, or aspects of the apparatus 1405 or 1505 described with reference to FIG. 14 or 15. The base station 1705 may be configured to implement or facilitate at least some of the base station features and functions described with reference to FIG. 1, 2, 3, 4, 5, 6, 7, 8, 9, 10, 11, 14, or 15**.

The base station 1705 may include a base station processor component 1710, a base station memory component 1720, at least one base station transceiver component (represented by base station transceiver component(s) 1750), at least one base station antenna (represented by base station antenna(s) 1755), or a base station wireless communication management component 1760. The base station 1705 may also include one or more of a base station communications component 1730 or a network communications component 1740. Each of these components may be in communication with each other, directly or indirectly, over one or more buses 1735.

The base station memory component 1720 may include RAM or ROM. The base station memory component 1720 may store computer-readable, computer-executable code 1725 containing instructions that are configured to, when executed, cause the base station processor component 1710 to perform various functions described herein related to wireless communication, including the reception of a request message from each of a number of UEs, on an ePRACH, to access a cell that operates in an unlicensed radio frequency spectrum band, and including the transmission of a response message over the unlicensed radio frequency spectrum band. Alternatively, the code 1725 may not be directly executable by the base station processor component 1710 but be configured to cause the base station 1705 (e.g., when compiled and executed) to perform various of the functions described herein.

The base station processor component 1710 may include an intelligent hardware device, e.g., a CPU, a microcontroller, an ASIC, etc. The base station processor component 1710 may process information received through the base station transceiver component(s) 1750, the base station communications component 1730, or the network communications component 1740. The base station processor component 1710 may also process information to be sent to the transceiver component(s) 1750 for transmission through the antenna(s) 1755, to the base station communications component 1730, for transmission to one or more other base stations **1705-*a* and 1705-*b*, or to the network communications component 1740 for transmission to a core network 1745, which may be an example of one or more aspects of the core network 130 described with reference to FIG. 1. The base station processor component 1710 may handle, alone or in connection with the base station wireless communication management component 1760**, various aspects of communicating over (or managing communications over) a licensed radio frequency spectrum band (e.g., a radio frequency spectrum band for which apparatuses do not contend for access because the radio frequency spectrum band is licensed to some users for some uses, such as a licensed radio frequency spectrum band usable for LTE/LTE-A communications) or an unlicensed radio frequency spectrum band (e.g., a radio frequency spectrum band for which apparatuses may need to contend for access because the radio frequency spectrum band is available for unlicensed use, such as Wi-Fi use).

The base station transceiver component(s) 1750 may include a modem configured to modulate packets and provide the modulated packets to the base station antenna(s) 1755 for transmission, and to demodulate packets received from the base station antenna(s) 1755. The base station transceiver component(s) 1750 may, in some examples, be implemented as one or more base station transmitter components and one or more separate base station receiver components. The base station transceiver component(s) 1750 may support communications in the licensed radio frequency spectrum band or the unlicensed radio frequency spectrum band. The base station transceiver component(s) 1750 may be configured to communicate bi-directionally, via the antenna(s) 1755, with one or more UEs or apparatuses, such as one or more of the UEs 115, 215, 215-a, 215-b, 215-c, 515, 615, 715, 815, 915, 1015, 1115, or 1615 described with reference to FIG. 1, 2, 5, 6, 7, 8, 9, 10, 11, or 16, or one or more of the apparatuses 1305 or 1405 described with reference to FIG. 13 or 14. The base station 1705 may, for example, include multiple base station antennas 1755 (e.g., an antenna array). The base station 1705 may communicate with the core network 1745 through the network communications component 1740. The base station 1705 may also communicate with other base stations, such as the base stations 1705-a and 1705-b, using the base station communications component 1730.

The base station wireless communication management component 1760 may be configured to perform or control some or all of the features or functions described with reference to FIG. 1, 2, 3, 4, 5, 6, 7, 8, 9, 10, 11, 14, or 15 related to wireless communication over a licensed radio frequency spectrum band or an unlicensed radio frequency spectrum band. For example, the base station wireless communication management component 1760 may be configured to support a supplemental downlink mode, a carrier aggregation mode, or a standalone mode using the licensed radio frequency spectrum band or the unlicensed radio frequency spectrum band. The base station wireless communication management component 1760 may include a base station LTE/LTE-A component for licensed RF spectrum band 1765 configured to handle LTE/LTE-A communications in the licensed radio frequency spectrum band, and a base station LTE/LTE-A component for unlicensed RF spectrum band 1770 configured to handle LTE/LTE-A communications in the unlicensed radio frequency spectrum band. The base station wireless communication management component 1760, or portions of it, may include a processor, or some or all of the functions of the base station wireless communication management component 1760 may be performed by the base station processor component 1710 or in connection with the base station processor component 1710. In some examples, the base station wireless communication management component 1760 may be an example of the base station wireless communication management component 1420 or 1520 described with reference to FIG. 14 or 15.

Figure 18:
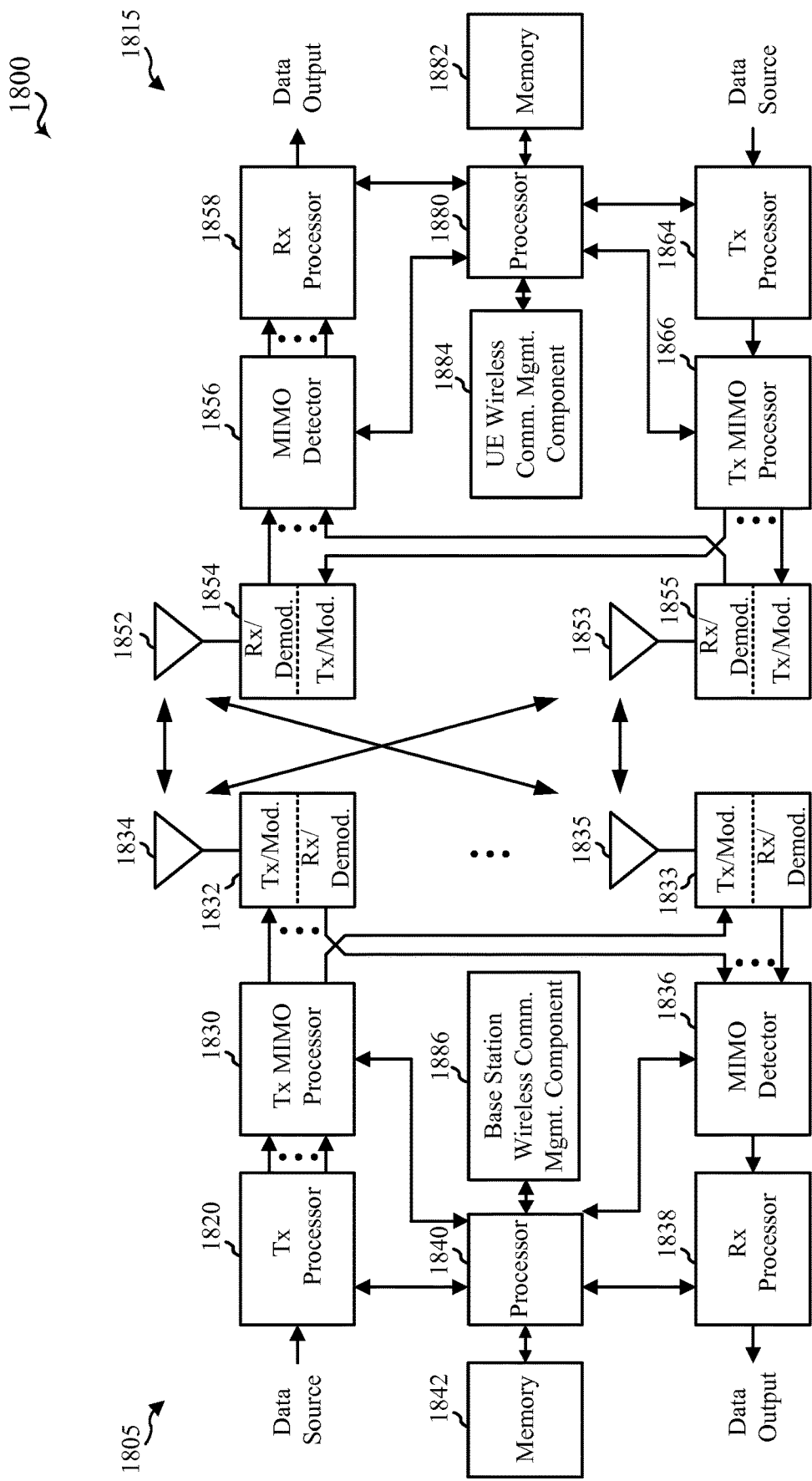
FIG. 18 is a block diagram of a multiple input/multiple output (MIMO) communication system including a base station and a UE, in accordance with various aspects of the present disclosure.

FIG. 18 is a block diagram of a multiple input/multiple output (MIMO) communication system 1800 including a base station 1805 and a UE 1815, in accordance with various aspects of the present disclosure. The MIMO communication system 1800 may illustrate aspects of the wireless communication system 100 or 200 described with reference to FIG. 1 or 2. The base station 1805 may be an example of aspects of the base station 105, 205, 205-a, 505, 705, 805, 905, 1005, 1105, or 1705 described with reference to FIG. 1, 2, 5, 7, 8, 9, 10, 11, or 17, or aspects of the apparatus 1405 or 1505 described with reference to FIG. 14 or 15. The base station 1805 may be equipped with antennas 1834 through 1835, and the UE 1815 may be equipped with antennas 1852 through 1853. In the MIMO communication system 1800, the base station 1805 may be able to send data over multiple communication links at the same time. Each communication link may be called a "layer" and the "rank" of the communication link may indicate the number of layers used for communication. For example, in a 2×2 MIMO communications system where base station 1805 transmits two "layers," the rank of the communication link between the base station 1805 and the UE 1815 is two.

At the base station 1805, a transmit processor 1820 may receive data from a data source. The transmit processor 1820 may process the data. The transmit processor 1820 may also generate control symbols or reference symbols. A transmit (TX) MIMO processor 1830 may perform spatial processing (e.g., precoding) on data symbols, control symbols, or reference symbols, if applicable, and may provide output symbol streams to the transmit modulators 1832 through 1833. Each modulator 1832 through 1833 may process a respective output symbol stream (e.g., for OFDM, etc.) to obtain an output sample stream. Each modulator 1832 through 1833 may further process (e.g., convert to analog, amplify, filter, and upconvert) the output sample stream to obtain a DL signal. In one example, DL signals from modulators 1832 through 1833 may be transmitted via the antennas 1834 through 1835, respectively.

The UE 1815 may be an example of aspects of the UE 115, 215, 215-a, 215-b, 215-c, 515, 715, 815, 915, 1015, 1115, or 1615 described with reference to FIG. 1, 2, 5, 7, 8, 9, 10, 11, or 16, or aspects of the apparatus 1215 or 1315 described with reference to FIG. 12 or 13. At the UE 1815, the UE antennas 1852 through 1853 may receive the DL signals from the base station 1805 and may provide the received signals to the demodulators 1854 through 1855, respectively. Each demodulator 1854 through 1855 may condition (e.g., filter, amplify, downconvert, and digitize) a respective received signal to obtain input samples. Each demodulator 1854 through 1855 may further process the input samples (e.g., for OFDM, etc.) to obtain received symbols. A MIMO detector 1856 may obtain received symbols from all the demodulators 1854 through 1855, perform MIMO detection on the received symbols, if applicable, and provide detected symbols. A receive processor 1858 may process (e.g., demodulate, deinterleave, and decode) the detected symbols, providing decoded data for the UE 1815 to a data output, and provide decoded control information to a processor 1880, or memory 1882.

The processor 1880 may in some cases execute stored instructions to instantiate a UE wireless communication management component 1884. The UE wireless communication management component 1884 may be an example of aspects of the UE wireless communication management component 1220, 1320, or 1660 described with reference to FIG. 12, 13, or 16.

On the uplink (UL), at the UE 1815, a transmit processor 1864 may receive and process data from a data source. The transmit processor 1864 may also generate reference symbols for a reference signal. The symbols from the transmit processor 1864 may be precoded by a transmit MIMO processor 1866 if applicable, further processed by the modulators 1854 through 1855 (e.g., for SC-FDMA, etc.), and be transmitted to the base station 1805 in accordance with the transmission parameters received from the base station 1805. At the base station 1805, the UL signals from the UE 1815 may be received by the antennas 1834 through 1835, processed by the demodulators 1832 through 1833, detected by a MIMO detector 1836 if applicable, and further processed by a receive processor 1838. The receive processor 1838 may provide decoded data to a data output and to the processor 1840 or memory 1842.

The processor 1840 may in some cases execute stored instructions to instantiate a base station wireless communication management component 1886. The base station wireless communication management component 1886 may be an example of aspects of the base station wireless communication management component 1420, 1520, or 1760 described with reference to FIG. 14, 15, or 17.

The components of the UE 1815 may, individually or collectively, be implemented with one or more ASICs adapted to perform some or all of the applicable functions in hardware. Each of the noted components may be a means for performing one or more functions related to operation of the MIMO communication system 1800. Similarly, the components of the base station 1805 may, individually or collectively, be implemented with one or more ASICs adapted to perform some or all of the applicable functions in hardware. Each of the noted components may be a means for performing one or more functions related to operation of the MIMO communication system 1800.

Figure 19:
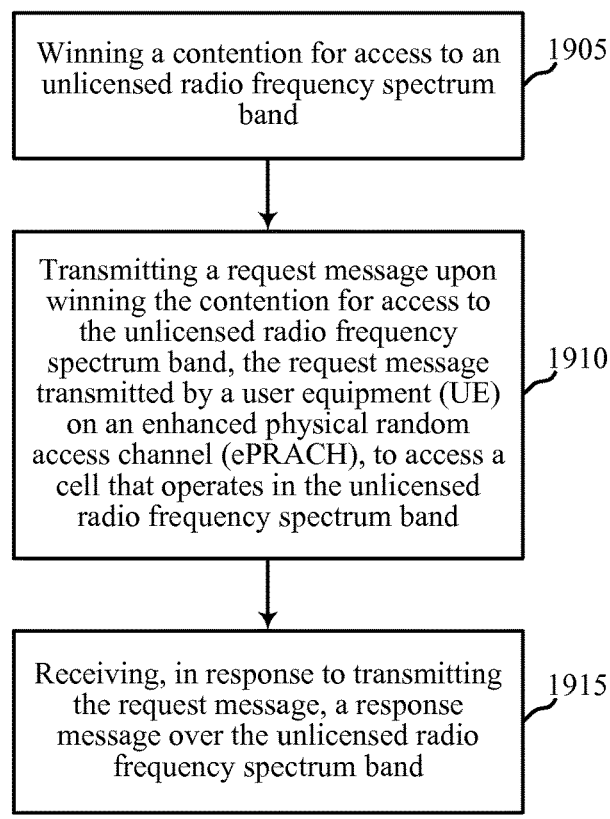
FIG. 19 is a flow chart illustrating an exemplary method for wireless communication, in accordance with various aspects of the present disclosure.

FIG. 19 is a flow chart illustrating an exemplary of a method 1900 for wireless communication, in accordance with various aspects of the present disclosure. For clarity, the method 1900 is described below with reference to aspects of one or more of the UEs 115, 215, 215-a, 215-b, 215-c, 515, 715, 815, 915, 1015, 1115, 1615, or 1815 described with reference to FIG. 1, 2, 5, 7, 8, 9, 10, 11, 16, or 18, or aspects of one or more of the apparatuses 1215 or 1315 described with reference to FIG. 12 or 13. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1905, the method 1900 may include winning a contention for access to an unlicensed radio frequency spectrum band. The unlicensed radio frequency spectrum band may include a radio frequency spectrum band for which transmitting apparatuses may need to contend for access because the radio frequency spectrum band is available for unlicensed use, such as Wi-Fi use. The operation(s) at block 1905 may be performed using the UE wireless communication management component 1220, 1320, 1660, or 1884 described with reference to FIG. 12, 13, 16, or 18, or the CCA component 1345 described with reference to FIG. 13.

At block 1910, the method 1900 may include transmitting a request message upon wining the contention for access to the unlicensed radio frequency spectrum band. The request message may be transmitted by a UE on an ePRACH, to access a cell that operates in the unlicensed radio frequency spectrum band. In some examples, the request message may be an unscheduled request message. In some examples, the request message may be transmitted over the unlicensed radio frequency spectrum band. In some examples, the request message may be transmitted in synchronization with a subframe boundary. In some examples, the request message may include at least one of: a connection setup request; a handover completion indication; a connection reestablishment request; a buffer status report; a device identifier; or a cause value. The operation(s) at block 1910 may be performed using the UE wireless communication management component 1220, 1320, 1660, or 1884 described with reference to FIG. 12, 13, 16, or 18, or the ePRACH request transmission management component 1235 or 1335 described with reference to FIG. 12 or 13.

At block 1915, the method 1900 may include receiving, in response to transmitting the request message at block 1910, a response message. The response message may be received over the unlicensed radio frequency spectrum band. In some examples, the response message may include at least one of: a connection configuration message; a channel contention resolution indication; a scheduled uplink grant; a device identifier; or an indication of a timing adjustment. The operation(s) at block 1915 may be performed using the UE wireless communication management component 1220, 1320, 1660, or 1884 described with reference to FIG. 12, 13, 16, or 18, or the response processing component 1240 or 1340 described with reference to FIG. 12 or 13.

In some examples of the method 1900, the request message may be further configured or transmitted as described with reference to FIG. 5, 7, 8, 9, 10, or 11, or the response message may be further configured or received as described with reference to FIG. 5, 7, 8, 9, 10, or 11.

Thus, the method 1900 may provide for wireless communication. It should be noted that the method 1900 is just one implementation and that the operations of the method 1900 may be rearranged or otherwise modified such that other implementations are possible.

Figure 20:
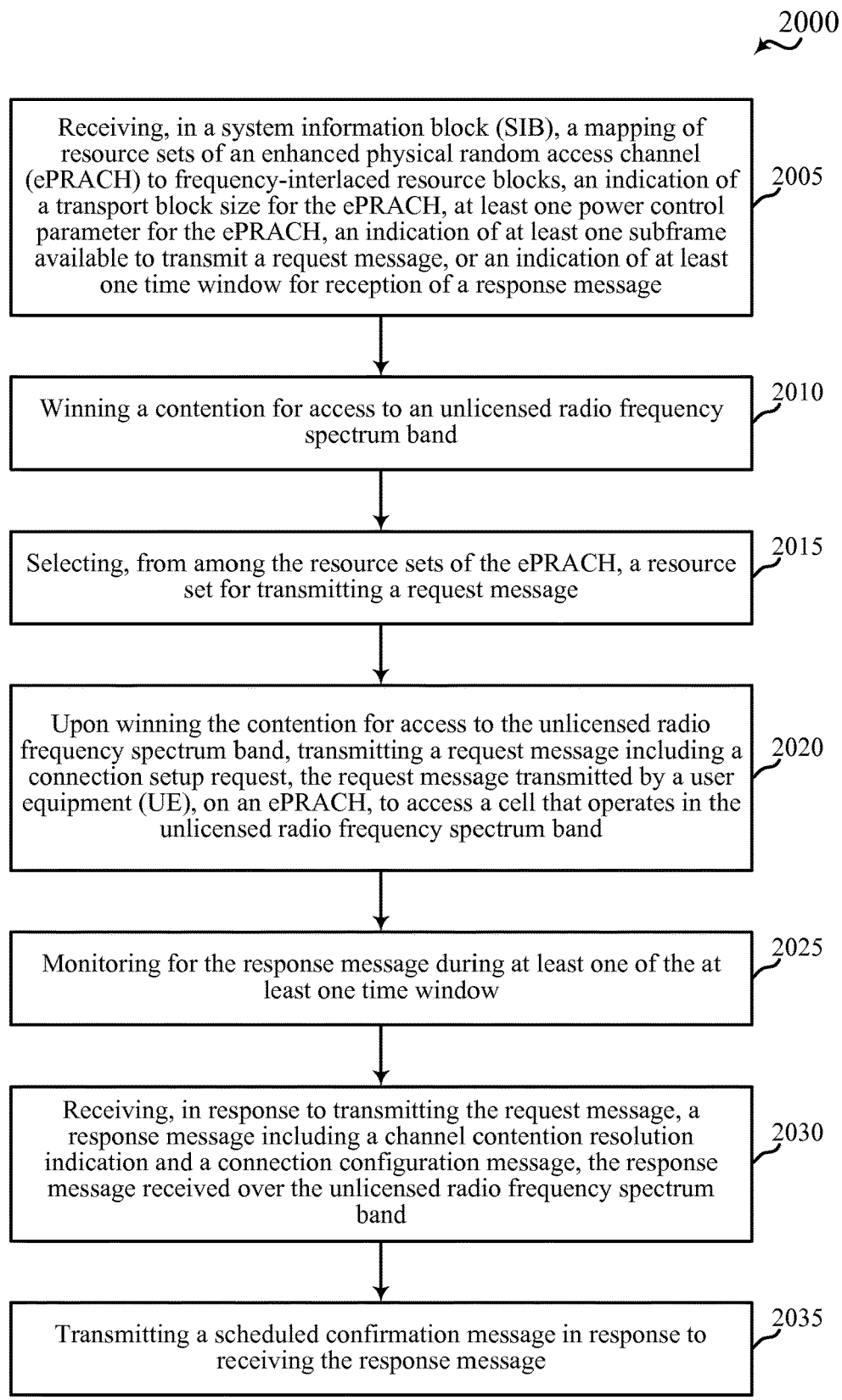
FIG. 20 is a flow chart illustrating an exemplary method for wireless communication, in accordance with various aspects of the present disclosure.

FIG. 20 is a flow chart illustrating an exemplary method 2000 for wireless communication, in accordance with various aspects of the present disclosure. For clarity, the method 2000 is described below with reference to aspects of one or more of the UEs 115, 215, 215-a, 215-b, 215-c, 515, 715, 815, 915, 1015, 1115, 1615, or 1815 described with reference to FIG. 1, 2, 5, 7, 8, 9, 10, 11, 16, or 18, or aspects of one or more of the apparatuses 1215 or 1315 described with reference to FIG. 12 or 13. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 2005, the method 2000 may include receiving, in a SIB, at least one of: a mapping of resource sets of an ePRACH to frequency-interlaced resource blocks; an indication of a transport block size for the ePRACH; at least one power control parameter for the ePRACH; an indication of at least one subframe available to transmit a request message; or an indication of at least one time window for reception of a response message. In some examples, the resource sets of the ePRACH may include at least one contention-based resource set. In some examples, the resource sets of the ePRACH may also include at least one dedicated resource set. In some examples, the indication of the at least one time window for reception of the response message may include a first indication of at least one connection establishment time window and a second indication of at least one handover time window. The operation(s) at block 2005 may be performed using the UE wireless communication management component 1220, 1320, 1660, or 1884 described with reference to FIG. 12, 13, 16, or 18, or the system information processing component 1250 or connection setup management component 1355 described with reference to FIG. 13.

At block 2010, the method 2000 may include winning a contention for access to an unlicensed radio frequency spectrum band. The unlicensed radio frequency spectrum band may include a radio frequency spectrum band for which transmitting apparatuses may need to contend for access because the radio frequency spectrum band is available for unlicensed use, such as Wi-Fi use. The operation(s) at block 2010 may be performed using the UE wireless communication management component 1220, 1320, 1660, or 1884 described with reference to FIG. 12, 13, 16, or 18, or the CCA component 1345 described with reference to FIG. 13.

At block 2015, the method 2000 may include selecting, from among the resource sets of the ePRACH, a resource set for transmitting a request message. In some examples, the selected resource set may be a contention-based resource set. The operation(s) at block 2015 may be performed using the UE wireless communication management component 1220, 1320, 1660, or 1884 described with reference to FIG. 12, 13, 16, or 18, the ePRACH request transmission management component 1235 or 1335 described with reference to FIG. 12 or 13, or the connection setup management component 1355 described with reference to FIG. 13.

At block 2020, and upon winning the contention for access to the unlicensed radio frequency spectrum band at block 2010, the method 2000 may include transmitting a request message including a connection setup request. The request message may be transmitted by a UE, on the ePRACH and using the selected resource set, to access a cell that operates in the unlicensed radio frequency spectrum band. In some examples, the request message may be an unscheduled request message. In some examples, the request message may be transmitted over the unlicensed radio frequency spectrum band. In some examples, the request message may be transmitted in synchronization with a subframe boundary. The operation(s) at block 2020 may be performed using the UE wireless communication management component 1220, 1320, 1660, or 1884 described with reference to FIG. 12, 13, 16, or 18, the ePRACH request transmission management component 1235 or 1335 described with reference to FIG. 12 or 13, or the connection setup management component 1355 described with reference to FIG. 13.

At block 2025, the method 2000 may include monitoring the unlicensed radio frequency spectrum band for the response message during at least one of the at least one time window. In some examples, the monitoring may occur during at least one of the at least one connection establishment time window. The operation(s) at block 2025 may be performed using the UE wireless communication management component 1220, 1320, 1660, or 1884 described with reference to FIG. 12, 13, 16, or 18, the response processing component 1240 or 1340 described with reference to FIG. 12 or 13, or the connection setup management component 1355 described with reference to FIG. 13.

At block 2030, the method 2000 may include receiving, in response to transmitting the request message at block 2020, a response message including a channel contention resolution indication and a connection configuration message. The response message may be received over the unlicensed radio frequency spectrum band. In some examples, the response message may also include a device identifier or an indication of a timing adjustment. The operation(s) at block 2030 may be performed using the UE wireless communication management component 1220, 1320, 1660, or 1884 described with reference to FIG. 12, 13, 16, or 18, the response processing component 1240 or 1340 described with reference to FIG. 12 or 13, or the connection setup management component 1355 described with reference to FIG. 13.

At block 2035, the method 2000 may include transmitting a scheduled confirmation message in response to receiving the response message. The operation(s) at block 2035 may be performed using the UE wireless communication management component 1220, 1320, 1660, or 1884 described with reference to FIG. 12, 13, 16, or 18, or the connection setup management component 1355 described with reference to FIG. 13.

In some examples, the method 2000 may include repeating the transmitting at block 2020 before receiving the response message at block 2030.

In some examples, the method 2000 may be performed without winning contention for access to the unlicensed radio frequency spectrum band at block 2010. In these examples, the request message may be transmitted during a preconfigured uplink CET occasion.

In some examples of the method 2000, the request message may be further configured or transmitted as described with reference to FIG. 5, 7, or 11, or the response message may be further configured or received as described with reference to FIG. 5, 7, or 11.

Thus, the method 2000 may provide for wireless communication. It should be noted that the method 2000 is just one implementation and that the operations of the method 2000 may be rearranged or otherwise modified such that other implementations are possible.

Figure 21:
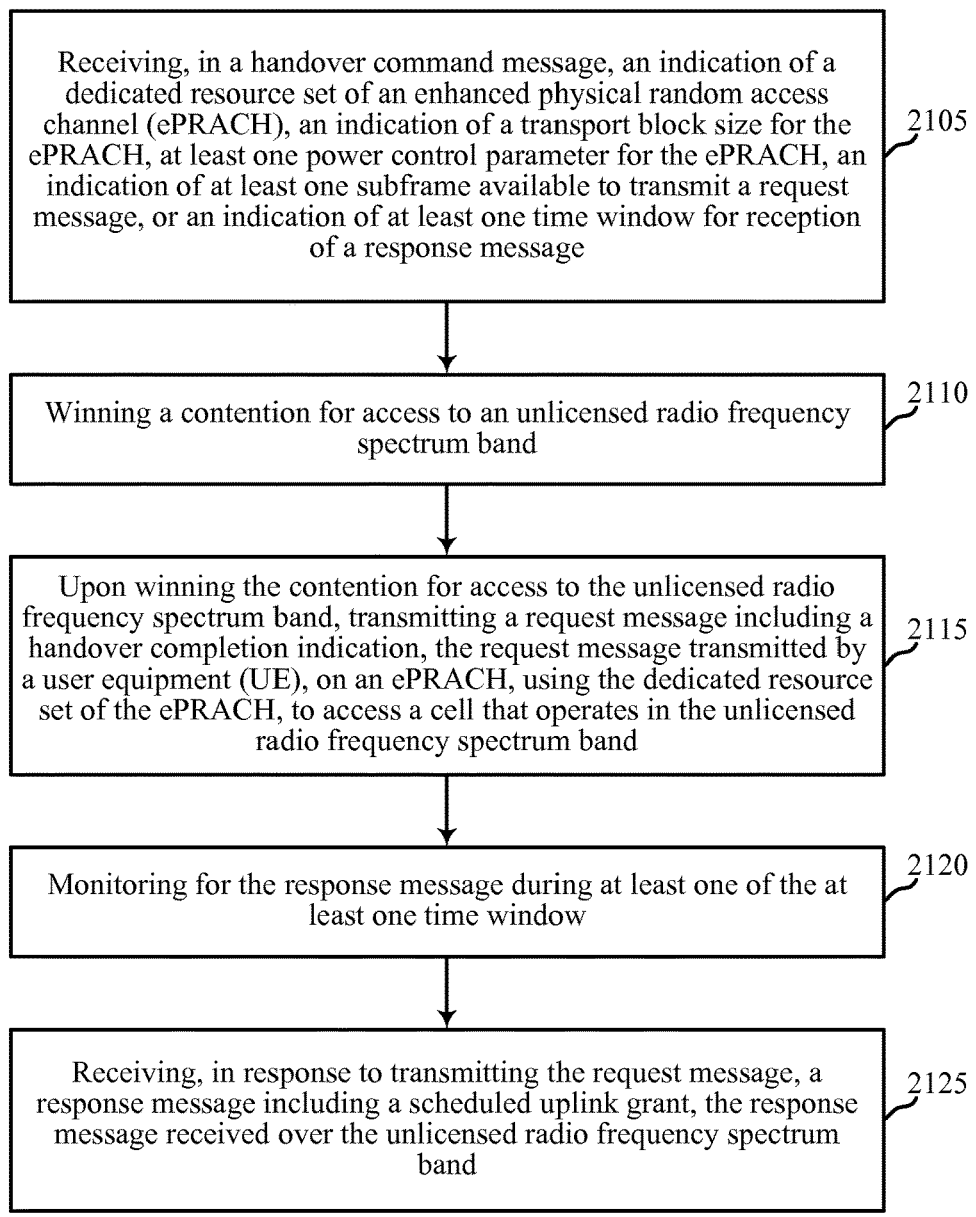
FIG. 21 is a flow chart illustrating an exemplary method for wireless communication, in accordance with various aspects of the present disclosure.

FIG. 21 is a flow chart illustrating an exemplary method 2100 for wireless communication, in accordance with various aspects of the present disclosure. For clarity, the method 2100 is described below with reference to aspects of one or more of the UEs 115, 215, 215-*a*, 215-*b*, 215-*c*, 515, 715, 815, 915, 1015, 1115, 1615, or 1815 described with reference to FIG. 1, 2, 5, 7, 8, 9, 10, 11, 16, or 18, or aspects of one or more of the apparatuses 1215 or 1315 described with reference to FIG. 12 or 13. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 2105, the method 2100 may include receiving, in a handover command message, an indication of a dedicated resource set of an ePRACH. The handover command message or a received SIB may also include an indication of a transport block size for the ePRACH; at least one power control parameter for the ePRACH; an indication of at least one subframe available to transmit a request message; or an indication of at least one time window for reception of a response message. In some examples, the indication of the at least one time window for reception of the response message may include a first indication of at least one connection establishment time window and a second indication of at least one handover time window. The operation(s) at block 2105 may be performed using the UE wireless communication management component 1220, 1320, 1660, or 184 described with reference to FIG. 12, 13, 16, or 18, or the system information processing component 1350 or handover management component 1360 described with reference to FIG. 13.

At block 2110, the method 2100 may include winning a contention for access to an unlicensed radio frequency spectrum band. The unlicensed radio frequency spectrum band may include a radio frequency spectrum band for which transmitting apparatuses may need to contend for access because the radio frequency spectrum band is available for unlicensed use, such as Wi-Fi use. The operation(s) at block 2110 may be performed using the UE wireless communication management component 1220, 1320, 1660, or 1884 described with reference to FIG. 12, 13, 16, or 18, or the CCA component 1345 described with reference to FIG. 13.

At block 2115, and upon winning the contention for access to the unlicensed radio frequency spectrum band at block 2110, the method 2100 may include transmitting a request message including a handover completion indication. The request message may be transmitted by a UE, on the ePRACH and using the dedicated resource set, to access a cell that operates in the unlicensed radio frequency spectrum band. In some examples, the request message may be an unscheduled request message. In some examples, the request message may be transmitted over the unlicensed radio frequency spectrum band. In some examples, the request message may be transmitted in synchronization with a subframe boundary. The operation(s) at block 2115 may be performed using the UE wireless communication management component 1220, 1320, 1660, or 1884 described with reference to FIG. 12, 13, 16, or 18, the ePRACH request transmission management component 1235 or 1335 described with reference to FIG. 12 or 13, or the handover management component 1360 described with reference to FIG. 13.

At block 2120, the method 2100 may include monitoring the unlicensed radio frequency spectrum band for the response message during at least one of the at least one time window. In some examples, the monitoring may occur during at least one of the at least one handover time window. The operation(s) at block 2120 may be performed using the UE wireless communication management component 1220, 1320, 1660, or 1884 described with reference to FIG. 12, 13, 16, or 18, the response processing component 1240 or 1340 described with reference to FIG. 12 or 13, or the handover management component 1360 described with reference to FIG. 13.

At block 2125, the method 2100 may include receiving, in response to transmitting the request message at block 2115, a response message including a scheduled uplink grant. The response message may be received over the unlicensed radio frequency spectrum band. In some examples, the response message may also include a device identifier or an indication of a timing adjustment. The operation(s) at block 2125 may be performed using the UE wireless communication management component 120, 1320, 1660, or 1884 described with reference to FIG. 12, 13, 16, or 18, the response processing component 1240 or 1340 described with reference to FIG. 12 or 13, or the handover management component 1360 described with reference to FIG. 13.

In some examples, the method 2100 may include repeating the transmitting at block 2115 before receiving the response message at block 2125.

In some examples, the method 2100 may be performed without winning contention for access to the unlicensed radio frequency spectrum band at block 2110. In these examples, the request message may be transmitted during a preconfigured uplink CET occasion.

In some examples of the method 2100, the request message may be further configured or transmitted as described with reference to FIG. 5, 8, or 11, or the response message may be further configured or received as described with reference to FIG. 5, 8, or 11.

Thus, the method 2100 may provide for wireless communication. It should be noted that the method 2100 is just one implementation and that the operations of the method 2100 may be rearranged or otherwise modified such that other implementations are possible.

Figure 22:
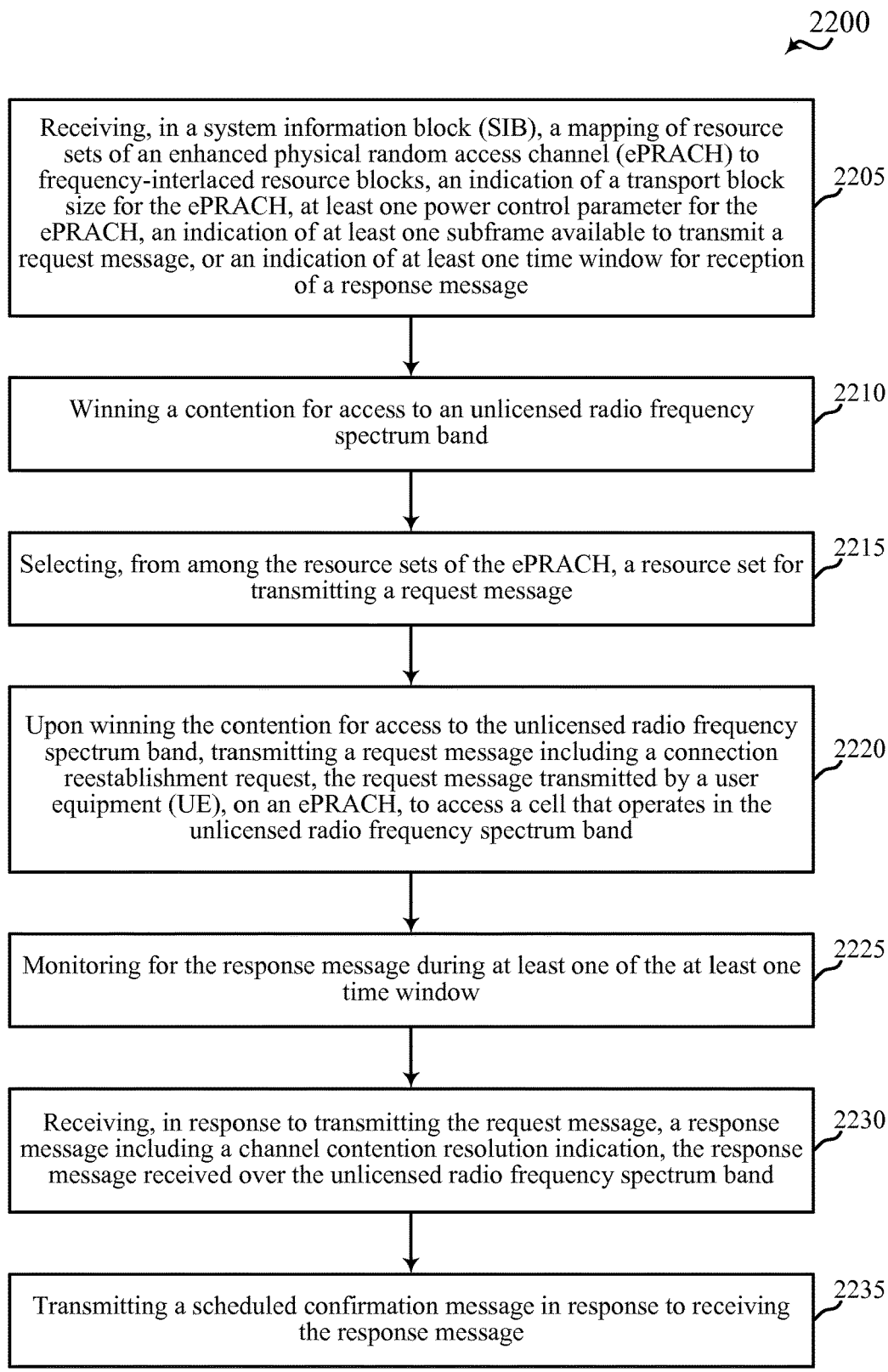
FIG. 22 is a flow chart illustrating an exemplary method for wireless communication, in accordance with various aspects of the present disclosure.

FIG. 22 is a flow chart illustrating an exemplary method 2200 for wireless communication, in accordance with various aspects of the present disclosure. For clarity, the method 2200 is described below with reference to aspects of one or more of the UEs 115, 215, 215-*a*, 215-*b*, 215-*c*, 515, 715, 815, 915, 1015, 1115, 1615, or 1815 described with reference to FIG. 1, 2, 5, 7, 8, 9, 10, 11, 16, or 18, or aspects of one or more of the apparatuses 1215 or 1315 described with reference to FIG. 12 or 13. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 2205, the method 2200 may include receiving, in a SIB, at least one of: a mapping of resource sets of an ePRACH to frequency-interlaced resource blocks; an indication of a transport block size for the ePRACH; at least one power control parameter for the ePRACH; an indication of at least one subframe available to transmit a request message; or an indication of at least one time window for reception of a response message. In some examples, the resource sets of the ePRACH may include at least one contention-based resource set. In some examples, the resource sets of the ePRACH may also include at least one dedicated resource set. In some examples, the indication of the at least one time window for reception of the response message may include a first indication of at least one connection establishment time window and a second indication of at least one handover time window. The operation(s) at block 2205 may be performed using the UE wireless communication management component 1220, 1320, 1660, or 1884 described with reference to FIG. 12, 13, 16, or 18, or the system information processing component 1350 or connection reestablishment management component 1365 described with reference to FIG. 13.

At block 2210, the method 2200 may include winning a contention for access to an unlicensed radio frequency spectrum band. The unlicensed radio frequency spectrum band may include a radio frequency spectrum band for which transmitting apparatuses may need to contend for access because the radio frequency spectrum band is available for unlicensed use, such as Wi-Fi use. The operation(s) at block 2210 may be performed using the UE wireless communication management component 1220, 1320, 1660, or 1884 described with reference to FIG. 12, 13, 16, or 18, or the CCA component 1345 described with reference to FIG. 13.

At block 2215, the method 2200 may include selecting, from among the resource sets of the ePRACH, a resource set for transmitting a request message. In some examples, the selected resource set may be a contention-based resource set. The operation(s) at block 2215 may be performed using the UE wireless communication management component 1220, 1320, 1660, or 1884 described with reference to FIG. 12, 13, 16, or 18, the ePRACH request transmission management component 1235 or 1335 described with reference to FIG. 12 or 13, or the connection reestablishment management component 1365 described with reference to FIG. 13.

At block 2220, and upon winning the contention for access to the unlicensed radio frequency spectrum band at block 2210, the method 2200 may include transmitting a request message including a connection reestablishment request. The request message may be transmitted by a UE, on the ePRACH and using the selected resource set, to access a cell that operates in the unlicensed radio frequency spectrum band. In some examples, the request message may be an unscheduled request message. In some examples, the request message may be transmitted over the unlicensed radio frequency spectrum band. In some examples, the request message may be transmitted in synchronization with a subframe boundary. The operation(s) at block 2220 may be performed using the UE wireless communication management component 1220, 1320, 1660, or 1884 described with reference to FIG. 12, 13, 16, or 18, the ePRACH request transmission management component 1235 or 1335 described with reference to FIG. 12 or 13, or the connection reestablishment management component 1365 described with reference to FIG. 13.

At block 2225, the method 2200 may include monitoring the unlicensed radio frequency spectrum band for the response message during at least one of the at least one time window. In some examples, the monitoring may occur during at least one of the at least one connection establishment time window. The operation(s) at block 2225 may be performed using the UE wireless communication management component 1220, 1320, 1660, or 1884 described with reference to FIG. 12, 13, 16, or 18, the response processing component 1140 or 1240 described with reference to FIG. 12 or 13, or the connection reestablishment management component 1365 described with reference to FIG. 13.

At block 2230, the method 2200 may include receiving, in response to transmitting the request message at block 2220, a response message including a channel contention resolution indication. The response message may be received over the unlicensed radio frequency spectrum band. In some examples, the response message may also include a device identifier or an indication of a timing adjustment. The operation(s) at block 2230 may be performed using the UE wireless communication management component 1220, 1320, 1660, or 1884 described with reference to FIG. 12, 13, 16, or 18, the response processing component 1240 or 1340 described with reference to FIG. 12 or 13, or the connection reestablishment management component 1365 described with reference to FIG. 13.

At block 2235, the method 2200 may include transmitting a scheduled confirmation message in response to receiving the response message. The operation(s) at block 2235 may be performed using the UE wireless communication management component 1220, 1320, 1660, or 1884 described with reference to FIG. 12, 13, 16, or 18, or the connection reestablishment management component 1365 described with reference to FIG. 13.

In some examples, the method 2200 may include repeating the transmitting at block 2220 before receiving the response message at block 2230.

In some examples, the method 2200 may be performed without winning contention for access to the unlicensed radio frequency spectrum band at block 2210. In these examples, the request message may be transmitted during a preconfigured uplink CET occasion.

In some examples of the method 2200, the request message may be further configured or transmitted as described with reference to FIG. 5, 9, 10, or 11, or the response message may be further configured or received as described with reference to FIG. 5, 9, 10, or 11.

Thus, the method 2200 may provide for wireless communication. It should be noted that the method 2200 is just one implementation and that the operations of the method 2200 may be rearranged or otherwise modified such that other implementations are possible.

In some examples, aspects of one or more of the methods 1900, 2000, 2100, 2200, or 2300 described with reference to FIG. 19, 20, 21, 22, or 23 may be combined.

Figure 23:
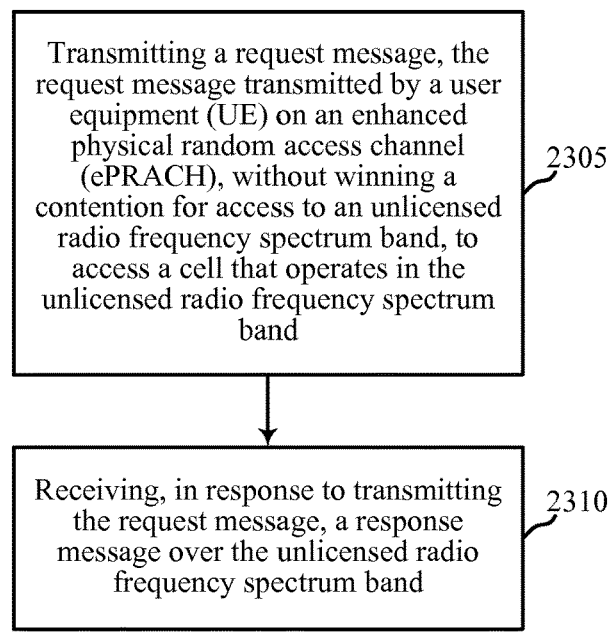
FIG. 23 is a flow chart illustrating an exemplary method for wireless communication, in accordance with various aspects of the present disclosure.

FIG. 23 is a flow chart illustrating an exemplary method 2300 for wireless communication, in accordance with various aspects of the present disclosure. For clarity, the method 2300 is described below with reference to aspects of one or more of the UEs 115, 215, 215-a, 215-b, 215-c, 515, 715, 815, 915, 1015, 1115, 1615, or 1815 described with reference to FIG. 1, 2, 5, 7, 8, 9, 10, 11, 16, or 18, or aspects of one or more of the apparatuses 1215 or 1315 described with reference to FIG. 12 or 13. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 2305, the method 2300 may include transmitting a request message. The request message may be transmitted by a UE on an ePRACH without winning a contention for access to an unlicensed radio frequency spectrum band, to access a cell that operates in the unlicensed radio frequency spectrum band. The unlicensed radio frequency spectrum band may include a radio frequency spectrum band for which transmitting apparatuses may need to contend for access because the radio frequency spectrum band is available for unlicensed use, such as Wi-Fi use. In some examples, the request message may be an unscheduled request message. In some examples, the request message may be transmitted over the unlicensed radio frequency spectrum band. In some examples, the request message may be transmitted in synchronization with a subframe boundary. In some examples, the request message may be transmitted during a preconfigured uplink CET occasion. In some examples, the request message may include at least one of: a connection setup request; a handover completion indication; a connection reestablishment request; a buffer status report; a device identifier; or a cause value. The operation(s) at block 2305 may be performed using the UE wireless communication management component 1220, 1320, 1660, or 1884 described with reference to FIG. 12, 13, 16, or 18, or the ePRACH request transmission management component 1235 or 1335 described with reference to FIG. 12 or 13.

At block 2310, the method 2300 may include receiving, in response to transmitting the request message at block 2305, a response message. The response message may be received over the unlicensed radio frequency spectrum band. In some examples, the response message may include at least one of: a connection configuration message; a channel contention resolution indication; a scheduled uplink grant; a device identifier; or an indication of a timing adjustment. The operation(s) at block 2310 may be performed using the UE wireless communication management component 1220, 1320, 1660, or 1884 described with reference to FIG. 12, 13, 16, or 18, or the response processing component 1240 or 1340 described with reference to FIG. 12 or 13.

In some examples of the method 2300, the request message may be further configured or transmitted as described with reference to FIG. 5, 7, 8, 9, 10, or 11, or the response message may be further configured or received as described with reference to FIG. 5, 7, 8, 9, 10, or 11.

Thus, the method 2300 may provide for wireless communication. It should be noted that the method 2300 is just one implementation and that the operations of the method 2300 may be rearranged or otherwise modified such that other implementations are possible.

Figure 24:
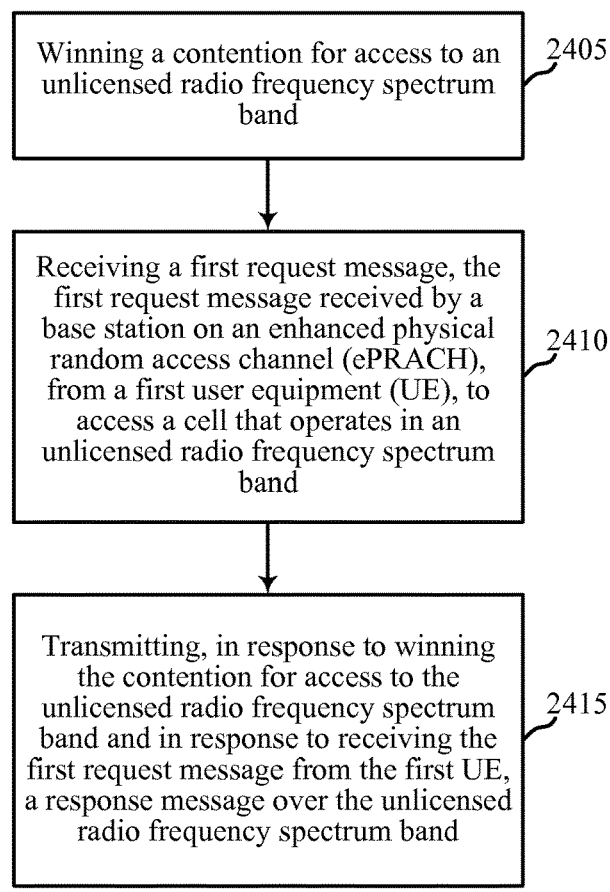
FIG. 24 is a flow chart illustrating an exemplary method for wireless communication, in accordance with various aspects of the present disclosure.

FIG. 24 is a flow chart illustrating an exemplary method 2400 for wireless communication, in accordance with various aspects of the present disclosure. For clarity, the method 2400 is described below with reference to aspects of one or more of the base stations 105, 205, 205-a, 505, 705, 805, 905, 1005, 1105, 1705, or 1805 described with reference to FIG. 1, 2, 5, 7, 8, 9, 10, 11, 17, or 18, or aspects of one or more of the apparatuses 1405 or 1505 described with reference to FIG. 14 or 15. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 2405, the method 2400 may include winning a contention for access to an unlicensed radio frequency spectrum band. The unlicensed radio frequency spectrum band may include a radio frequency spectrum band for which transmitting apparatuses may need to contend for access because the radio frequency spectrum band is available for unlicensed use, such as Wi-Fi use. The operation(s) at block 2405 may be performed using the base station wireless communication management component 1420, 1520, 1760, or 1886 described with reference to FIG. 14, 15, 17, or 18, or the CCA component 1545 described with reference to FIG. 15.

At block 2410, the method 2400 may include receiving a first request message. The first request message may be received by a base station on an ePRACH, from a UE, to access a cell that operates in the unlicensed radio frequency spectrum band. In some examples, the request message may be an unscheduled request message. In some examples, the request message may be received over the unlicensed radio frequency spectrum band. In some examples, the request message may be received in synchronization with a subframe boundary. In some examples, the request message may include at least one of: a connection setup request; a handover completion indication; a connection reestablishment request; a buffer status report; a device identifier; or a cause value. The operation(s) at block 2410 may be performed using the base station wireless communication management component 1420, 1520, 1760, or 1886 described with reference to FIG. 14, 15, 17, or 18, or the ePRACH request processing component 1435 or 1535 described with reference to FIG. 14 or 15.

At block 2415, the method 2400 may include transmitting, in response to winning the contention for access to the unlicensed radio frequency spectrum band and in response to receiving the request message at block 2410, a response message. The response message may be transmitted over the unlicensed radio frequency spectrum band. In some examples, the response message may include at least one of: a connection configuration message; a channel contention resolution indication; a scheduled uplink grant; a device identifier; or an indication of a timing adjustment. The operation(s) at block 2415 may be performed using the base station wireless communication management component 1420, 1520, 1760, or 1884 described with reference to FIG. 14, 15, 17, or 18, or the response transmission management component 1440 or 1540 described with reference to FIG. 14 or 15.

In some examples, the method 2400 may include transmitting, in a SIB, at least one of: a mapping of resource sets of the ePRACH to frequency-interlaced resource blocks; an indication of a transport block size for the ePRACH; at least one power control parameter for the ePRACH; an indication of at least one subframe available to transmit a request message; or an indication of at least one time window for reception of a response message. The SIB may be transmitted, and received by each of a number of UEs, prior to receiving the first request message at block 2405. In some examples, the resource sets of the ePRACH may include at least one contention-based resource set. In some examples, the resource sets of the ePRACH may also include at least one dedicated resource set. In some examples, the indication of the at least one time window for reception of the response message may include a first indication of at least one connection establishment time window and a second indication of at least one handover time window. The operation(s) described in this paragraph may be performed using the base station wireless communication management component 1420, 1520, 1760, or 1886 described with reference to FIG. 14, 15, 17, or 18, or the system information transmission management component 1550 described with reference to FIG. 15.

In some examples, the contention for access to the unlicensed radio frequency spectrum band may be won before receipt of the request message. In some examples, the contention for access to the unlicensed radio frequency spectrum band may be won during or after receipt of the request message.

In some examples, the method 2400 may include receiving, at block 2405, a respective request message from each of a plurality of UEs. Each respective request message may include a respective device identifier, with the first request message including a first device identifier. In these examples, the method 2400 may include resolving channel contention between the plurality of UEs in favor of the first UE, and including the first device identifier in the response message.

In some examples, the method 2400 may include requesting from a source base station, between receiving the first request message at block 2405 and transmitting the response message at block 2410, a context of the first UE.

In some examples of the method 2400, the request message may be further configured or received as described with reference to FIG. 5, 7, 8, 9, 10, or 11, or the response message may be further configured or transmitted as described with reference to FIG. 5, 7, 8, 9, 10, or 11.

Thus, the method 2400 may provide for wireless communication. It should be noted that the method 2400 is just one implementation and that the operations of the method 2400 may be rearranged or otherwise modified such that other implementations are possible.

Figure 25:
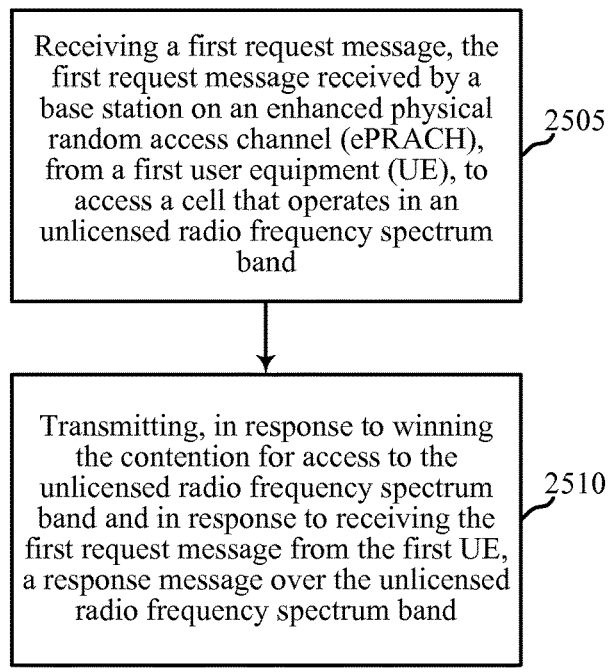
FIG. 25 is a flow chart illustrating an exemplary method for wireless communication, in accordance with various aspects of the present disclosure.

FIG. 25 is a flow chart illustrating an exemplary method 2500 for wireless communication, in accordance with various aspects of the present disclosure. For clarity, the method 2500 is described below with reference to aspects of one or more of the base stations 105, 205, 205-*a*, 505, 705, 805, 905, 1005, 1105, 1705, or 1805 described with reference to FIG. 1, 2, 5, 7, 8, 9, 10, 11, 17, or 18, or aspects of one or more of the apparatuses 1405 or 1505 described with reference to FIG. 14 or 15. In some examples, a base station or apparatus may execute one or more sets of codes to control the functional elements of the base station or apparatus to perform the functions described below. Additionally or alternatively, the base station or apparatus may perform one or more of the functions described below using special-purpose hardware.

At block 2505, the method 2500 may include receiving a first request message. The first request message may be received by a base station on an ePRACH, from a UE, to access a cell that operates in an unlicensed radio frequency spectrum band. The unlicensed radio frequency spectrum band may include a radio frequency spectrum band for which transmitting apparatuses may need to contend for access because the radio frequency spectrum band is available for unlicensed use, such as Wi-Fi use. In some examples, the request message may be an unscheduled request message. In some examples, the request message may be received over the unlicensed radio frequency spectrum band. In some examples, the request message may be received in synchronization with a subframe boundary. In some examples, the request message may include at least one of: a connection setup request; a handover completion indication; a connection reestablishment request; a buffer status report; a device identifier; or a cause value. The operation(s) at block 2505 may be performed using the base station wireless communication management component

1420, 1520, 1760, or 1886 described with reference to FIG. 14, 15, 17, or 18, or the ePRACH request processing component 1435 or 1535 described with reference to FIG. 14 or 15.

At block 2510, the method 2500 may include transmitting, in response to receiving the request message at block 2505 and without winning a contention for access to the unlicensed radio frequency spectrum band, a response message. The response message may be transmitted over the unlicensed radio frequency spectrum band. In some examples, the response message may be transmitted during a preconfigured downlink CET occasion. In some examples, the response message may include at least one of: a connection configuration message; a channel contention resolution indication; a scheduled uplink grant; a device identifier; or an indication of a timing adjustment. The operation(s) at block 2510 may be performed using the base station wireless communication management component 1420, 1520, 1760, or 1884 described with reference to FIG. 14, 15, 17, or 18, or the response transmission management component 1440 or 1540 described with reference to FIG. 14 or 15.

In some examples, the method 2500 may include transmitting, in a SIB, at least one of: a mapping of resource sets of the ePRACH to frequency-interlaced resource blocks; an indication of a transport block size for the ePRACH; at least one power control parameter for the ePRACH; an indication of at least one subframe available to transmit a request message; or an indication of at least one time window for reception of a response message. The SIB may be transmitted, and received by each of a number of UEs, prior to receiving the first request message at block 2505. In some examples, the resource sets of the ePRACH may include at least one contention-based resource set. In some examples, the resource sets of the ePRACH may also include at least one dedicated resource set. In some examples, the indication of the at least one time window for reception of the response message may include a first indication of at least one connection establishment time window and a second indication of at least one handover time window. The operation(s) described in this paragraph may be performed using the base station wireless communication management component 1420, 1520, 1760, or 1886 described with reference to FIG. 14, 15, 17, or 18, or the system information transmission management component 1550 described with reference to FIG. 15.

In some examples, the method 2500 may include receiving, at block 2505, a respective request message from each of a plurality of UEs. Each respective request message may include a respective device identifier, with the first request message including a first device identifier. In these examples, the method 2500 may include resolving channel contention between the plurality of UEs in favor of the first UE, and including the first device identifier in the response message.

In some examples, the method 2500 may include requesting from a source base station, between receiving the first request message at block 2505 and transmitting the response message at block 2510, a context of the first UE.

In some examples of the method 2500, the request message may be further configured or received as described with reference to FIG. 5, 7, 8, 9, 10, or 11, or the response message may be further configured or transmitted as described with reference to FIG. 5, 7, 8, 9, 10, or 11.

Thus, the method 2500 may provide for wireless communication. It should be noted that the method 2500 is just one implementation and that the operations of the method 2500 may be rearranged or otherwise modified such that other implementations are possible.

In some examples, aspects of the methods 2400 and 2500 described with reference to FIGS. 24 and 25 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
winning a contention for access to an unlicensed radio frequency spectrum band;
transmitting, by a user equipment (UE) in synchronization with a subframe boundary, an uplink (UL) channel usage beacon signal in a subframe immediately prior to the subframe boundary over a first plurality of interleaved resource blocks, the UL channel usage beacon signal indicating that at least a portion of frequency bandwidth of the unlicensed radio frequency spectrum band is reserved;
selecting a resource set for a physical random access channel (PRACH) of a cell that operates in the unlicensed radio frequency spectrum band based at least in part on winning the contention for access to the unlicensed radio frequency spectrum band, the resource set including frequency-interlaced resource blocks having time resources and frequency resources for the PRACH;
transmitting, via the resource set, a connection request message including a device identifier, the connection request message transmitted by the UE in synchronization with the subframe boundary within the time resources of the resource set and in a subframe immediately after the subframe boundary, to access the cell that operates in the unlicensed radio frequency spectrum band;
receiving a downlink (DL) channel usage beacon signal over a second plurality of interleaved resource blocks, the DL channel usage beacon signal indicating that at least a portion of frequency bandwidth of the unlicensed radio frequency spectrum band is reserved; and
receiving, in response to transmitting the connection request message, a response message over the unlicensed radio frequency spectrum band.

2. The method of claim 1, wherein the connection request message comprises at least one of:
a connection setup request; a handover completion indication; a connection reestablishment request; a buffer status report; or a cause value.

3. The method of claim 1, wherein the response message comprises at least one of:
a connection configuration message; a channel contention resolution indication; a scheduled uplink grant; a device identifier; or an indication of a timing adjustment.

4. The method of claim 1, wherein the PRACH is transmitted over the unlicensed radio frequency spectrum band.

5. The method of claim 1, wherein the connection request message is an unscheduled request message.

6. The method of claim 1, further comprising:
receiving, from a base station, an indication of at least one time window for reception of the response message.

7. The method of claim 6, further comprising:
monitoring the unlicensed radio frequency spectrum band for the response message during at least one of the at least one time window.

8. The method of claim 6, wherein the indication of the at least one time window comprises a first indication of at least one connection establishment time window and a second indication of at least one handover time window.

9. The method of claim 1, further comprising:
receiving, from a base station, a mapping of resource sets of the PRACH to frequency-interlaced resource blocks, wherein the mapping of resource sets further includes an indication of aggregated interlaces or a number of subframes of the PRACH, the resource set based at least in part on the indication.

10. The method of claim 9, further comprising:
receiving, from the base station, at least one indication of a transport block size for the PRACH.

11. The method of claim 10, further comprising:
receiving, from the base station, at least one power control parameter for the PRACH.

12. The method of claim 1, further comprising:
receiving, from the base station, an indication of at least one subframe available to perform the transmitting of the connection request message.

13. The method of claim 1, further comprising:
transmitting a scheduled confirmation message in response to receiving the response message.

14. The method of claim 1, further comprising:
repeating the transmitting of the connection request message before receiving the response message.

15. The method of claim 1, wherein the PRACH comprises at least one contention-based resource set.

16. The method of claim 15, wherein the PRACH further comprises at least one dedicated resource set.

17. The method of claim 15, wherein the connection request message is a handover completion indication transmitted using one of the at least one dedicated resource set.

18. The method of claim 10, further comprising:
determining a modulation and coding scheme (MCS) for transmitting the connection request message based at least in part on the resource set and the at least one indication for the transport block size for the PRACH.

19. A method for wireless communication, comprising:
receiving, from a base station, an indication of at least one subframe in an unlicensed radio frequency spectrum band available to perform a transmission of a connection request message;
selecting a resource set for a physical random access channel (PRACH) of a cell that operates in the unlicensed radio frequency spectrum band, the resource set frequency-interlaced resource blocks having time resources and frequency resources for the PRACH;
transmitting, via the resource set, the connection request message including a device identifier, the connection request message transmitted by a user equipment (UE) in synchronization with a subframe boundary within the time resources of the resource set, without winning a contention for access to the unlicensed radio frequency spectrum band, to access the cell that operates in the unlicensed radio frequency spectrum band;
receiving a downlink (DL) channel usage beacon signal prior to the subframe boundary over a plurality of interleaved resource blocks, the DL channel usage beacon signal indicating that at least a portion of frequency bandwidth of the unlicensed radio frequency spectrum band is reserved; and
receiving, in response to transmitting the connection request message, a response message after the subframe boundary over the unlicensed radio frequency spectrum band.

20. The method of claim 19, wherein the connection request message is transmitted during a preconfigured uplink clear channel assessment (CCA)-exempt transmission (CET) occasion.

21. A method for wireless communication, comprising:
winning a contention for access to an unlicensed radio frequency spectrum band;
receiving, from a first user equipment (UE) in synchronization with a subframe boundary, an uplink (UL) channel usage beacon signal in a subframe immediately prior to the subframe boundary over a first plurality of interleaved resource blocks, the UL channel usage beacon signal indicating that at least a portion of frequency bandwidth of the unlicensed radio frequency spectrum band is reserved;
receiving, from the first UE, a connection request message including a device identifier on frequency-interlaced resource blocks of a resource set having time resources and frequency resources for a physical random access channel (PRACH) of a cell that operates in the unlicensed radio frequency spectrum band, the connection request message received by a base station in synchronization with the subframe boundary within the time resources of the resource set and in a subframe immediately after the subframe boundary, to access the cell that operates in the unlicensed radio frequency spectrum band;
transmitting a downlink (DL) channel usage beacon signal over a second plurality of interleaved resource blocks, the DL channel usage beacon signal indicating that at least a portion of frequency bandwidth of the unlicensed radio frequency spectrum band is reserved; and
transmitting, in response to winning the contention for access to the unlicensed radio frequency spectrum band and after transmitting the DL channel usage beacon signal, and in response to receiving the connection request message from the first UE, a response message over the unlicensed radio frequency spectrum band.

22. The method of claim 21, wherein the connection request message comprises at least one of:
a connection setup request; a handover completion indication; a connection establishment request; a buffer status report; or a cause value.

23. The method of claim 21, wherein the response message comprises at least one of:
a connection configuration message; a channel contention resolution indication; a scheduled uplink grant; a device identifier; or an indication of a timing adjustment.

24. The method of claim 21, wherein the PRACH is received over the unlicensed radio frequency spectrum band.

25. The method of claim 21, further comprising:
requesting from a source base station, between receiving the connection request message and transmitting the response message, a context of the first UE.

26. The method of claim 21, further comprising:
receiving a respective connection request message from at least one of a plurality of UEs, each respective connection request message comprising a respective device identifier, wherein the connection request message received from the first UE comprises a first device identifier.

27. The method of claim 26, further comprising:
resolving channel contention between the plurality of UEs in favor of the first UE; and including the first device identifier in the response message.

28. A method for wireless communication, comprising:

receiving, from a first user equipment (UE) in synchronization with a subframe boundary, an uplink (UL) channel usage beacon signal prior in a subframe immediately to the subframe boundary over a plurality of interleaved resource blocks, the UL channel usage beacon signal indicating that at least a portion of frequency bandwidth of the unlicensed radio frequency spectrum band is reserved;

receiving, from the first UE, a connection request message including a device identifier on frequency-interlaced resource blocks of a resource set having time resources and frequency resources for a physical random access channel (PRACH) of a cell that operates in the unlicensed radio frequency spectrum band, the connection request message received by a base station in synchronization with the subframe boundary within the time resources of the resource set and in a subframe immediately after the subframe boundary, to access the cell that operates in the unlicensed radio frequency spectrum band; and transmitting, in response to receiving the connection request message from the first UE and without winning a contention for access to the unlicensed radio frequency spectrum band, a response message over the unlicensed radio frequency spectrum band.

29. The method of claim 28, wherein the connection request message is transmitted during a preconfigured downlink clear channel assessment (CCA)-exempt transmission (CET) occasion.

* * * * *